US010805114B2

(12) United States Patent
Cidon et al.

(10) Patent No.: US 10,805,114 B2
(45) Date of Patent: Oct. 13, 2020

(54) PROCESSING DATA MESSAGES OF A VIRTUAL NETWORK THAT ARE SENT TO AND RECEIVED FROM EXTERNAL SERVICE MACHINES

(71) Applicant: VMware, Inc., Palo Alto, CA (US)

(72) Inventors: Israel Cidon, San Francisco, CA (US); Chen Dar, Magshimim (IL); Prashanth Venugopal, San Francisco, CA (US); Eyal Zohar, Shimshit (IL); Aran Bergman, Givatayim (IL); Alex Markuze, Ramat Gan (IL)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 15/972,098

(22) Filed: May 4, 2018

(65) Prior Publication Data

US 2019/0104063 A1    Apr. 4, 2019

Related U.S. Application Data

(60) Provisional application No. 62/566,524, filed on Oct. 2, 2017.

(51) Int. Cl.
*H04L 12/741* (2013.01)
*H04L 12/46* (2006.01)
(Continued)

(52) U.S. Cl.
CPC ......... *H04L 12/4641* (2013.01); *H04L 12/14* (2013.01); *H04L 12/1403* (2013.01);
(Continued)

(58) Field of Classification Search
None
See application file for complete search history.

(56) References Cited

U.S. PATENT DOCUMENTS 6,154,465 A    11/2000  Pickett
6,445,682 B1    9/2002  Weitz
(Continued)

FOREIGN PATENT DOCUMENTS

EP    1912381 A1    4/2008
EP    3041178 A1    7/2016
(Continued)

OTHER PUBLICATIONS

Non-Published commonly owned International Patent Application PCT/US2018/053811, filed Oct. 1, 2018, 92 pages, Nicira, Inc.
(Continued)

*Primary Examiner* — Noel R Beharry
*Assistant Examiner* — Pamit Kaur
(74) *Attorney, Agent, or Firm* — Adeli LLP

(57) ABSTRACT

Some embodiments establish for an entity a virtual network over several public clouds of several public cloud providers and/or in several regions. In some embodiments, the virtual network is an overlay network that spans across several public clouds to interconnect one or more private networks (e.g., networks within branches, divisions, departments of the entity or their associated datacenters), mobile users, and SaaS (Software as a Service) provider machines, and other web applications of the entity. The virtual network in some embodiments can be configured to optimize the routing of the entity's data messages to their destinations for best end-to-end performance, reliability and security, while trying to minimize the routing of this traffic through the Internet. Also, the virtual network in some embodiments can be configured to optimize the layer 4 processing of the data message flows passing through the network.

15 Claims, 22 Drawing Sheets

(51) Int. Cl.
*H04L 29/08* (2006.01)
*H04L 12/14* (2006.01)
*H04L 12/715* (2013.01)
*H04L 12/28* (2006.01)
*H04L 29/12* (2006.01)
*H04L 12/24* (2006.01)
*H04M 15/00* (2006.01)
*H04L 29/06* (2006.01)
*H04L 12/721* (2013.01)
*H04L 12/26* (2006.01)

(52) U.S. Cl.
CPC ...... *H04L 12/1428* (2013.01); *H04L 12/2854* (2013.01); *H04L 12/2859* (2013.01); *H04L 12/4633* (2013.01); *H04L 41/0803* (2013.01); *H04L 43/0829* (2013.01); *H04L 43/0852* (2013.01); *H04L 43/0888* (2013.01); *H04L 45/04* (2013.01); *H04L 45/12* (2013.01); *H04L 45/14* (2013.01); *H04L 45/64* (2013.01); *H04L 45/74* (2013.01); *H04L 45/745* (2013.01); *H04L 61/1511* (2013.01); *H04L 61/25* (2013.01); *H04L 61/255* (2013.01); *H04L 61/2514* (2013.01); *H04L 61/305* (2013.01); *H04L 63/0245* (2013.01); *H04L 63/20* (2013.01); *H04L 67/10* (2013.01); *H04M 15/00* (2013.01); *H04M 15/51* (2013.01); *H04L 41/046* (2013.01); *H04L 43/08* (2013.01); *H04L 63/0263* (2013.01); *H04L 63/0272* (2013.01); *H04L 63/0281* (2013.01); *H04L 2212/00* (2013.01)

(56) References Cited

U.S. PATENT DOCUMENTS

| | | |
|---|---|---|
| 7,003,481 B2 | 2/2006 | Banka et al. |
| 7,320,017 B1 | 1/2008 | Kurapati et al. |
| 7,680,925 B2 | 3/2010 | Sathyanarayana et al. |
| 7,962,458 B2 | 6/2011 | Holenstein et al. |
| 8,111,692 B2 | 2/2012 | Ray |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,566,452 B1 | 10/2013 | Goodwin et al. |
| 8,724,456 B1 | 5/2014 | Hong et al. |
| 8,964,548 B1 | 2/2015 | Keralapura et al. |
| 9,055,000 B1 | 6/2015 | Ghosh et al. |
| 9,071,607 B2 | 6/2015 | Twitchell, Jr. |
| 9,075,771 B1 | 7/2015 | Gawali et al. |
| 9,154,327 B1 | 10/2015 | Marino et al. |
| 9,306,949 B1 | 4/2016 | Richard et al. |
| 9,336,040 B2 | 5/2016 | Dong et al. |
| 9,354,983 B1 | 5/2016 | Yenamandra et al. |
| 9,432,245 B1 | 8/2016 | Sorenson et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,525,564 B2 | 12/2016 | Lee |
| 9,608,962 B1 | 3/2017 | Chang |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,722,815 B2 | 8/2017 | Mukundan et al. |
| 9,787,559 B1 | 10/2017 | Schroeder |
| 9,825,822 B1 | 11/2017 | Holland |
| 9,906,401 B1 | 2/2018 | Rao |
| 10,057,183 B2 | 8/2018 | Salle et al. |
| 10,135,789 B2 | 11/2018 | Mayya et al. |
| 10,178,032 B1 | 1/2019 | Freitas |
| 10,187,289 B1 | 1/2019 | Chen et al. |
| 10,229,017 B1 | 3/2019 | Zou et al. |
| 10,237,123 B2 | 3/2019 | Dubey et al. |
| 10,320,664 B2 | 6/2019 | Nainar et al. |
| 10,326,830 B1 | 6/2019 | Singh |
| 10,348,767 B1 | 7/2019 | Lee et al. |
| 10,425,382 B2 | 9/2019 | Mayya et al. |
| 10,454,714 B2 | 10/2019 | Mayya et al. |
| 10,498,652 B2 | 12/2019 | Mayya et al. |
| 10,523,539 B2 | 12/2019 | Mayya et al. |
| 10,574,528 B2 | 2/2020 | Mayya et al. |
| 10,594,516 B2 | 3/2020 | Cidon et al. |
| 10,608,844 B2 | 3/2020 | Cidon et al. |
| 2002/0198840 A1 | 12/2002 | Banka et al. |
| 2003/0088697 A1 | 5/2003 | Matsuhira |
| 2003/0112808 A1 | 6/2003 | Solomon |
| 2003/0126468 A1 | 7/2003 | Markham |
| 2003/0161313 A1 | 8/2003 | Jinmei et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0224771 A1 | 11/2004 | Chen et al. |
| 2005/0078690 A1 | 4/2005 | DeLangis |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0193247 A1 | 8/2006 | Naseh et al. |
| 2007/0064604 A1 | 3/2007 | Chen et al. |
| 2007/0091794 A1 | 4/2007 | Filsfils et al. |
| 2007/0121486 A1 | 5/2007 | Guichard et al. |
| 2007/0177511 A1 | 8/2007 | Das et al. |
| 2007/0260746 A1 | 11/2007 | Mirtorabi et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0219276 A1 | 9/2008 | Shah |
| 2009/0013210 A1 | 1/2009 | McIntosh et al. |
| 2009/0154463 A1 | 6/2009 | Hines et al. |
| 2009/0247204 A1 | 10/2009 | Sennett et al. |
| 2010/0008361 A1 | 1/2010 | Guichard et al. |
| 2010/0088440 A1 | 4/2010 | Banks et al. |
| 2010/0118727 A1 | 5/2010 | Draves et al. |
| 2010/0191884 A1 | 7/2010 | Holenstein et al. |
| 2010/0223621 A1 | 9/2010 | Joshi et al. |
| 2010/0322255 A1 | 12/2010 | Hao et al. |
| 2010/0332657 A1 | 12/2010 | Elyashev et al. |
| 2011/0040814 A1 | 2/2011 | Higgins |
| 2011/0075674 A1 | 3/2011 | Li et al. |
| 2011/0110370 A1 | 5/2011 | Moreno et al. |
| 2011/0153909 A1 | 6/2011 | Dong |
| 2012/0008630 A1 | 1/2012 | Ould-Brahim |
| 2012/0027013 A1 | 2/2012 | Napierala |
| 2012/0157068 A1 | 6/2012 | Eichen et al. |
| 2012/0173919 A1 | 7/2012 | Patel et al. |
| 2012/0221955 A1 | 8/2012 | Raleigh et al. |
| 2012/0250682 A1 | 10/2012 | Vincent et al. |
| 2012/0250686 A1 | 10/2012 | Vincent et al. |
| 2012/0300615 A1 | 11/2012 | Kempf et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051399 A1 | 2/2013 | Zhang et al. |
| 2013/0103834 A1* | 4/2013 | Dzerve ............ H04L 67/10 709/225 |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0173788 A1 | 7/2013 | Song |
| 2013/0182712 A1 | 7/2013 | Aguayo et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0283364 A1 | 10/2013 | Chang et al. |
| 2013/0301642 A1 | 11/2013 | Radhakrishnan et al. |
| 2013/0315243 A1 | 11/2013 | Huang et al. |
| 2013/0329548 A1 | 12/2013 | Nakil et al. |

(56) References Cited

U.S. PATENT DOCUMENTS

| | | |
|---|---|---|
| 2014/0019604 A1 | 1/2014 | Twitchell, Jr. |
| 2014/0092907 A1* | 4/2014 | Sridhar .................. H04L 45/74 370/392 |
| 2014/0108665 A1 | 4/2014 | Arora et al. |
| 2014/0112171 A1 | 4/2014 | Pasdar |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0173113 A1 | 6/2014 | Vemuri et al. |
| 2014/0173331 A1 | 6/2014 | Martin et al. |
| 2014/0219135 A1 | 8/2014 | Li et al. |
| 2014/0223507 A1 | 8/2014 | Xu |
| 2014/0244851 A1 | 8/2014 | Lee |
| 2014/0317440 A1 | 10/2014 | Biermayr et al. |
| 2014/0341109 A1 | 11/2014 | Cartmell et al. |
| 2015/0016249 A1 | 1/2015 | Mukundan et al. |
| 2015/0029864 A1 | 1/2015 | Raileanu et al. |
| 2015/0046572 A1 | 2/2015 | Cheng et al. |
| 2015/0052247 A1 | 2/2015 | Threefoot et al. |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0134777 A1 | 5/2015 | Onoue |
| 2015/0146539 A1 | 5/2015 | Mehta et al. |
| 2015/0172121 A1 | 6/2015 | Farkas et al. |
| 2015/0188823 A1 | 7/2015 | Williams et al. |
| 2015/0201036 A1 | 7/2015 | Nishiki et al. |
| 2015/0222543 A1 | 8/2015 | Song |
| 2015/0236962 A1 | 8/2015 | Veres et al. |
| 2015/0271104 A1 | 9/2015 | Chikkamath et al. |
| 2015/0334696 A1 | 11/2015 | Gu et al. |
| 2015/0350907 A1 | 12/2015 | Timariu et al. |
| 2015/0363733 A1 | 12/2015 | Brown |
| 2015/0372943 A1 | 12/2015 | Hasan et al. |
| 2015/0381493 A1 | 12/2015 | Bansal et al. |
| 2016/0035183 A1* | 2/2016 | Buchholz ............ G07F 17/3225 463/25 |
| 2016/0036924 A1 | 2/2016 | Koppolu et al. |
| 2016/0072669 A1 | 3/2016 | Saavedra |
| 2016/0105471 A1 | 4/2016 | Nunes et al. |
| 2016/0142373 A1 | 5/2016 | Ossipov |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0255169 A1 | 9/2016 | Kovvuri et al. |
| 2016/0315912 A1 | 10/2016 | Mayya et al. |
| 2016/0352588 A1 | 12/2016 | Subbarayan et al. |
| 2016/0359738 A1 | 12/2016 | Sullenberger et al. |
| 2016/0380886 A1 | 12/2016 | Blair et al. |
| 2017/0012870 A1 | 1/2017 | Blair et al. |
| 2017/0026283 A1 | 1/2017 | Williams et al. |
| 2017/0034129 A1 | 2/2017 | Sawant et al. |
| 2017/0053258 A1 | 2/2017 | Carney et al. |
| 2017/0055131 A1 | 2/2017 | Kong et al. |
| 2017/0063782 A1 | 3/2017 | Jain et al. |
| 2017/0064005 A1 | 3/2017 | Lee |
| 2017/0093625 A1 | 3/2017 | Pera et al. |
| 2017/0118173 A1 | 4/2017 | Arramreddy et al. |
| 2017/0123939 A1 | 5/2017 | Maheshwari et al. |
| 2017/0126564 A1 | 5/2017 | Mayya et al. |
| 2017/0134186 A1 | 5/2017 | Mukundan et al. |
| 2017/0163473 A1 | 6/2017 | Sadana et al. |
| 2017/0181210 A1 | 6/2017 | Nadella et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0310641 A1* | 10/2017 | Jiang .................. H04L 61/103 |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339070 A1 | 11/2017 | Chang et al. |
| 2017/0364419 A1 | 12/2017 | Lo |
| 2018/0007123 A1* | 1/2018 | Cheng ................ H04L 12/4641 |
| 2018/0014051 A1 | 1/2018 | Phillips et al. |
| 2018/0034668 A1 | 2/2018 | Mayya et al. |
| 2018/0041425 A1 | 2/2018 | Zhang |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0084081 A1 | 3/2018 | Kuchibhotla et al. |
| 2018/0131720 A1 | 5/2018 | Hobson et al. |
| 2018/0145899 A1 | 5/2018 | Rao |
| 2018/0167378 A1 | 6/2018 | Kostyukov et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0234300 A1 | 8/2018 | Mayya et al. |
| 2018/0260125 A1 | 9/2018 | Botes et al. |
| 2018/0270104 A1 | 9/2018 | Zheng et al. |
| 2018/0278541 A1 | 9/2018 | Wu et al. |
| 2018/0295529 A1 | 10/2018 | Jen et al. |
| 2018/0302286 A1 | 10/2018 | Mayya et al. |
| 2018/0351855 A1 | 12/2018 | Sood et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2019/0020588 A1 | 1/2019 | Twitchell, Jr. |
| 2019/0028552 A1 | 1/2019 | Johnson et al. |
| 2019/0046056 A1 | 2/2019 | Khachaturian et al. |
| 2019/0058709 A1 | 2/2019 | Kempf et al. |
| 2019/0068470 A1 | 2/2019 | Mirsky |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |
| 2019/0268421 A1 | 8/2019 | Markuze et al. |
| 2019/0313907 A1 | 10/2019 | Khachaturian et al. |
| 2020/0014661 A1 | 1/2020 | Mayya et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |

FOREIGN PATENT DOCUMENTS

| | | |
|---|---|---|
| WO | 2012167184 A2 | 12/2012 |
| WO | 2017083975 A1 | 5/2017 |
| WO | 2019070611 A1 | 4/2019 |
| WO | 2019094522 A1 | 5/2019 |

OTHER PUBLICATIONS

Non-Published commonly owned U.S. Appl. No. 16/192,774, filed Nov. 15, 2018, 116 pages, Nicira, Inc.

(56) References Cited

OTHER PUBLICATIONS

Non-Published commonly owned U.S. Appl. No. 16/192,780, filed Nov. 15, 2018, 116 pages, Nicira, Inc.
Non-Published commonly owned U.S. Appl. No. 16/192,783, filed Nov. 15, 2018, 116 pages, Nicira, Inc.
PCT Invitation to Pay Additional Fees for Commonly Owned International Patent Application PCT/US2018/053811, mailed Dec. 19, 2018, 13 pages, International Searching Authority (EPO).
Non-published commonly owned U.S. Appl. No. 16/252,696, filed Jan. 20, 2019, 145 pages, Nicira, Inc.
Non-Published commonly Owned U.S. Appl. No. 15/701,115, filed Sep. 11, 2017, 21 pages, Nicira, Inc.
Non-Published commonly Owned U.S. Appl. No. 15/707,124, filed Sep. 18, 2017, 24 pages, Nicira, Inc.
Non-Published commonly Owned U.S. Appl. No. 15/784,404, filed Oct. 16, 2017, 21 pages, Nicira, Inc.
Non-Published commonly Owned U.S. Appl. No. 15/811,329, filed Nov. 13, 2017, 37 pages, Nicira, Inc.
Non-Published commonly Owned U.S. Appl. No. 15/838,052, filed Dec. 11, 2017, 28 pages, Nicira, Inc.
Non-Published commonly Owned U.S. Appl. No. 15/838,355, filed Dec. 11, 2017, 29 pages, Nicira, Inc.
Non-Published commonly Owned U.S. Appl. No. 15/972,083, filed May 4, 2018, 93 pages, Nicira, Inc.
Non-Published commonly Owned U.S. Appl. No. 15/972,086, filed May 4, 2018, 93 pages, Nicira, Inc.
Non-Published commonly Owned U.S. Appl. No. 15/972,088, filed May 4, 2018, 94 pages, Nicira, Inc.
Non-Published commonly Owned U.S. Appl. No. 15/972,090, filed May 4, 2018, 93 pages, Nicira, Inc.
Non-Published commonly Owned U.S. Appl. No. 15/972,091, filed May 4, 2018, 94 pages, Nicira, Inc.
Non-Published commonly Owned U.S. Appl. No. 15/972,093, filed May 4, 2018, 93 pages, Nicira, Inc.
Non-Published commonly Owned U.S. Appl. No. 15/972,095, filed May 4, 2018, 93 pages, Nicira, Inc.
Non-Published commonly Owned U.S. Appl. No. 15/972,100, filed May 4, 2018, 93 pages, Nicira, Inc.
Non-Published commonly Owned U.S. Appl. No. 15/972,102, filed May 4, 2018, 93 pages, Nicira, Inc.
Non-Published commonly Owned U.S. Appl. No. 15/972,103, filed May 4, 2018, 93 pages, Nicira, Inc.
Non-Published commonly Owned U.S. Appl. No. 15/972,104, filed May 4, 2018, 93 pages, Nicira, Inc.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-Published Commonly Owned International Patent Application PCT/US2019/059563, filed Nov. 1, 2019, 145 pages, VMware, Inc.
Non-published Commonly Owned U.S. Appl. No. 16/656,555, filed Oct. 17, 2019, 40 pages, Nicira, Inc.
Non-published Commonly Owned U.S. Appl. No. 16/699,719, filed Dec. 1, 2019, 42 pages, Nicira, Inc.
Non-published Commonly Owned U.S. Appl. No. 16/724,154, filed Dec. 20, 2019, 27 pages, Nicira, Inc.
PCT International Search Report and Written Opinion of Commonly Owned International Patent Application PCT/US2018/053811, dated Mar. 20, 2019, 20 pages, International Searching Authority—EPO.
Non-Published Commonly Owned U.S. Appl. No. 16/785,628, filed Feb. 9, 2020, 44 pages, Nicira, Inc.
PCT International Search Report and Written Opinion of Commonly Owned International Patent Application PCT/US2019/059563, dated Mar. 30, 2020, 12 pages, International Searching Authority (EPO).

\* cited by examiner

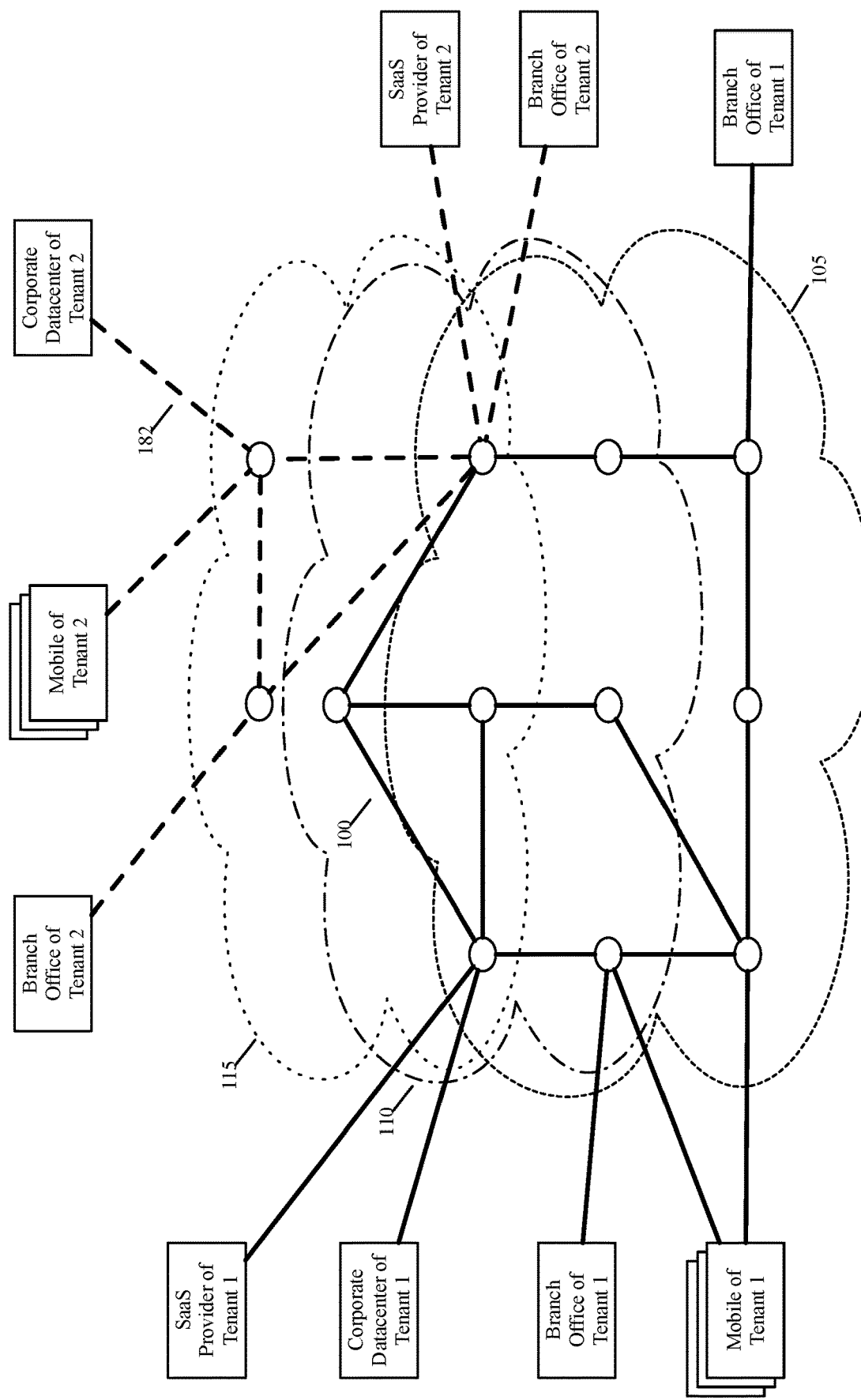

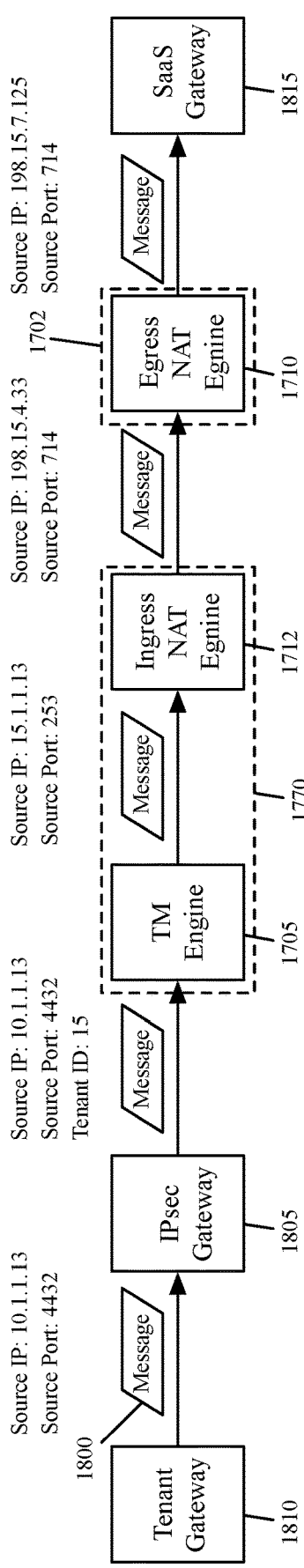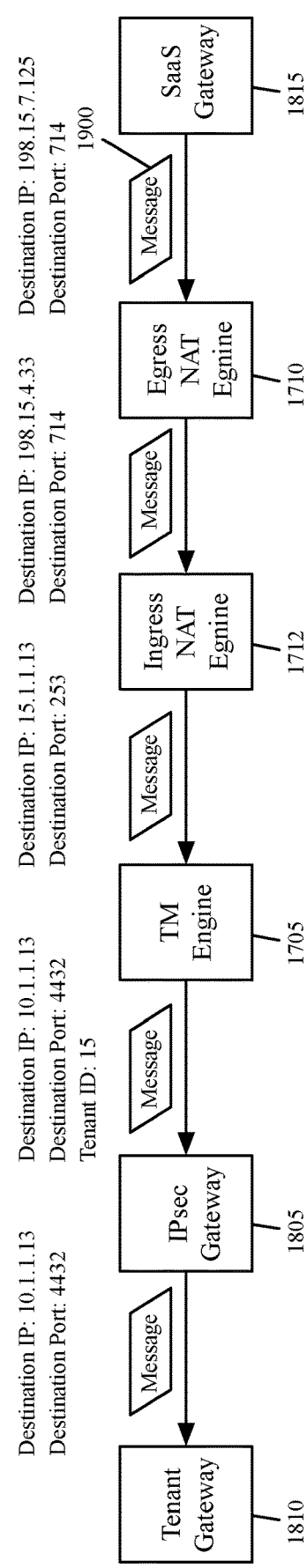

PROCESSING DATA MESSAGES OF A VIRTUAL NETWORK THAT ARE SENT TO AND RECEIVED FROM EXTERNAL SERVICE MACHINES

BACKGROUND

Today, a corporate enterprise network is the communication backbone that securely connects the different offices and divisions of a corporation. This network is typically a wide area network (WAN) that connects (1) users in branch offices and regional campuses, (2) corporate datacenters that host business applications, Intranets and their corresponding data, and (3) the global Internet through corporate firewalls and DMZ (demilitarized zone). Enterprise networks include specialized hardware such as switches, routers and middlebox appliances interconnected by expensive leased lines, such as Frame Relay and MPLS (multiprotocol label switching).

In the last several years, there has been a paradigm shift in the way corporations serve and consume communication services. First, the mobility revolution has allowed users to access services from any place at any time using mobile devices, mostly smart phones. Such users access the business services through public Internet and cellular networks. At the same time, third-party SaaS (Software as a Service) vendors (e.g., Salesforce, Workday, Zendesk) have replaced traditional on-premise applications, while other applications hosted in private datacenters have been relocated to the public clouds. While this traffic is still carried within the enterprise network, a significant portion of it originates and terminates outside the corporate network perimeters and has to cross both the public Internet (once or twice) as well as the corporate network. Recent studies have shown that 40% of corporate networks report that the percentage of back-hauled traffic (i.e., of Internet traffic observed in the corporate network) is above 80%. This means that the majority of the corporate traffic is carried over both expensive leased lines and the consumer Internet.

As a consumer-centric service, the Internet itself is a poor medium for business traffic. It lacks the reliability, QoS (quality of service) guarantees and security expected by critical business applications. Moreover, the ever-increasing consumer traffic demands, net-neutrality regulations and the creation of Internet bypasses by major players (e.g., Netflix, Google, public clouds) have lowered the monetary return per traffic unit. These trends have reduced the incentives of service providers to quickly catch up with the consumer demands and offer adequate business services.

Given the growth of public clouds, corporations are migrating more of their compute infrastructure to the public cloud datacenters. Public cloud providers have been at the forefront of compute and networking infrastructure investment. These cloud services have built many datacenters across the world, with Azure, AWS, IBM and Google expanding to 38, 16, 25, and 14 worldwide regions respectively in 2016. Each public cloud provider has interconnected its own datacenters by using expensive high-speed networks that employ dark fiber and undersea cables deployed by submarines.

Today, notwithstanding these changes, corporate network policies often force all corporate traffic to go through their secure WAN gateways. As users become mobile and applications migrate to SaaS and public clouds, corporate WANs become costly detours that slow down all corporate communications. Most corporate WAN's traffic is either sourced from or destined to the Internet. Alternate secure solutions that send this traffic through the Internet are not adequate because of their poor and unreliable performance.

BRIEF SUMMARY

Some embodiments establish for an entity a virtual network over several public cloud datacenters of one or more public cloud providers in one or more regions (e.g., several cities, states, countries, etc.). An example of an entity for which such a virtual network can be established include a business entity (e.g., a corporation), a non-profit entity (e.g., a hospital, a research organization, etc.), and an educational entity (e.g., a university, a college, etc.), or any other type of entity. Examples of public cloud providers include Amazon Web Services (AWS), Google Cloud Platform (GCP), Microsoft Azure, etc.

In some embodiments, high-speed, reliable private networks interconnect two or more of the public cloud datacenters (the public clouds). Some embodiments define the virtual network as an overlay network that spans across several public clouds to interconnect one or more private networks (e.g., networks within branches, divisions, departments of the entity or their associated datacenters), mobile users, SaaS (Software as a Service) provider machines, machines and/or services in the public cloud(s), and other web applications.

The virtual network in some embodiments can be configured to optimize the routing of the entity's data messages to their destinations for best end-to-end performance, reliability and security, while trying to minimize the routing of this traffic through the Internet. Also, the virtual network in some embodiments can be configured to optimize the layer 4 processing of the data message flows passing through the network. For instance, in some embodiments, the virtual network optimizes the end-to-end rate of TCP (Transport Control Protocol) connections by splitting the rate control mechanisms across the connection path.

Some embodiments establish the virtual network by configuring several components that are deployed in several public clouds. These components include in some embodiments software-based measurement agents, software forwarding elements (e.g., software routers, switches, gateways, etc.), layer-4 connection proxies and middlebox service machines (e.g., appliances, VMs, containers, etc.). One or more of these components in some embodiments use standardized or commonly available solutions, such as Open vSwitch, OpenVPN, strongSwan, and Ryu.

Some embodiments utilize a logically centralized controller cluster (e.g., a set of one or more controller servers) that configures the public-cloud components to implement the virtual network over several public clouds. In some embodiments, the controllers in this cluster are at various different locations (e.g., are in different public cloud datacenters) in order to improve redundancy and high availability. The controller cluster in some embodiments scales up or down the number of public cloud components that are used to establish the virtual network, or the compute or network resources allocated to these components.

Some embodiments establish different virtual networks for different entities over the same set of public clouds of the same public cloud providers and/or over different sets of public clouds of the same or different public cloud providers. In some embodiments, a virtual network provider provides software and services that allow different tenants to define different virtual networks over the same or different public clouds. In some embodiments, the same controller cluster or different controller clusters can be used to configure the public cloud components to implement different virtual networks over the same or different sets of public clouds for several different entities.

To deploy a virtual network for a tenant over one or more public clouds, the controller cluster (1) identifies possible ingress and egress routers for entering and exiting the virtual network for the tenant based on locations of the tenant's branch offices, datacenters, mobile users, and SaaS providers, and (2) identifies routes that traverse from the identified ingress routers to the identified egress routers through other intermediate public-cloud routers that implement the virtual network. After identifying these routes, the controller cluster propagates these routes to the forwarding tables of the virtual network routers in the public cloud(s). In the embodiments that use OVS-based virtual network routers, the controller distributes the routes by using OpenFlow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 1C alternatively illustrates an example of two virtual networks, with one network deployed over public clouds and the other virtual network deployed over another pair of public clouds.

FIG. 7 illustrates an example of the two encapsulating headers of some embodiments, while

FIG. 18 presents an example that illustrates the source port translation of the ingress NAT engine.

FIG. 19 illustrates the processing of a reply message that a SaaS machine sends in response to its processing of a data message of FIG. 18.

DETAILED DESCRIPTION

Figure 1A:
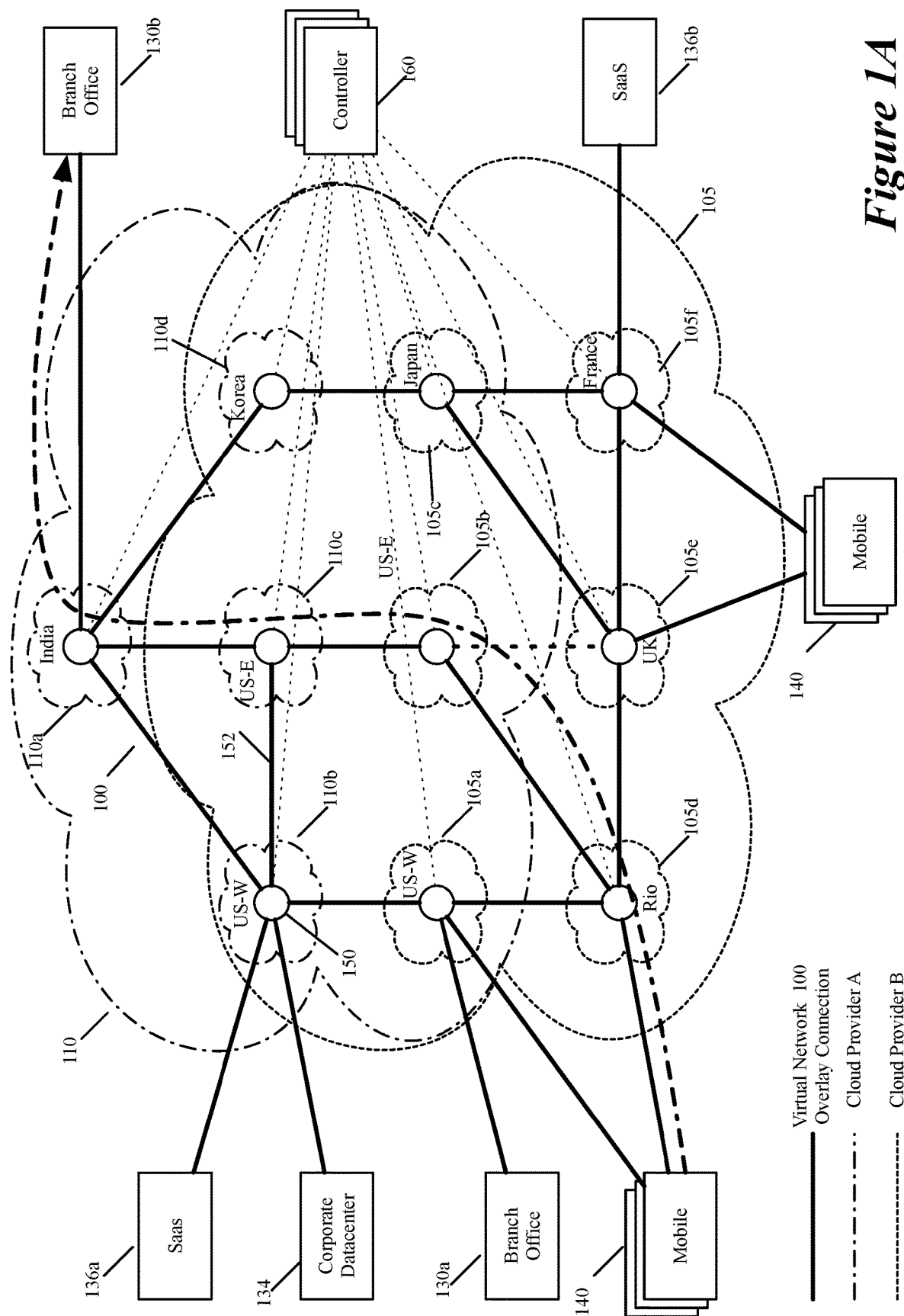
FIG. 1A presents a virtual network that is defined for a corporation over several public cloud datacenters of two public cloud providers.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments establish for an entity a virtual network over several public cloud datacenters of one or more public cloud providers in one or more regions (e.g., several cities, states, countries, etc.). An example of an entity for which such a virtual network can be established include a business entity (e.g., a corporation), a non-profit entity (e.g., a hospital, a research organization, etc.), and an educational entity (e.g., a university, a college, etc.), or any other type of entity. Examples of public cloud providers include Amazon Web Services (AWS), Google Cloud Platform (GCP), Microsoft Azure, etc.

Some embodiments define the virtual network as an overlay network that spans across several public cloud datacenters (public clouds) to interconnect one or more private networks (e.g., networks within branches, divisions, departments of the entity or their associated datacenters), mobile users, SaaS (Software as a Service) provider machines, machines and/or services in the public cloud(s), and other web applications. In some embodiments, high-speed, reliable private networks interconnect two or more of the public cloud datacenters.

The virtual network in some embodiments can be configured to optimize the routing of the entity's data messages to their destinations for best end-to-end performance, reliability and security, while trying to minimize the routing of this traffic through the Internet. Also, the virtual network in some embodiments can be configured to optimize the layer 4 processing of the data message flows passing through the network. For instance, in some embodiments, the virtual network optimizes the end-to-end rate of TCP (Transport Control Protocol) connections by splitting the rate control mechanisms across the connection path.

Some embodiments establish the virtual network by configuring several components that are deployed in several public clouds. These components include in some embodiments software-based measurement agents, software forwarding elements (e.g., software routers, switches, gateways, etc.), layer-4 connection proxies and middlebox service machines (e.g., appliances, VMs, containers, etc.).

Some embodiments utilize a logically centralized controller cluster (e.g., a set of one or more controller servers) that configures the public-cloud components to implement the virtual network over several public clouds. In some embodiments, the controllers in this cluster are at various different locations (e.g., are in different public cloud datacenters) in order to improve redundancy and high availability. When different controllers in the controller cluster are located in different public cloud datacenters, the controllers in some embodiments share their state (e.g., the configuration data that they generate to identify tenants, routes through the virtual networks, etc.). The controller cluster in some embodiments scales up or down the number of public cloud components that are used to establish the virtual network, or the compute or network resources allocated to these components.

Some embodiments establish different virtual networks for different entities over the same set of public clouds of the same public cloud providers and/or over different sets of public clouds of the same or different public cloud providers. In some embodiments, a virtual network provider provides software and services that allow different tenants to define different virtual networks over the same or different public clouds. In some embodiments, the same controller cluster or different controller clusters can be used to configure the public cloud components to implement different virtual networks over the same or different sets of public clouds for several different entities.

Several examples of corporate virtual networks are provided in the discussion below. However, one of ordinary skill will realize that some embodiments define virtual networks for other types of entities, such as other business entities, non-profit organizations, educational entities, etc. Also, as used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1A presents a virtual network 100 that is defined for a corporation over several public cloud datacenters 105 and 110 of two public cloud providers A and B. As shown, the virtual network 100 is a secure overlay network that is established by deploying different managed forwarding nodes 150 in different public clouds and connecting the managed forwarding nodes (MFNs) to each other through overlay tunnels 152. In some embodiments, an MFN is a conceptual grouping of several different components in a public cloud datacenter that with other MFNs (with other groups of components) in other public cloud datacenters establish one or more overlay virtual networks for one or more entities.

As further described below, the group of components that form an MFN include in some embodiments (1) one or more VPN gateways for establishing VPN connections with an entity's compute nodes (e.g., offices, private datacenters, remote users, etc.) that are external machine locations outside of the public cloud datacenters, (2) one or more forwarding elements for forwarding encapsulated data messages between each other in order to define an overlay virtual network over the shared public cloud network fabric, (3) one or more service machines for performing middlebox service operations as well as L4-L7 optimizations, and (4) one or more measurement agents for obtaining measurements regarding the network connection quality between the public cloud datacenters in order to identify desired paths through the public cloud datacenters. In some embodiments, different MFNs can have different arrangements and different numbers of such components, and one MFN can have different numbers of such components for redundancy and scalability reasons.

Also, in some embodiments, each MFN's group of components execute on different computers in the MFN's public cloud datacenter. In some embodiments, several or all of an MFN's components can execute on one computer of a public cloud datacenter. The components of an MFN in some embodiments execute on host computers that also execute other machines of other tenants. These other machines can be other machines of other MFNs of other tenants, or they can be unrelated machines of other tenants (e.g., compute VMs or containers).

The virtual network 100 in some embodiments is deployed by a virtual network provider (VNP) that deploys different virtual networks over the same or different public cloud datacenters for different entities (e.g., different corporate customers/tenants of the virtual network provider). The virtual network provider in some embodiments is the entity that deploys the MFNs and provides the controller cluster for configuring and managing these MFNs.

The virtual network 100 connects the corporate compute endpoints (such as datacenters, branch offices and mobile users) to each other and to external services (e.g., public web services, or SaaS services such as Office365 or Salesforce) that reside in the public cloud or reside in private datacenter accessible through the Internet. This virtual network leverages the different locations of the different public clouds to connect different corporate compute endpoints (e.g., different private networks and/or different mobile users of the corporation) to the public clouds in their vicinity. Corporate compute endpoints are also referred to as corporate compute nodes in the discussion below.

In some embodiments, the virtual network 100 also leverages the high-speed networks that interconnect these public clouds to forward data messages through the public clouds to their destinations or to get as close to their destinations while reducing their traversal through the Internet. When the corporate compute endpoints are outside of public cloud datacenters over which the virtual network spans, these endpoints are referred to as external machine locations. This is the case for corporate branch offices, private datacenters and devices of remote users.

In the example illustrated in FIG. 1A, the virtual network 100 spans six datacenters 105a-105f of the public cloud provider A and four datacenters 110a-110d of the public cloud provider B. In spanning these public clouds, this virtual network connects several branch offices, corporate datacenters, SaaS providers and mobile users of the corporate tenant that are located in different geographic regions. Specifically, the virtual network 100 connects two branch offices 130a and 130b in two different cities (e.g., San Francisco, Calif., and Pune, India), a corporate datacenter 134 in another city (e.g., Seattle, Wash.), two SaaS provider datacenters 136a and 136b in another two cities (Redmond, Wash., and Paris, France), and mobile users 140 at various locations in the world. As such, this virtual network can be viewed as a virtual corporate WAN.

In some embodiments, the branch offices 130a and 130b have their own private networks (e.g., local area networks) that connect computers at the branch locations and branch private datacenters that are outside of public clouds. Similarly, the corporate datacenter 134 in some embodiments has its own private network and resides outside of any public cloud datacenter. In other embodiments, however, the corporate datacenter 134 or the datacenter of the branch 130a and 130b can be within a public cloud, but the virtual network does not span this public cloud, as the corporate or branch datacenter connects to the edge of the virtual network 100.

As mentioned above, the virtual network 100 is established by connecting different deployed managed forwarding nodes 150 in different public clouds through overlay tunnels 152. Each managed forwarding node 150 includes several configurable components. As further described above and further described below, the MFN components include in some embodiments software-based measurement agents, software forwarding elements (e.g., software routers, switches, gateways, etc.), layer 4 proxies (e.g., TCP proxies) and middlebox service machines (e.g., VMs, containers, etc.). One or more of these components in some embodiments use standardized or commonly available solutions, such as Open vSwitch, OpenVPN, strongSwan, etc.

In some embodiments, each MFN (i.e., the group of components the conceptually forms an MFN) can be shared by different tenants of the virtual network provider that deploys and configures the MFNs in the public cloud datacenters. Conjunctively, or alternatively, the virtual network provider in some embodiments can deploy a unique set of MFNs in one or more public cloud datacenters for a particular tenant. For instance, a particular tenant might not wish to share MFN resources with another tenant for security reasons or quality of service reasons. For such a tenant, the virtual network provider can deploy its own set of MFNs across several public cloud datacenters.

In some embodiments, a logically centralized controller cluster 160 (e.g., a set of one or more controller servers) operate inside or outside of one or more of the public clouds 105 and 110, and configure the public-cloud components of the managed forwarding nodes 150 to implement the virtual network over the public clouds 105 and 110. In some embodiments, the controllers in this cluster are at various different locations (e.g., are in different public cloud datacenters) in order to improve redundancy and high availability. The controller cluster in some embodiments scales up or down the number of public cloud components that are used to establish the virtual network, or the compute or network resources allocated to these components.

Figure 1B:
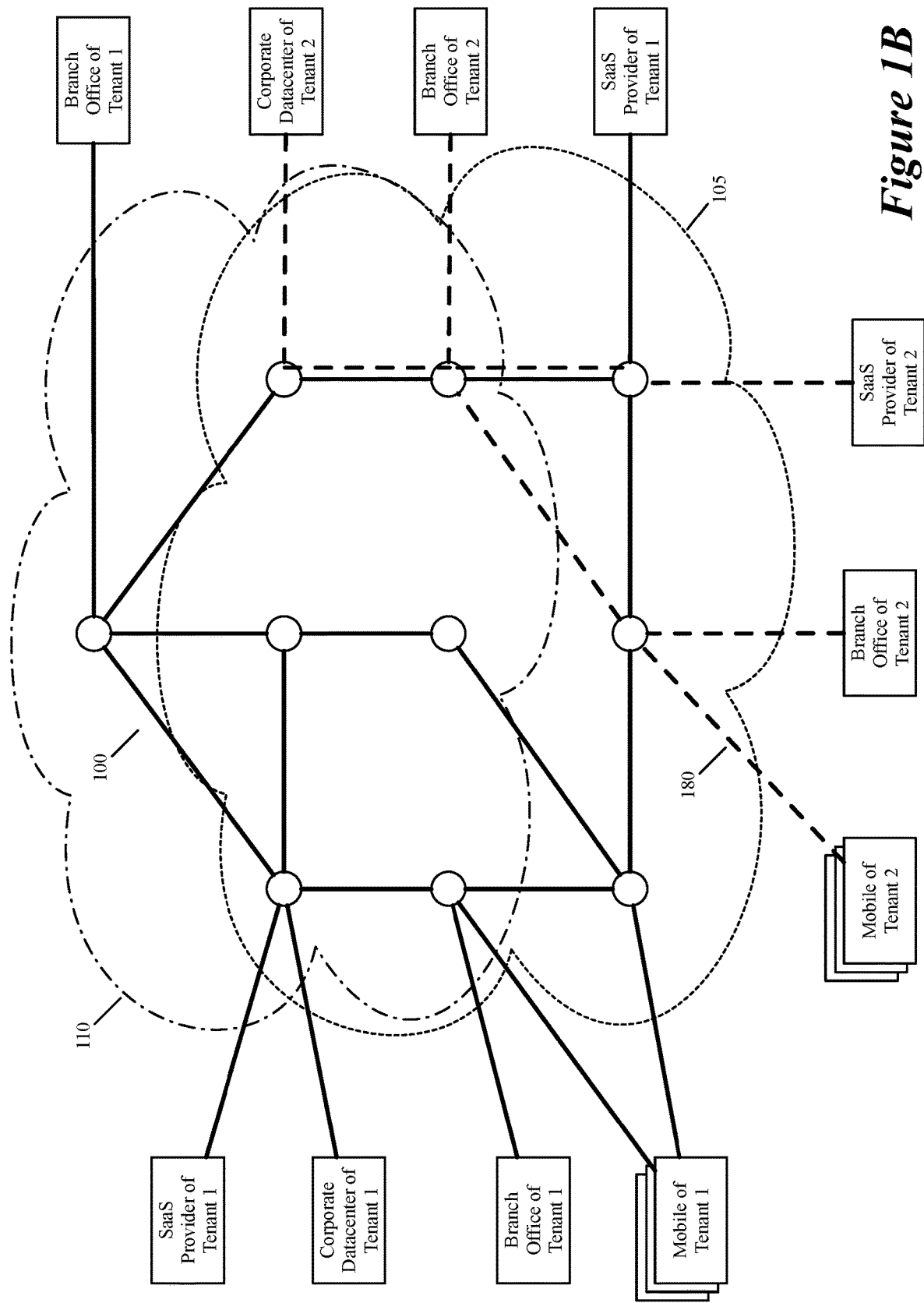
FIG. 1B illustrates an example of two virtual networks for two corporate tenants that are deployed over the public clouds.

In some embodiments, the controller cluster 160, or another controller cluster of the virtual network provider, establishes a different virtual network for another corporate tenant over the same public clouds 105 and 110, and/or over different public clouds of different public cloud providers. In addition to the controller cluster(s), the virtual network provider in other embodiments deploys forwarding elements and service machines in the public clouds that allow different tenants to deploy different virtual networks over the same or different public clouds. FIG. 1B illustrates an example of two virtual networks 100 and 180 for two corporate tenants that are deployed over the public clouds 105 and 110. FIG. 1C alternatively illustrates an example of two virtual networks 100 and 182, with one network 100 deployed over public clouds 105 and 110 and the other virtual network 182 deployed over another pair of public clouds 110 and 115.

Through the configured components of the MFNs, the virtual network 100 of FIG. 1A allows different private networks and/or different mobile users of the corporate tenant to connect to different public clouds that are in optimal locations (e.g., as measured in terms of physical distance, in terms of connection speed, loss, delay and/or cost, and/or in terms of network connection reliability, etc.) with respect to these private networks and/or mobile users. These components also allow the virtual network 100 in some embodiments to use the high-speed networks that interconnect the public clouds to forward data messages through the public clouds to their destinations while reducing their traversal through the Internet.

In some embodiments, the MFN components are also configured to run novel processes at the network, transport and application layers to optimize the end-to-end performance, reliability and security. In some embodiments, one or more of these processes implement proprietary high-performance networking protocols, free from the current network protocol ossification. As such, the virtual network 100 in some embodiments is not confined by Internet autonomous systems, routing protocols, or even end-to-end transport mechanisms.

For example, in some embodiments, the components of the MFNs 150 (1) create optimized, multi-path and adaptive centralized routing, (2) provide strong QoS (Quality of Service) guarantees, (3) optimize end-to-end TCP rates through intermediate TCP splitting and/or termination, and (4) relocate scalable application-level middlebox services (e.g., firewalls, intrusion detection systems (IDS), intrusion prevention system (IPS), WAN optimization, etc.) to the compute part of the cloud in a global network function virtualization (NFV). Accordingly, the virtual network can be optimized to fit customized and changing demands of the corporation without being bound to existing network protocol. Also, in some embodiments, the virtual network can be configured as a "pay as you go" infrastructure that can be dynamically and elastically scaled up and down both in performance capability and in geographical span according to the continuous requirement changes.

Figure 2:
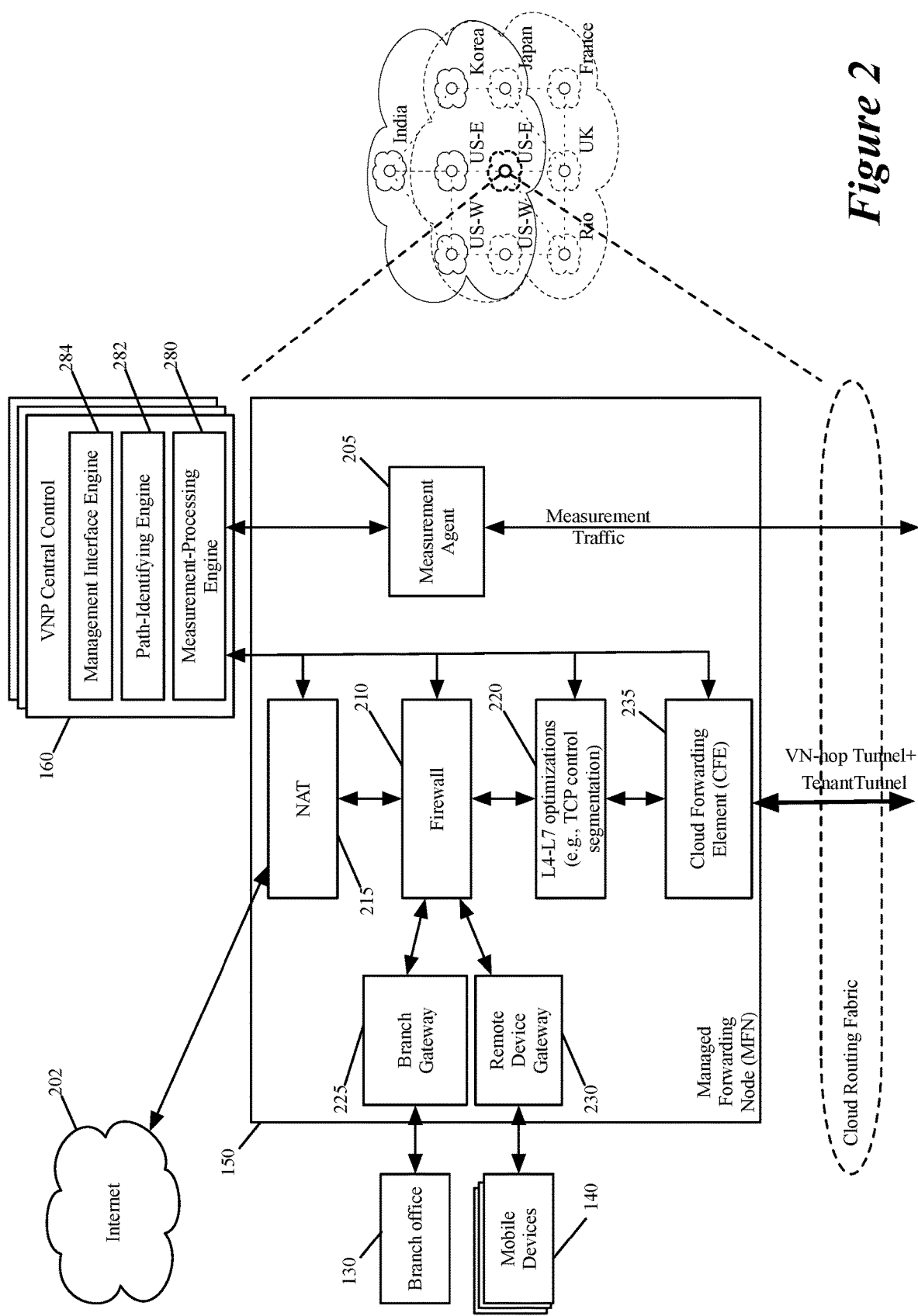
FIG. 2 illustrates an example of a managed forwarding node and a controller cluster of some embodiments of the invention.

To implement the virtual network 100, at least one managed forwarding node 150 in each public cloud datacenter 105a-105f and 110a-110d spanned by the virtual network has to be configured by the set of controllers. FIG. 2 illustrates an example of a managed forwarding node 150 and a controller cluster 160 of some embodiments of the invention. In some embodiments, each managed forwarding node 150 is a machine (e.g., a VM or container) that executes on a host computer in a public cloud datacenter. In other embodiments, each managed forwarding node 150 is implemented by multiple machines (e.g., multiple VMs or containers) that execute on the same host computer in one public cloud datacenter. In still other embodiments, two or more components of one MFN can be implemented by two or more machines executing on two or more host computers in one or more public cloud datacenters.

As shown, the managed forwarding node 150 includes a measurement agent 205, firewall and NAT middlebox service engines 210 and 215, one or more optimization engines 220, edge gateways 225 and 230, and a cloud forwarding element 235 (e.g., a cloud router). In some embodiments, each of these components 205-235 can be implemented as a cluster of two or more components.

The controller cluster 160 in some embodiments can dynamically scale up or down each component cluster (1) to add or remove machines (e.g., VMs or containers) to implement each component's functionality and/or (2) to add or remove compute and/or network resources to the previously deployed machines that implement that cluster's components. As such, each deployed MFN 150 in a public cloud datacenter can be viewed as a cluster of MFNs, or it can be viewed as a node that includes multiple different component clusters that perform different operations of the MFN.

Also, in some embodiments, the controller cluster deploys different sets of MFNs in the public cloud datacenters for different tenants for which the controller cluster defines virtual networks over the public cloud datacenters. In this approach, the virtual networks of any two tenants do not share any MFN. However, in the embodiments described below, each MFN can be used to implement different virtual networks for different tenants. One of ordinary skill will realize that in other embodiments the controller cluster 160 can implement the virtual network of each tenant of a first set of tenants with its own dedicated set of deployed MFNs, while implementing the virtual network of each tenant of a second set of tenants with a shared set of deployed MFNs.

In some embodiments, the branch gateway 225 and remote device gateway 230 establish secure VPN connections respectively with one or more branch offices 130 and remote devices (e.g., mobile devices 140) that connect to the MFN 150, as shown in FIG. 2. One example of such VPN connections are IPsec connections, which will be further described below. However, one of ordinary skill will realize that in other embodiments, such gateways 225 and/or 230 establish different types of VPN connections.

An MFN 150 in some embodiments includes one or more middlebox engines that perform one or more middlebox service operations, such are firewall operations, NAT operations, IPS operations, IDS operations, load balancing operations, WAN optimization operations, etc. By incorporating these middlebox operations (e.g., firewall operations, WAN optimization operations, etc.) in the MFNs that are deployed in the public cloud, the virtual network 100 implements in the public cloud much of the functions that are traditionally performed by the corporate WAN infrastructure at a corporation's datacenter(s) and/or branch office(s).

Accordingly, for many of the middlebox services, the corporate compute nodes (e.g., remote devices, branch offices and datacenters) no longer have to access the corporate WAN infrastructure of the corporation in a private datacenter or branch office, as much of these services are now deployed in the public clouds. This approach speeds up the access of the corporate compute nodes (e.g., remote devices, branch offices and datacenters) to these services, and avoids costly congested-network bottlenecks at private datacenters that would otherwise be dedicated to offering such services.

This approach effectively distributes the WAN gateway functionality to various MFNs in the public cloud datacenters. For instance, in the virtual network 100 of some embodiments, most or all of the traditional corporate WAN gateway security functions (e.g., firewall operations, intrusion detection operations, intrusion prevention operations, etc.) are moved to the public cloud MFNs (e.g., ingress MFNs at which data from compute endpoints is received into the virtual network). This effectively allows the virtual network 100 to have a distributed WAN gateway that is implemented at many different MFNs that implement the virtual network 100.

In the example illustrated in FIG. 2, the MFN 150 is shown to include the firewall engine 210, the NAT engine 215 and one or more L4-L7 optimization engines. One of ordinary skill will realize that in other embodiments, the MFN 150 includes other middlebox engines for performing other middlebox operations. In some embodiments, the firewall engine 210 enforces firewall rules on (1) data message flows on their ingress paths into the virtual network (e.g., on data message flows that the gateways 225 and 230 receives and process from branch offices 130 and mobile devices 140) and (2) data messages flows on their egress paths out of the virtual network (e.g., on data message flows that are sent to SaaS provider datacenters through the NAT engine 215 and the Internet 202).

The firewall engine 210 of the MFN 150 in some embodiments also enforces firewall rules when the firewall engine belongs to an MFN that is an intermediate hop between an ingress MFN at which a data message flow enters a virtual network and an egress MFN at which the data message flow exits the virtual network. In other embodiments, the firewall engine 210 only enforces firewall rules when it is part of a data message flow's ingress MFN and/or egress MFN.

In some embodiments, the NAT engine 215 performs a network address translation to change the source network addresses of data message flows on their egress paths out of the virtual network to third party devices (e.g., to SaaS provider machines) through the Internet 202. Such network address translations ensure that third-party machines (e.g., SaaS machines) can be properly configured to process the data message flows that without the address translations might specify private network addresses of the tenants and/or the public cloud providers. This is particularly problematic as private network addresses of different tenants and/or cloud providers might overlap. The address translation also ensures that the reply messages from the third party devices (e.g., the SaaS machines) can be properly received by the virtual network (e.g., by the MFN NAT engine from which the message exited the virtual network).

The NAT engines 215 of the MFNs in some embodiments perform double-NAT operations on each data message flow that leaves the virtual network to reach a third party machine, or that enters the virtual network from a third party machine. As further described below, one NAT operation in the two NAT operations is performed on such a data message flow at its ingress MFN when it enters the virtual network, while the other NAT operation is performed on the data message flow at its egress MFN when it exits the virtual network.

This double NAT approach allows more tenant private networks to be mapped to the networks of the public cloud providers. This approach also reduces the load for distributing to the MFNs data regarding changes to tenant private networks. Before the ingress or egress NAT operations, some embodiments perform a tenant mapping operation that uses the tenant identifier to first map the tenant's source network address to another source network address that is then mapped to yet another source network address by the NAT operation. Performing the double NAT operation reduces the data distribution load for distributing data regarding changes to the tenant private networks.

The optimization engine 220 executes novel processes that optimize the forwarding of the entity's data messages to their destinations for best end-to-end performance and reliability. Some of these processes implement proprietary high-performance networking protocols, free from the current network protocol ossification. For example, in some embodiments, the optimization engine 220 optimizes end-to-end TCP rates through intermediate TCP splitting and/or termination.

The cloud forwarding element 235 is the MFN engine that is responsible for forwarding a data message flow to the next hop MFN's cloud forwarding element (CFE) when the data message flow has to traverse to another public cloud to reach its destination, or to an egress router in the same public cloud when the data message flow can reach its destination through the same public cloud. In some embodiments, the CFE 235 of the MFN 150 is a software router.

To forward the data messages, the CFE encapsulates the messages with tunnel headers. Different embodiments use different approaches to encapsulate the data messages with tunnel headers. Some embodiments described below use one tunnel header to identify network ingress/egress addresses for entering and exiting the virtual network, and use another tunnel header to identify next hop MFNs when a data message has to traverse one or more intermediate MFN to reach the egress MFN.

Specifically, in some embodiments, the CFE sends the data message with two tunnel headers (1) an inner header that identifies an ingress CFE and egress CFE for entering and exiting the virtual network, and (2) an outer header that identifies the next hop CFE. The inner tunnel header in some embodiments also includes a tenant identifier (TID) in order to allow multiple different tenants of the virtual network provider to use a common set of MFN CFEs of the virtual network provider. Other embodiments define tunnel headers differently in order to define the overlay virtual network.

To deploy a virtual network for a tenant over one or more public clouds, the controller cluster (1) identifies possible ingress and egress routers for entering and exiting the virtual network for the tenant based on locations of the tenant's corporate compute nodes (e.g., branch offices, datacenters, mobile users and SaaS providers), and (2) identifies routes that traverse from the identified ingress routers to the identified egress routers through other intermediate public-cloud routers that implement the virtual network. After identifying these routes, the controller cluster propagates these routes to the forwarding tables of the MFN CFEs 235 in the public cloud(s). In the embodiments that use OVS-based virtual network routers, the controller distributes the routes by using OpenFlow.

In some embodiments, the controller cluster 160 can also configure the components 205-235 of each MFN 150 that implements the virtual network to optimize several network processing layers in order to achieve best end-to-end performance, reliability and security. For example, in some embodiments, these components are configured (1) to optimize layer3 traffic routing (e.g., shortest path, packet duplication), (2) to optimize layer 4 TCP congestion control (e.g., segmentation, rate control), (3) to implement security features (e.g., encryption, deep packet inspection, firewall), and (4) to implement application-layer compression features (e.g., de-duplication, caching). Within the virtual network, corporate traffic is secured, inspected and logged.

In some embodiments, one measurement agent is deployed for each MFN in a public cloud datacenter. In other embodiments, multiple MFNs in a public cloud datacenter or in a collection of datacenters (e.g., in a collection of nearby, associated datacenters, such as datacenters in one availability zone) share one measurement agent. To optimize the layers 3 and 4 processing, the measurement agent 205 associated with each managed forwarding node 150 repeatedly generates measurement values that quantify the quality of the network connection between its node and each of several other "neighboring" nodes.

Different embodiments define neighboring nodes differently. For a particular MFN in one public cloud datacenter of a particular public cloud provider, a neighboring node in some embodiments includes (1) any other MFN that operates in any public cloud datacenter of the particular public cloud provider, and (2) any other MFN that operates in another public cloud provider's datacenter that is within the same "region" as the particular MFN.

Different embodiments define the same region differently. For instance, some embodiments define a region in terms of a distance that specifies a bounding shape around the particular managed forwarding node. Other embodiments define regions in terms of cities, states, or regional areas, such as northern California, southern California, etc. The assumption of this approach is that different datacenters of the same public cloud provider are connected with very high-speed network connections, while the network connections between the datacenters of different public cloud providers are likely fast when the datacenters are within the same region but likely not as fast when the datacenters are in different regions. The connection between the datacenters of different public cloud providers might have to traverse long distances through the public Internet when the datacenters are in different regions.

The measurement agent 205 generates measurement values differently in different embodiments. In some embodiments, the measurement agent sends pinging messages (e.g., UDP echo messages) periodically (e.g., once every second, every N seconds, every minute, every M minutes, etc.) to each of the measurement agents of its neighboring managed forwarding nodes. Given the small size of the pinging messages, they do not result in large network connection charges. For instance, for 100 nodes with each node sending a ping to each other node every 10 seconds, about 10 Kb/s of ingress and egress measurement traffic is generated for each node, and this leads to network consumption charges of a few dollars (e.g., $5) per node per year, given the current public cloud prices.

Based on the speed of the reply messages that it receives, the measurement agent 205 computes and updates measurement metric values, such as network-connection throughput speed, delay, loss, and link reliability. By repeatedly doing these operations, the measurement agent 205 defines and updates a matrix of measurement results that expresses the quality of network connections to its neighboring nodes. As the agent 205 interacts with the measurement agents of its neighboring nodes, its measurement matrix only quantifies the quality of the connections to its local clique of nodes.

The measurement agents of the different managed forwarding nodes send their measurement matrices to the controller cluster 160, which then aggregates all different clique connection data to obtain an aggregate mesh view of the connections between different pairs of managed forwarding nodes. When the controller cluster 160 collects different measurements for a link between two pairs of forwarding nodes (e.g., measurements taken by one node at different times), the controller cluster produces a blended value from the different measurements (e.g., produces an average or a weighted average of the measurements). The aggregate mesh view in some embodiments is a full mesh view of all the network connections between each pair of managed forwarding nodes, while in other embodiments it is a more complete view than the one produced by the measurement agents of the individual managed forwarding nodes.

As shown in FIG. 2, the controller cluster 160 includes a cluster of one or more measurement-processing engines 280, one or more path-identifying engines 282, and one or more management interfaces 284. In order not to obscure the description with unnecessary detail, each of these clusters will be referred to below in terms of singular engine or interface layers, i.e., in terms of a measurement-processing layer 280, a path-identifying layer 282, and a management interface layer 284.

The measurement-processing layer 280 receives the measurement matrices from the measurement agents 205 of the managed forwarding nodes and processes these measurements matrices to produce the aggregate mesh matrix that expresses the connection quality between different pairs of managed forwarding nodes. The measurement-processing layer 280 provides the aggregate mesh matrix to the path-identifying layer 282. Based on the aggregate mesh matrix, the path-identifying layer 282 identifies different desired routing paths through the virtual network for connecting different corporate data endpoints (e.g., different branch offices, corporate datacenters, SaaS provider datacenters and/or remote devices). This layer 282 then provides these routing paths in route tables that are distributed to the cloud forwarding elements 235 of the managed forwarding nodes 150.

In some embodiments, the identified routing path for each pair of data message endpoints is a routing path that is deemed optimal based on a set of optimization criteria, e.g., it is the fastest routing path, the shortest routing path, or the path that least uses the Internet. In other embodiments, the path-identifying engine can identify and provide (in the routing table) multiple different routing paths between the same two endpoints. In these embodiments, the cloud forwarding elements 235 of the managed forwarding nodes 150 then select one of the paths based on QoS criteria or other runtime criteria that they are enforcing. Each CFE 235 in some embodiments does not receive the entire routing path from the CFE to the egress point of the virtual network, but rather receives the next hop for the path.

Figure 3:
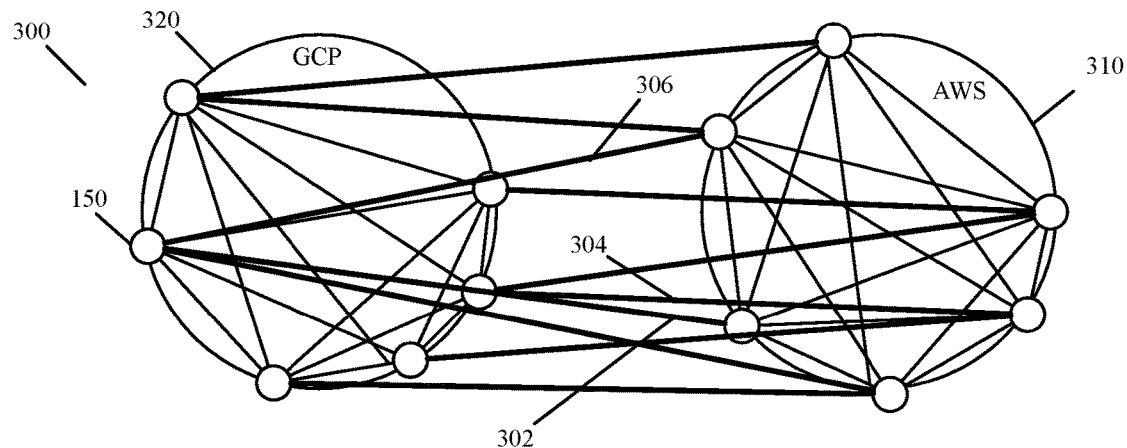
FIG. 3 illustrates an example of a measurement graph that the controller measurement-processing layer produces in some embodiments.
Figure 4A:
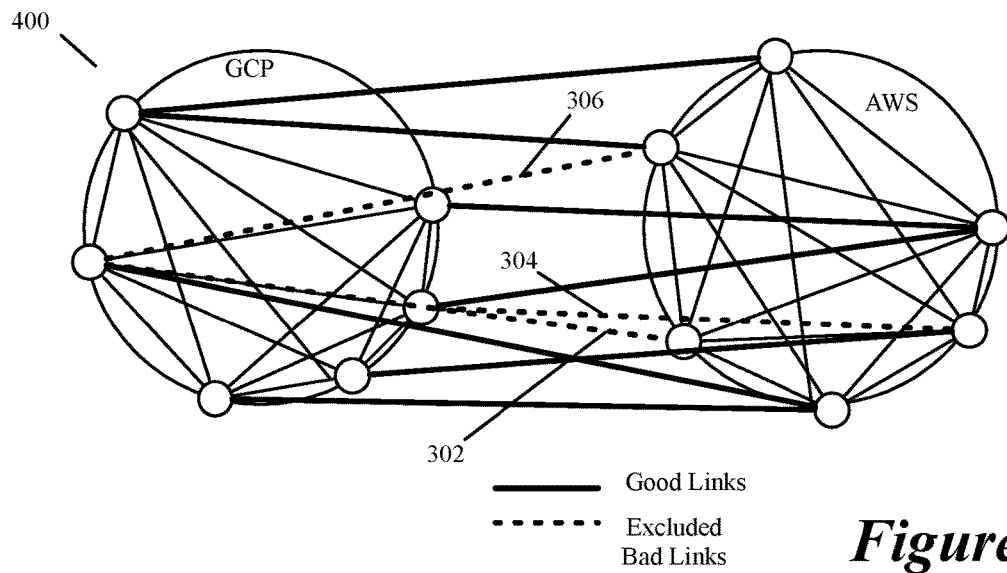
FIG. 4A illustrates an example of a routing graph that the controller path-identifying layer produces in some embodiments from the measurement graph.

In some embodiments, the path-identifying layer 282 uses the measurement values in the aggregate mesh matrix as inputs to routing algorithms that it executes to construct a global routing graph. This global routing graph is an aggregated and optimized version of a measurement graph that the measurement-processing layer 280 produces in some embodiments. FIG. 3 illustrates an example of a measurement graph 300 that the controller measurement-processing layer 280 produces in some embodiments. This graph depicts network connections between various managed forwarding nodes 150 in AWS and GCP public clouds 310 and 320 (i.e., in the datacenters of AWS and GCP). FIG. 4A illustrates an example of a routing graph 400 that the controller path-identifying layer 282 produces in some embodiments from the measurement graph 300.

Figure 5:
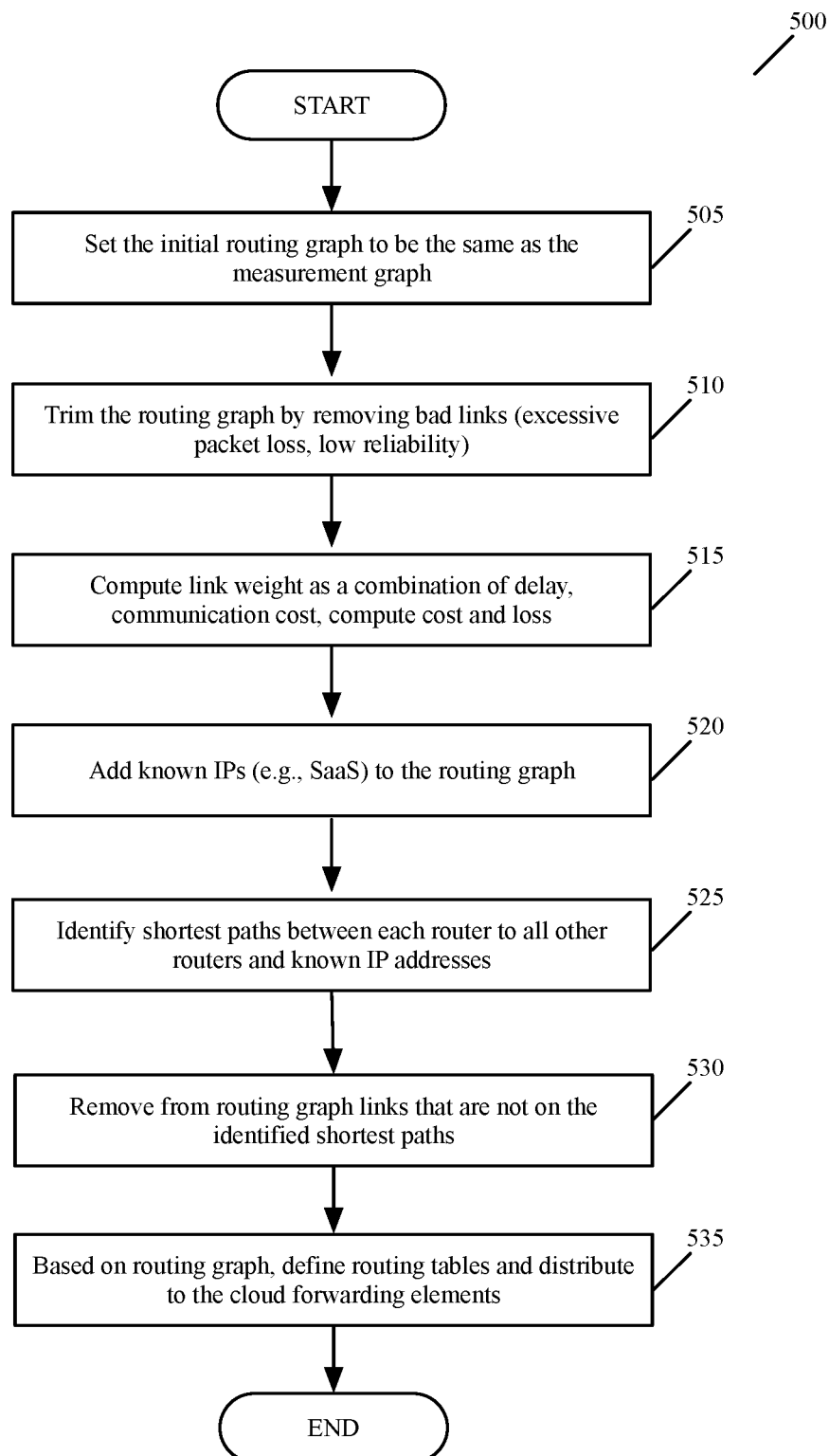
FIG. 5 illustrates a process that the controller path-identifying layer uses to generate a routing graph from a measurement graph received from the controller measurement layer.

FIG. 5 illustrates a process 500 that the controller path-identifying layer uses to generate a routing graph from a measurement graph received from the controller measurement layer. The path-identifying layer 282 performs this process 500 repeatedly as it repeatedly receives updated measurement graphs from the controller measurement layer (e.g., performs the process 500 each time that it receives a new measurement graph, or each $N^{th}$ time that it receives a new measurement graph). In other embodiments, the path-identifying layer 282 performs this process periodically (e.g., once every 12 hours or 24 hours).

As shown, the path-identifying layer initially defines (at 505) the routing graph to be identical to the measurement graph (i.e., to have the same links between the same pairs of managed forwarding nodes). At 510, the process removes bad links from the measurement graph 300. Examples of bad links are links with excessive message loss or poor reliability (e.g., links with greater than 2% message loss in last 15 minutes, or with message loss greater than 10% in the last 2 minute). FIG. 4A illustrates that links 302, 304 and 306 in the measurement graph 300 are excluded in the routing graph 400. This figure illustrates the exclusion of these links by depicting these links with dashed lines.

Next, at 515, the process 500 computes a link weight score (cost score) as a weighted combination of several computed and provider-specific values. In some embodiments, the weight score is a weighted combination of the link's (1) computed delay value, (2) computed loss value, (3) provider network-connection cost, and (4) provider compute cost. In some embodiments, the provider compute cost is accounted for as the managed forwarding nodes connected by the link are machines (e.g., VMs or containers) that execute on host computers in the public cloud datacenter(s).

Figure 4B:
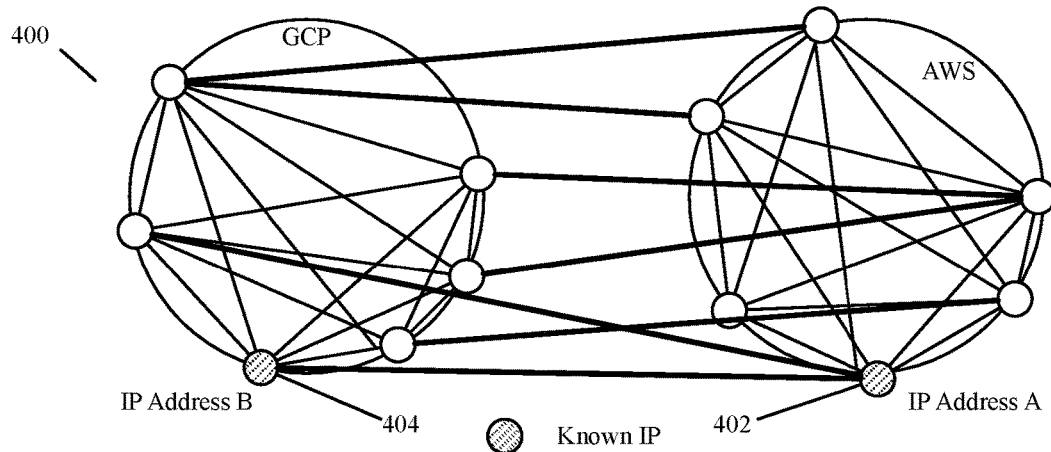
FIG. 4B illustrates an example of adding known IPs for two SaaS providers to the two nodes in the routing graph that are in datacenters that are closest to the datacenters of these SaaS providers.

At 520, the process adds to the routing graph the known source and destination IP addresses (e.g., known IPs of SaaS providers used by the corporate entity) for the data message flows in the virtual network. In some embodiments, the process adds each known IP address of a possible message-flow endpoint to the node (e.g., to the node representing an MFN) in the routing graph that is closest to that end point. In doing so, the process in some embodiments assumes that each such endpoint is connected to the virtual network through a link with a zero delay cost and a zero loss cost. FIG. 4B illustrates an example of adding known IPs for two SaaS providers to the two nodes 402 and 404 (representing two MFNs) in the routing graph that are in datacenters that are closest to the datacenters of these SaaS providers. In this example, one node is in an AWS public cloud, while the other node is in the GCP public cloud.

Alternatively, or conjunctively, the process 500 in some embodiments adds the known source and destination IP addresses to the routing graph by adding nodes to this graph to represent the source and destination endpoints, assigning IP addresses to these nodes, and assigning weight values to the links that connect these added nodes to other nodes in the routing graph (e.g., to nodes in the routing graph that represent MFNs in the public clouds). When the source and destination endpoints for the flows are added as nodes, the path-identifying engine 282 can account for cost (e.g., distance cost, delay cost, and/or financial cost, etc.) of reaching these nodes when it is identifying different routes through the virtual network between different source and destination endpoints.

Figure 4C:
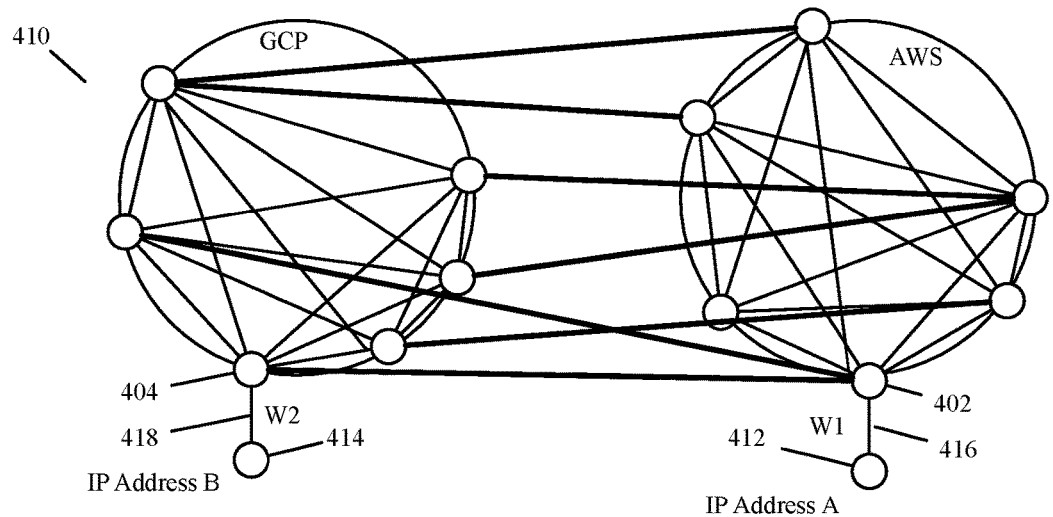
FIG. 4C illustrates a routing graph that is generated by adding two nodes to represent two SaaS providers.

FIG. 4C illustrates a routing graph 410 that is generated by adding two nodes 412 and 414 to the node graph 400 of FIG. 4A in order to represent two SaaS providers. In this example, the known IP addresses are assigned to nodes 412 and 414, and these nodes are connected to nodes 402 and 404 (representing two MFNs) through links 416 and 418 that have weights W1 and W2 assigned to them. This approach is an alternative approach for adding the known IP addresses of the two SaaS providers to the approach illustrated in FIG. 4B.

Figure 4D:
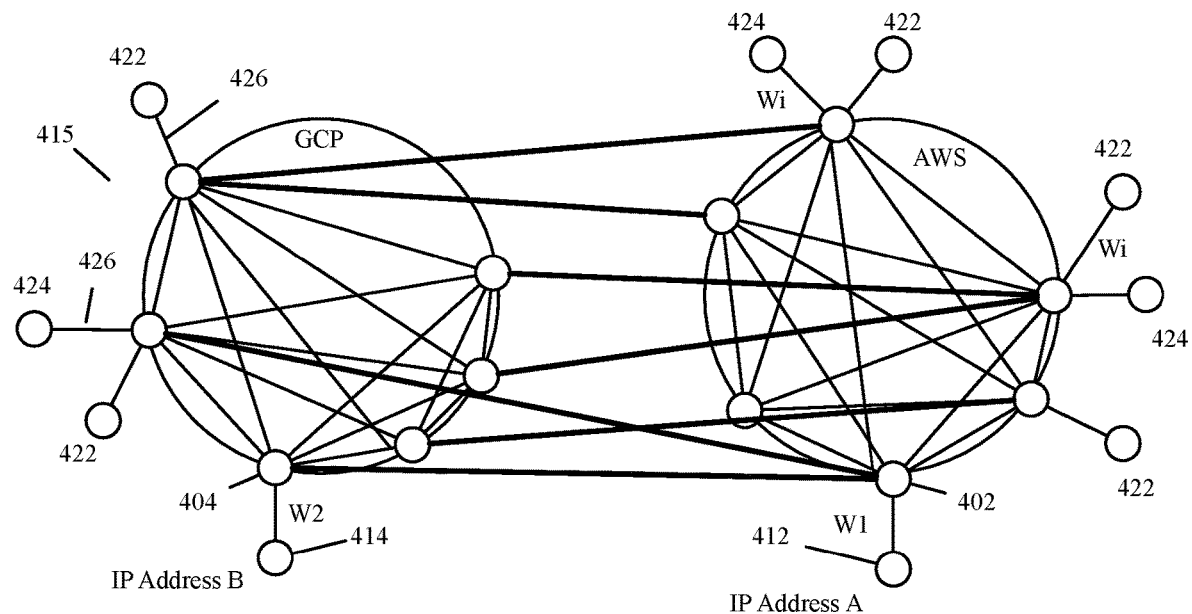
FIG. 4D illustrates a routing graph with additional nodes added to represent branch offices and datacenters with known IP addresses that connect respectively to two public clouds.

FIG. 4D illustrates a more detailed routing graph 415. In this more detailed routing graph, additional nodes 422 and 424 are added to represent external corporate compute nodes (e.g., branch offices and datacenters) with known IP addresses that connect respectively to the AWS and GCP public clouds 310 and 320. Each of these nodes 422/424 is connected by at least one link 426 with an associated weight value Wi to at least one of the routing graph nodes that represents an MFN. Some of these nodes (e.g., some of the branch offices) are connected with multiple links to same MFN or to different MFNs.

Next, at 525, the process 500 compute the lowest cost paths (e.g., shortest paths, etc.) between each MFN and each other MFN that can serve as a virtual network egress location for a data message flow of the corporate entity. The egress MFNs in some embodiments include the MFNs connected to external corporate compute nodes (e.g., branch offices, corporate datacenters, and SaaS provider datacenters) as well as MFNs that are candidate locations for mobile device connections and egress Internet connections. In some embodiments, this computation uses a traditional lowest-cost (e.g., shortest-path) identification process that identifies the shortest paths between different MFN pairs.

For each candidate MFN pair, the lowest-cost identification process uses the computed weight scores (i.e., the scores computed at 510) to identify a path with the lowest score when multiple such paths exist between the MFN pair. Several manners for computing lowest-cost paths will be further described below. As mentioned above, the path-identifying layer 282 identifies multiples paths between two MFN pairs in some embodiments. This is to allow the cloud forwarding elements 235 to use different paths under different circumstances. Accordingly, in these embodiments, the process 500 can identify multiple paths between two MFN pairs.

At 530, the process removes from the routing graph the links between MFN pairs that are not used by any of the lowest-cost paths identified at 525. Next, at 535, the process generates the routing tables for the cloud forwarding elements 235 from the routing graph. At 535, the process distributes these routing tables to the cloud forwarding elements 235 of the managed forwarding nodes. After 535, the process ends.

In some embodiments, the virtual network has two types of external connections, which are: (1) external secure connections with the compute nodes (e.g., branch offices, datacenters, mobile users, etc.) of an entity, and (2) external connections to third party computers (e.g., SaaS provider servers) through the Internet. Some embodiments optimize the virtual network by finding optimal virtual-network ingress and egress locations for each datapath that terminates at source and destination nodes outside of the virtual network. For instance, to connect a branch office to a SaaS provider server (e.g., salesforce.com server), some embodiments connect the branch office to an optimal edge MFN (e.g., the MFN that has the fastest network connection to the branch office or the one that is closest to the branch office), and identify an optimal edge MFN to an optimally located SaaS provider server (e.g., the SaaS that is closest to the edge MFN for the branch office or has the fastest path to the edge MFN for the branch office through the edge MFN connected to the SaaS provider server).

To associate each compute node (e.g., a branch office, a mobile user, etc.) of an entity to the closest MFN through a VPN connection, the virtual network provider in some embodiments deploys one or more authoritative domain name servers (DNS) in the public clouds for the compute nodes to contact. In some embodiments, each time a corporate compute node in some embodiments needs to establish a VPN connection (i.e., to initialize or re-initialize the VPN connection) to an MFN of the virtual network provider, the compute node first resolves an address associated with its virtual network (e.g., virtualnetworkX.net) with this authoritative DNS server in order to obtain from this server the identity of the MFN that this server identifies as the MFN that is closest to the corporate compute node. To identify this MFN, the authoritative DNS server provides an MFN identifier (e.g., the IP address of the MFN) in some embodiments. The corporate compute node then establishes a VPN connection to this managed forwarding node.

In other embodiments, the corporate compute node does not first perform a DNS resolution (i.e., does not first resolve a network address for a particular domain) each time that it needs to establish a VPN connection to an MFN of the VNP. For instance, in some embodiments, the corporate compute node sticks with a DNS-resolved MFN for a particular duration (e.g., for a day, a week, etc.) before performing another DNS resolution to determine whether this MFN is still an optimal one to which is should connect.

When the source IP address in the DNS request is that of the local DNS server of the corporate compute node, and not of the node itself, the authoritative DNS server in some embodiments identifies the MFN closest to the local DNS server instead of the MFN closest to the corporate compute node. To address this, the DNS request in some embodiments identifies the corporate compute node in terms of a domain name that includes one or more parts (labels) that are concatenated and delimited by dots, where one of these parts identifies the corporation and the other part identifies the compute node of the corporation.

In some embodiments, this domain name specifies a hierarchy of domains and sub-domains that descends from the right label to the left label in the domain name. The right-most first label identifies the particular domain, a second label to the left of the first label identifies the corporate entity, and a third label to the left of the second label identifies the external machine location of the entity in cases where the entity has more than one external machine location. For instance, in some embodiments, the DNS request identifies the corporate compute node as myNode of company myCompany, and asks for the resolution of the address myNode.myCompany.virtualnetwork.net. The DNS server then uses the myNode identifier to better select the ingress MFN to which the corporate compute node should establish a VPN connection. In different embodiments, the myNode identifier is expressed differently. For example, it may be addressed as an IP address, a latitude/longitude description of a location, a GPS (Global Positioning System) location, a street address, etc.

Even when the IP address properly reflects the location, there may be several potential ingress routers, e.g., belonging to different datacenters in the same cloud or to different clouds in the same region. In such a case, the virtual network authoritative server in some embodiments sends back a list of IPs of potential MFN CFEs (e.g., C5, C8, C12). The corporate compute node in some embodiments then pings the different CFEs in the list, to produce measurements (e.g., distance or speed measurements), and selects the closest one by comparing measurements among the set of CFE candidates.

In addition, the corporate compute node may base this selection by identifying the MFNs currently used by the other compute nodes of the corporate entity. For example, in some embodiments, the corporate compute node adds connection costs to each MFN, so that if many of the corporate branches are already connected to a given cloud, new compute nodes would have an incentive to connect to the same cloud, thus minimizing inter-cloud costs in terms of processing, latency, and dollars.

Other embodiments use other DNS resolution techniques. For instance, each time a corporate compute node (e.g., a branch office, datacenter, a mobile user, etc.) needs to perform a DNS resolution, the corporate compute node (e.g., the mobile device or a local DNS resolver at a branch office or datacenter) communicates with a DNS service provider that serves as an authoritative DNS resolver for a number of entities. In some embodiments, this DNS service provider has DNS resolving machines located in one or more private datacenters, while in other embodiments it is part of one or more public cloud datacenters.

To identify which of N managed forwarding nodes that connect directly to the Internet should be used to reach a SaaS provider server, the virtual network (e.g., the ingress MFN or the controller cluster that configures the MFNs) in some embodiments identifies a set of one or more candidate edge MFNs from the N managed forwarding nodes. As described further below, each candidate edge MFN in some embodiments is an edge MFN that is deemed to be optimal based on a set of criteria, such as distance to SaaS provider server, network connection speed, cost, delay and/or loss, network compute cost, etc.

To assist in identifying the optimal edge points, the controller cluster of some embodiments maintains for an entity a list of the most popular SaaS providers and consumer web destinations and their IP address subnets. For each such destination, the controller cluster assigns one or more of the optimal MFNs (again as judged by physical distance, network connection speed, cost, loss and/or delay, compute cost, etc.) as candidate egress nodes. For each candidate egress MFN, the controller cluster then computes the best route from each possible ingress MFN to the candidate MFN, and sets up the resulting next-hop table in the MFNs accordingly, such that the Internet SaaS provider or web destination is associated to the correct virtual network next-hop node.

Given that the service destination can often be reached through several IP subnets at several locations (as provided by the authoritative DNS server), there are several potential egress nodes to minimize latency and provide load-balancing. Accordingly, in some embodiments, the controller cluster computes the best location and egress node for each MFN, and updates the next-hop accordingly. Also, the best egress node to get to a SaaS provider (e.g., office365.com) may be through one public cloud provider (e.g., Microsoft Azure), but the best ingress MFN from purely a distance or connection speed may be in another public cloud provider (e.g., AWS). In such situations, it may not be optimal in terms of latency, processing and cost to traverse to another cloud (i.e., to the public cloud with the best egress MFN) before leaving the virtual network. Providing multiple candidate edge nodes would allow for the selection of an optimal edge MFN and an optimal path to the selected edge MFN in such situations.

To identify the optimal path through the virtual network to an egress MFN that connects to the Internet or connects to a corporate compute node of the corporate entity, the controller cluster identifies optimal routing paths between the MFNs. As mentioned above, the controller cluster in some embodiments identifies the best path between any two MFNs by first costing each link between a pair of directly connected MFNs, e.g., based on a metric score that reflects the weighted sum of estimated latency and financial costs. The latency and financial costs include in some embodiments (1) link delay measurements, (2) estimated message processing latency, (3) cloud charges for outgoing traffic from a particular datacenter either to another datacenter of the same public cloud provider, or to exit the public cloud (PC) provider's cloud (e.g., to another public cloud datacenter of another public cloud provider or to the Internet), and (4) estimated message processing costs associated with the MFNs executing on host computers in the public clouds.

Using the computed costs of these pair-wise links, the controller cluster can compute the cost of each routing path that uses one or more of these pair-wise links by aggregating the costs of the individual pair-wise links that are used by the routing path. As described above, the controller cluster then defines its routing graph based on the computed costs of the routing paths, and generates the forwarding tables of the cloud routers of the MFNs based on the defined routing graphs. Also, as mentioned above, the controller cluster repeatedly performs these costing, graph-building, and forwarding table update and distribution operations periodically (e.g., once every 12 hours, 24 hours, etc.) or as it receives measurement updates from the measurement agents of the MFNs.

Whenever the forwarding table at an MFN CFE $C_i$ points to a next-hop MFN CFE $C_j$, the CFE $C_i$ considers $C_j$ as a neighbor. In some embodiments, the CFE $C_i$ establishes a secure, actively maintained VPN tunnel to CFE $C_j$. A secure tunnel in some embodiments is a tunnel that requires the payloads of the encapsulated data messages to be encrypted. Also, in some embodiments, a tunnel is actively maintained by one or both endpoints of the tunnel sending keep alive signals to the other endpoint.

In other embodiments, the CFEs do not establish secure, actively maintained VPN tunnels. For instance, in some embodiments, the tunnels between the CFEs are static tunnels that are not actively monitored through the transmission of keep-alive signals. Also, in some embodiments, these tunnels between the CFEs do not encrypt their payloads. In some embodiments, the tunnels between pair of CFEs include two encapsulating headers, with the inner header identifying the tenant ID and the ingress and egress CFEs for a data message entering and exiting the virtual network (i.e., entering and exiting the public cloud(s)), and the outer encapsulating header specifying the source and destination network addresses (e.g., IP addresses) for traversing through zero or more CFE from the ingress CFE to the egress CFE.

In addition to internal tunnels, the virtual network in some embodiments connects corporate compute nodes to their edge MFNs using VPN tunnels, as mentioned above. Therefore, in the embodiments where secure tunnels are used to connect the CFEs, the data messages transit through virtual network using an entirely secure VPN path.

As the virtual network data messages are forwarded using encapsulation within the virtual network, the virtual network in some embodiments uses its own unique network addresses that are different than the private addresses used by the different private networks of the tenant. In other embodiments, the virtual network uses the private and public network address spaces of the public clouds over which it is defined. In yet other embodiments, the virtual network uses some of its own unique network addresses for some of its components (e.g., some of its MFNs, CFEs, and/or services), while using the private and public network address spaces of the public clouds for other of its components.

Also, in some embodiments, the virtual network uses a clean-slate communication platform with its own proprietary protocols. In the embodiments in which the data messages are forwarded entirely through software MFN routers (e.g., through software CFEs), the virtual network can provide an optimized rate control for long-haul end-to-end connections. This is accomplished in some embodiments by operating a TCP optimization proxy engine 220 at every MFN 150. In other embodiments that do not break the TCP itself (e.g., with HTTPS), this is accomplished by the proxy engine 220 segmenting the rate control using intermediate per-flow buffering together with TCP receiver-window and ACK manipulation.

Due to its clean-slate nature, the virtual network in some embodiments optimizes many of its components to provide an even better service. For instance, in some embodiments, the virtual network uses multiple-path routing to support premium bandwidth-guaranteed VPN setups that are routed across the virtual network. In some embodiments, such VPNs include state data in each MFN similar to ATM/MPLS routing, and their establishment and removal is centrally controlled. Some embodiments identify the available bandwidth per outgoing link, either by measuring it directly (through packet pair or a similar process) or by having a given capacity for the link and reducing from this capacity the traffic that is already sent through this link.

Some embodiments use the residual bandwidth of a link as a constraint. For instance, when a link does not have at least 2 Mbps of available bandwidth, the controller cluster of some embodiments removes the link from the set of links that are used to compute lowest-cost path (e.g., shortest path) to any destination (e.g., remove the link from the routing graph, such as graph 400). If an end-to-end route is still available after the removal of this link, new VPNs will be routed across this new route. VPN removal can bring back available capacity to a given link, which in turn can enable this link to be included in the lowest-cost path (e.g., shortest path) calculation. Some embodiments use other options for multiple-path routing such as load balancing of traffic across multiple paths, e.g., using MPTCP (multi-path TCP).

Some embodiments provide a better service for premium customers by exploiting the path parallelism and the inexpensive cloud links to duplicate traffic from the ingress MFNs to the egress MFN, through two disjoint paths (e.g., maximally disjoint paths) within the virtual network. Under this approach, the earliest message that arrives is accepted, and the later one discarded. This approach increases the virtual network reliability and reduces the delay, at the cost of increasing the egress processing complexity. In some such embodiments, Forward Error Correction (FEC) techniques are used to increase reliability while reducing the duplication traffic. Due to its clean-slate nature, the virtual network of some embodiments performs other upper-layer optimizations, such as application-layer optimizations (e.g., de-duplication and caching operations) and security optimizations (e.g., the addition of encryption, DPI (deep packet inspection) and firewalling).

The virtual network of some embodiments accounts for collaboration with cloud providers, to further improve the virtual network setup by using anycast messaging. For instance, in some embodiments when all MFNs obtain the same external IP address, it is easier to connect any new corporate compute node to an optimal edge node (e.g., the closest edge node) using an anycast connection. Likewise, any SaaS provider can obtain this IP address and connect to the optimal MFN (e.g., closest MFN).

Figure 6:
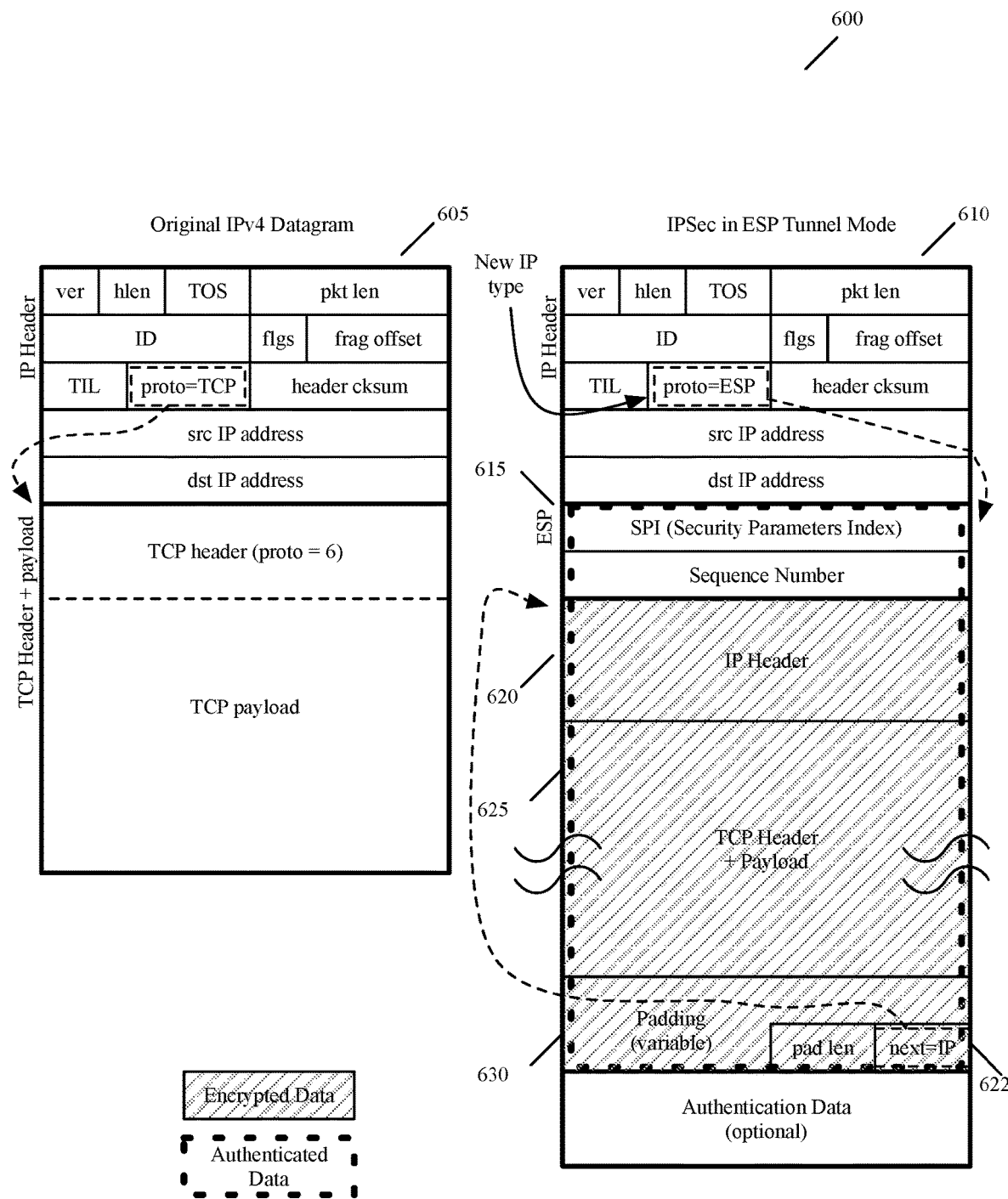
FIG. 6 illustrates the IPsec data message format of some embodiments.

As mentioned above, different embodiments use different types of VPN connections to connect corporate compute nodes (e.g., branches and mobile devices) to the MFNs that establish the virtual network of a corporate entity. Some embodiments use IPsec to set up these VPN connections. FIG. 6 illustrates the IPsec data message format of some embodiments. Specifically, this figure illustrates an original format of a data message 605 generated by a machine at the corporate compute node, and an IPsec encapsulated data message 610 after the data message 605 has been encapsulated (e.g., at the corporate compute node or the MFN) for transmission through an IPsec tunnel (e.g., to the MFN or to the corporate compute node).

In this example, the IPsec tunnel is set up with ESP Tunnel Mode, port 50. As shown, this mode is set up in this example by replacing the TCP protocol identifier in the IP header with an ESP protocol identifier. The ESP header identifies the start of the message 615 (i.e., the header 620 and payload 625). The message 615 has to be authenticated by the recipient of the IPsec encapsulated data message (e.g., by the IPsec gateway of the MFN). The start of the payload 625 is identified by the value of the next field 622 of the message 615. Also, the payload 625 is encrypted. This payload includes the IP header, the TCP header and payload of the original data message 605, as well as a padding field 630, which includes the next field 622.

In some embodiments, each MFN IPsec gateway can handle multiple IPsec connections for the same or different virtual network tenants (e.g., for the same corporation or for different corporations). Accordingly, an MFN IPsec gateway (e.g., gateway 230) in some embodiments identifies each IPsec connection in terms of a tunnel ID, a tenant ID (TID), and a corporate compute node subnet. In some embodiments, different corporate nodes (e.g., different branch offices) of a tenant do not have overlapping IP subnets (per RFC 1579). The IPsec gateway in some embodiments has a table mapping each IPsec tunnel ID (which is contained in the IPsec tunnel header) to a tenant ID. For a given tenant that an IPsec gateway is configured to handle, the IPsec gateway also has a mapping of all subnets of that tenant that connect to the virtual network established by the MFNs and their cloud forwarding elements.

When an ingress first MFN in a first public cloud datacenter receives through an IPsec tunnel a data message associated with a tenant ID and destined to a destination (e.g., a branch or datacenter subnet, or a SaaS provider) that connects to an egress second MFN in a second public cloud datacenter, the IPsec gateway of the first MFN removes the IPsec tunnel header. In some embodiments, the CFE of the first MFN then encapsulates the message with two encapsulating headers that allow the message to traverse a path from the ingress first MFN to the egress second MFN, directly or through one or more other intermediate MFNs. The CFE of the first MFN identifies this path by using its controller-configured routing table.

As mentioned above, the two encapsulating headers in some embodiments include (1) an outer header that specifies the next hop MFN CFE to allow the encapsulated data message to traverse through the MFNs of the virtual network to reach the egress MFN CFE, and (2) an inner header that specifies the tenant ID and the ingress and egress MFN CFEs that identify the MFNs for the data message entering and exiting the virtual network.

Specifically, in some embodiments, the inner encapsulating header includes a valid IP header with the destination IP address of the egress second MFN's CFE and the source IP address of the ingress first MFN's CFE. This approach allows standard IP router software to be used in every CFE of the MFNs. The encapsulation further includes the tenant ID (e.g., a customer CID). When a message arrives at the egress second MFN's CFE, it is decapsulated and sent by the second MFN to its destination (e.g., sent by the second MFN's IPsec gateway to the destination via another IPsec tunnel that is associated with the tenant ID and the destination subnet of the message).

Certain cloud providers prohibit machines from "spoofing" source IP, and/or impose other restrictions for TCP and UDP traffic. To deal with such possible restrictions, some embodiments use the outer header to connect neighboring pairs of MFNs that are used by one or more routes. This header in some embodiments is a UDP header that specifies source and destination IP addresses and the UDP protocol parameters. In some embodiments, the ingress MFN CFE specifies its IP address as the source IP address of the outer header, while specifying the next MFN CFE hop's IP address as the destination IP address of the outer header.

When the path to the egress MFN's CFE includes one or more intermediate MFN CFEs, an intermediate CFE replaces the source IP address in the outer header of the double-encapsulated message that it receives with its IP address. It also uses the destination IP address in the inner header to perform a route lookup in its routing table to identify the destination IP address of the next hop MFN CFE that is on the path to the destination IP address of the inner header. The intermediate CFE then replaces the destination IP address in the outer header with the IP address that it identified through its route table lookup.

When the double encapsulated data message reaches the egress MFN's CFE, the CFE determines that it is the egress node for the data message when it retrieves the destination IP address in the inner header and determines that this destination IP address belongs to it. This CFE then removes the two encapsulating headers from the data message and then sends it to it destination (e.g., through its MFN's IPsec gateway to the destination via another IPsec tunnel that is associated with the tenant ID and the destination IP address or subnet in the data message's original header).

Figure 7:
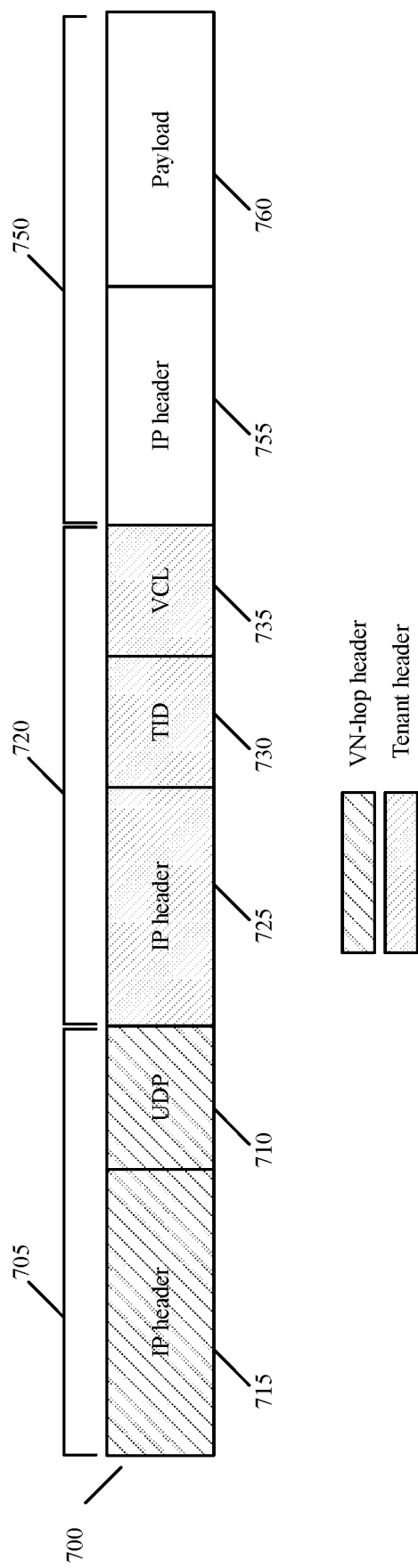
Figure 8:
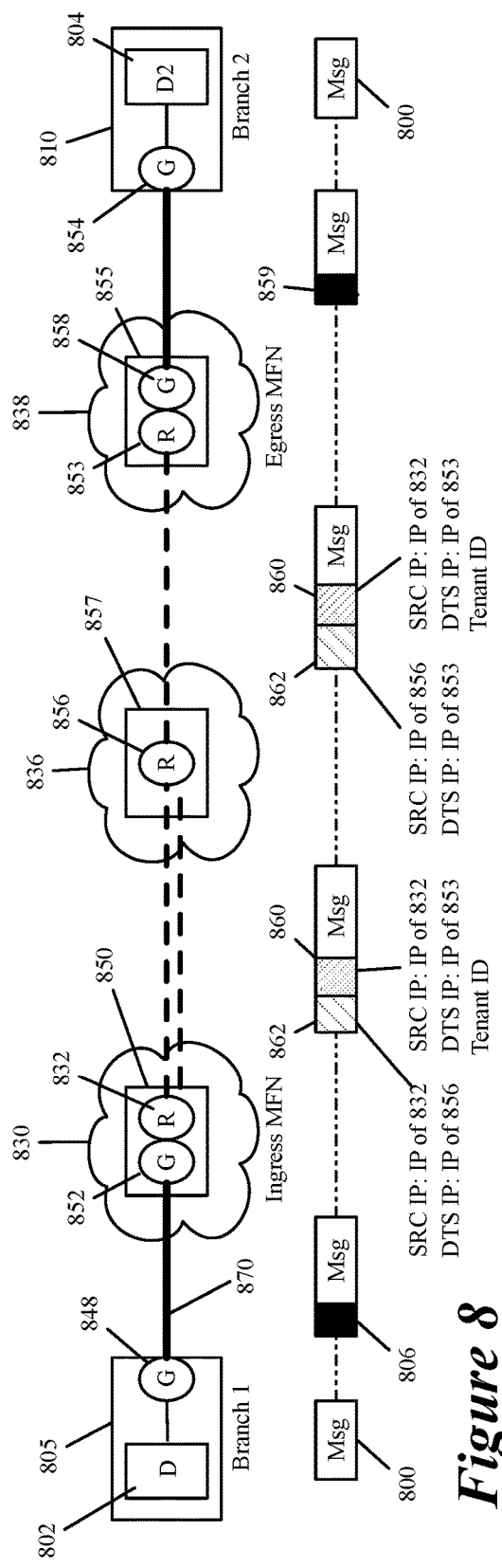
FIG. 8 presents an example that illustrates how these two headers are used in some embodiments.

FIG. 7 illustrates an example of the two encapsulating headers of some embodiments, while FIG. 8 presents an example that illustrates how these two headers are used in some embodiments. In the discussion below, the inner header is referred to as the tenant header as it includes the tenant ID along with the identity of the virtual-network ingress/egress nodes connected to the tenant's corporate compute end nodes. The outer header is referred to below as the VN-hop tunnel header because it is used to identify the next hop through the virtual network as the data message traverses a path through the virtual network between ingress and egress MFN CFEs.

FIG. 7 shows a VN-hop tunnel header 705 and a tenant tunnel header 720 encapsulating an original data message 750 with an original header 755 and a payload 760. As shown, the VN-hop tunnel header 705 in some embodiments includes a UDP header 710 and an IP header 715. The UDP header in some embodiments is defined according to a UDP protocol. In some embodiments, the VN-hop tunnel is a standard UDP tunnel, while in other embodiments, this tunnel is a proprietary UDP tunnel. In still other embodiments, this tunnel is a standard or proprietary TCP tunnel. The tunnel header 705 in some embodiments is an encrypted one that encrypts its payload, while in other embodiments it is an unencrypted tunnel.

As further described below, the tunnel header 705 in some embodiments is used to define an overlay VNP network, and is used by each MFN CFE to reach the next hop MFN CFE over the underlay public cloud networks. As such, the IP header 715 of the tunnel header 705 identifies the source and destination IP addresses of the first and second CFEs of the first and second neighboring MFNs connected by the VNP tunnel. In some cases (e.g., when the next hop destination MFN is in a different public cloud of a different public cloud vendor than the source MFN), the source and destination IP addresses are public IP addresses that are used by the public cloud datacenters that include the MFNs. In other cases, when the source and destination MFN CFEs belong to the same public cloud, the source and destination IP addresses can be private IP addresses that are used in just the public cloud. Alternatively, in such cases, the source and destination IP addresses might still be public IP addresses of the public cloud vendor.

As shown in FIG. 7, the tenant tunnel header 720 includes an IP header 725, a tenant ID field 730 and a virtual circuit label (VCL) 735. The tenant tunnel header 720 is used by each hop CFE after the ingress hop CFE to identify the next hop for forwarding the data message to the egress CFE of the egress MFN. As such, the IP header 725 includes a source IP address that is the IP address of the ingress CFE and a destination IP address that is the IP address of the egress CFE. As with the source and destination IP addresses of the VN-hop header 705, the source and destination IP addresses of the tenant header 720 can be either private IP addresses of one public cloud provider (when the data message traverses a route that only goes through one public cloud provider's datacenter), or public IP addresses of one or more public cloud providers (e.g., when the data message traverses a route that goes through datacenters of two or more public cloud providers).

The IP header of the tenant header 720 can be routed by using any standard software router and IP routing table in some embodiments. The tenant ID field 730 contains the tenant ID, which is a unique tenant identifier that can be used at the ingress and egress MFNs to uniquely identify a tenant. The virtual network provider in some embodiments defines different tenant IDs for different corporate entities that are tenants of the provider. The VCL field 735 is an optional routing field that some embodiments use to provide an alternative way (non-IP based way) for forwarding messages through the network. In some embodiments, the tenant tunnel header 720 is a GUE (Generic UDP Encapsulation) header.

FIG. 8 presents an example that illustrates how these two tunnel headers 705 and 710 are used in some embodiments. In this example, a data messages 800 is sent from a first machine 802 (e.g., first VM) in a first branch office 805 of a company to a second machine 804 (e.g., a second VM) in a second branch office 810 of the company. The two machines are in two different subnets, which are 10.1.0.0 and 10.2.0.0, with the first machine having an IP address 10.1.0.17 and the second machine having an IP address 10.2.0.22. In this example, the first branch 805 connects to an ingress MFN 850 in a first public cloud datacenter 830, while the second branch 810 connects to an egress MFN 855 in a second public cloud datacenter 838. Also, in this example, the ingress and egress MFNs 850 and 855 of the first and second public cloud datacenters are indirectly connected through an intermediate MFN 857 of a third public cloud datacenter 836.

As shown, the data message 800 from machine 802 is sent to the ingress MFN 850 along an IPsec tunnel 870 that connects the first branch office 805 to the ingress MFN 850. This IPsec tunnel 870 is established between an IPsec gateway 848 of the first branch office and an IPsec gateway 852 of the ingress MFN 850. This tunnel is established by encapsulating the data message 800 with an IPsec tunnel header 806.

The IPsec gateway 852 of the MFN 850 decapsulates the data message (i.e., removes the IPsec tunnel header 806), and passes the decapsulated message to this MFN's CFE 832 directly or through one or more middlebox service machines (e.g., through a firewall machine, such as machine 210 of FIG. 2). In passing this message, the IPsec gateway or some other module of the MFN 850 in some embodiments associates the message with the tunnel ID of the IPsec tunnel and a tenant ID of the company. This tenant ID identifies the company in the records of the virtual network provider.

Based on the associated tenant ID and/or the IPsec tunnel ID, the CFE 832 of the ingress MFN 850 identifies a route for the message to its destination machine's subnet (i.e., to the second branch office 810) through the virtual network that is established by the MFNs in the different public cloud datacenters. For instance, the CFE 832 uses the tenant ID and/or the IPsec tunnel ID to identify the routing table for the company. In this routing table, the CFE 832 then uses the destination IP address 10.2.0.22 of the received message to identify a record that identifies the CFE 853 of the egress MFN 855 of the public cloud datacenter 838 as the destination egress forwarding node for the data message 800. In some embodiments, the identified record maps the entire subnet 10.2.0.0/16 of the second branch office 810 to the CFE 853 of the MFN 855.

After identifying the egress CFE 853, the CFE 832 of the ingress MFN 850 encapsulates the received data message with a tenant tunnel header 860 that in its IP header 725 includes the source IP of the ingress CFE 832 and the destination IP of the egress CFE 853. In some embodiments, these IP addresses are defined in the public IP address space. The tunnel header 860 also includes the tenant ID that was associated with the data message at ingress MFN 850. As mentioned above, this tunnel header also includes the VCL header value in some embodiments.

In some embodiments, the ingress CFE 832 also identifies the next hop MFN that is on the desired CFE routing path to the egress CFE 853. In some embodiments, the ingress CFE 832 identifies this next hop CFE in its routing table by using the destination IP address of the egress CFE 853. The next hop MFN CFE in this example is the CFE 856 of the third MFN 857 of a third public cloud datacenter 836.

After identifying the next hop MFN CFE, the ingress MFN CFE encapsulates the encapsulated data message 800 with a VN-hop, second tunnel header 862. This tunnel header allows the message to route to the next hop CFE 856. In the IP header 715 of this outer header 862, ingress MFN CFE 832 specifies the source and destination IP addresses as the source IP of the ingress CFE 832 and the destination IP of the intermediate CFE 856. It also specifies its layer 4 protocol as being UDP in some embodiments.

When the CFE 856 of the third MFN 857 receives the double-encapsulated data message, it removes the VN-hop, second tunnel header 862, and the extracts from the tenant header 860 the destination IP address of the CFE 853 of the egress MFN 855. Since this IP address is not associated with the CFE 856, the data message still has to traverse to another MFN to reach its destination. Accordingly, the CFE 856 uses the extracted destination IP address to identify a record in its routing table that identifies the next hop MFN CFE 853. It then changes re-encapsulates the data message with the outer header 705 and specifies the source and destination IP addresses in its IP header 715 as its own IP address and the destination IP address of the MFN CFE 853. Next, the CFE 856 forwards the double-encapsulated data message 800 to the egress CFE 853 through intervening routing fabric of the public cloud datacenters 836 and 838.

After receiving the encapsulated data message, the egress CFE 853 determines that the encapsulated message is directed to it when it retrieves the destination IP address in the inner header 860 and determines that this destination IP address belongs to it. The egress CFE 853 removes both encapsulating headers 860 and 862 from the data message 800, and extracts the destination IP address in the data message's original header. This destination IP address identifies the IP address of the second machine 804 in the second branch office's subnet.

Using the tenant ID in the removed tenant tunnel header 860, the egress CFE 853 identifies the correct routing table to search, and then searches this routing table based on the destination IP address extracted from the original header value of the received data message. From this search, the egress CFE 853 identifies a record that identifies the IPsec connection to use to forward the data message to its destination. It then provides the data message along with the IPsec connection identifier to the second MFN's IPsec gateway 858, which then encapsulates this message with an IPsec tunnel header 859 and then forwards it to an IPsec gateway 854 of the second branch office 810. The gateway 854 then removes the IPsec tunnel header and forwards the data message to its destination machine 804.

Several more detailed message-processing examples will now be described by reference to FIGS. 9-15. In these examples, it is assumed that each tenant IPsec interface is on the same local public IP address, as are the VNP tunnels. As such, the interfaces in some embodiments are attached to a single VRF (virtual routing and forwarding) namespace. This VRF namespace is referred to below as the VNP namespace.

Figure 9:
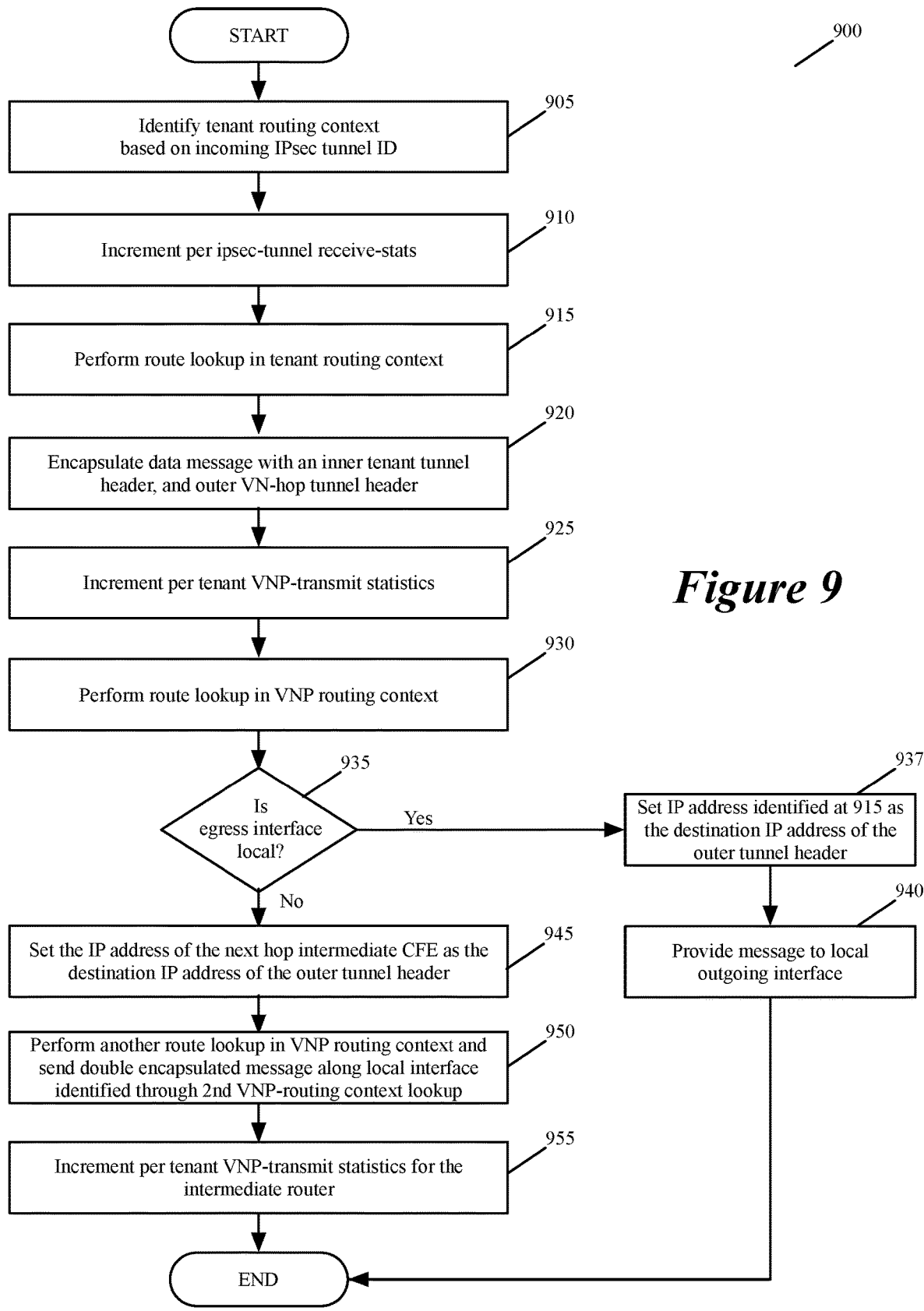
FIGS. 9-11 illustrate message-handling processes that are performed respectively by the ingress, intermediate, and egress MFNs when they receive a message that is sent between two compute devices in two different branch offices.
Figure 10:
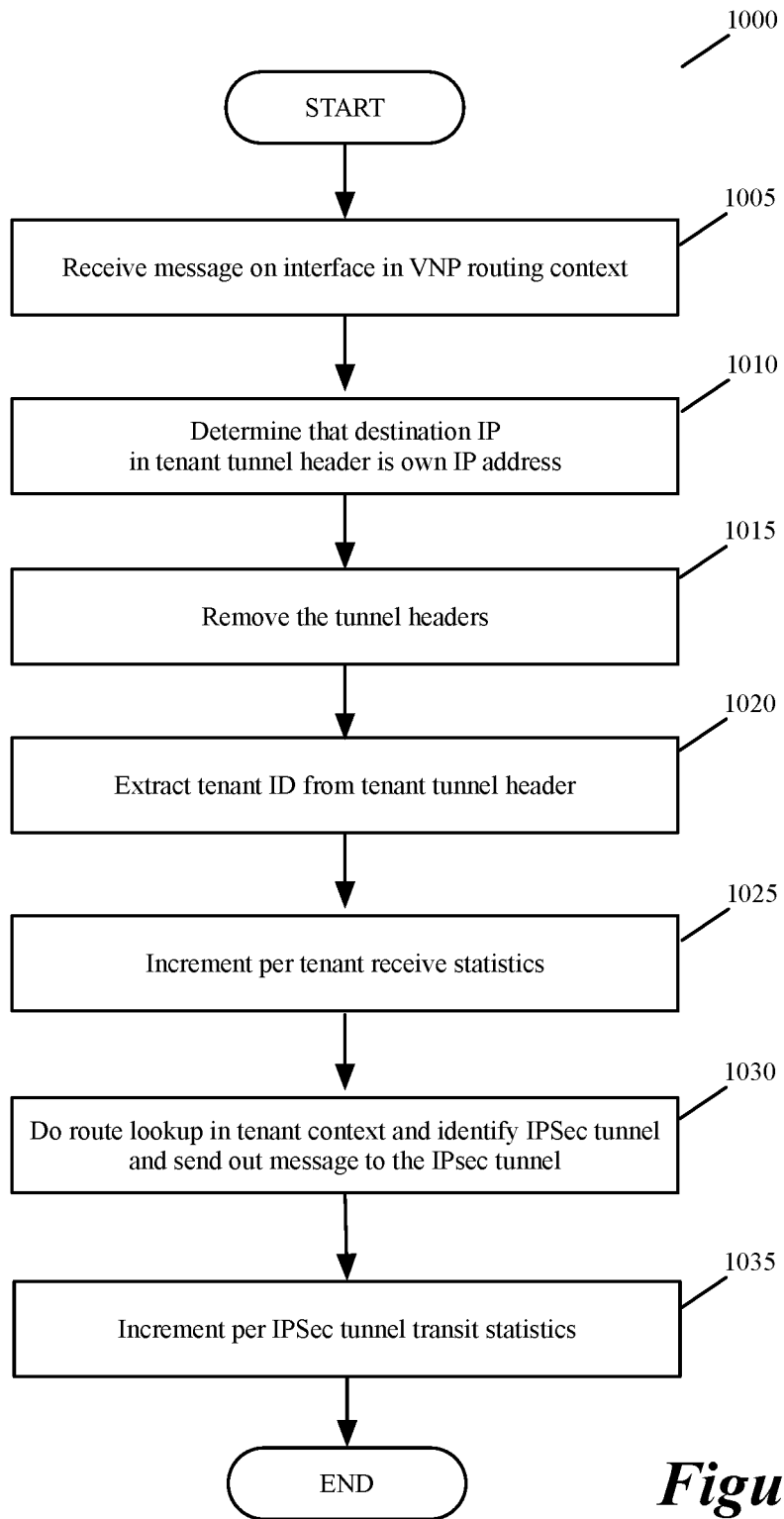
Figure 11:
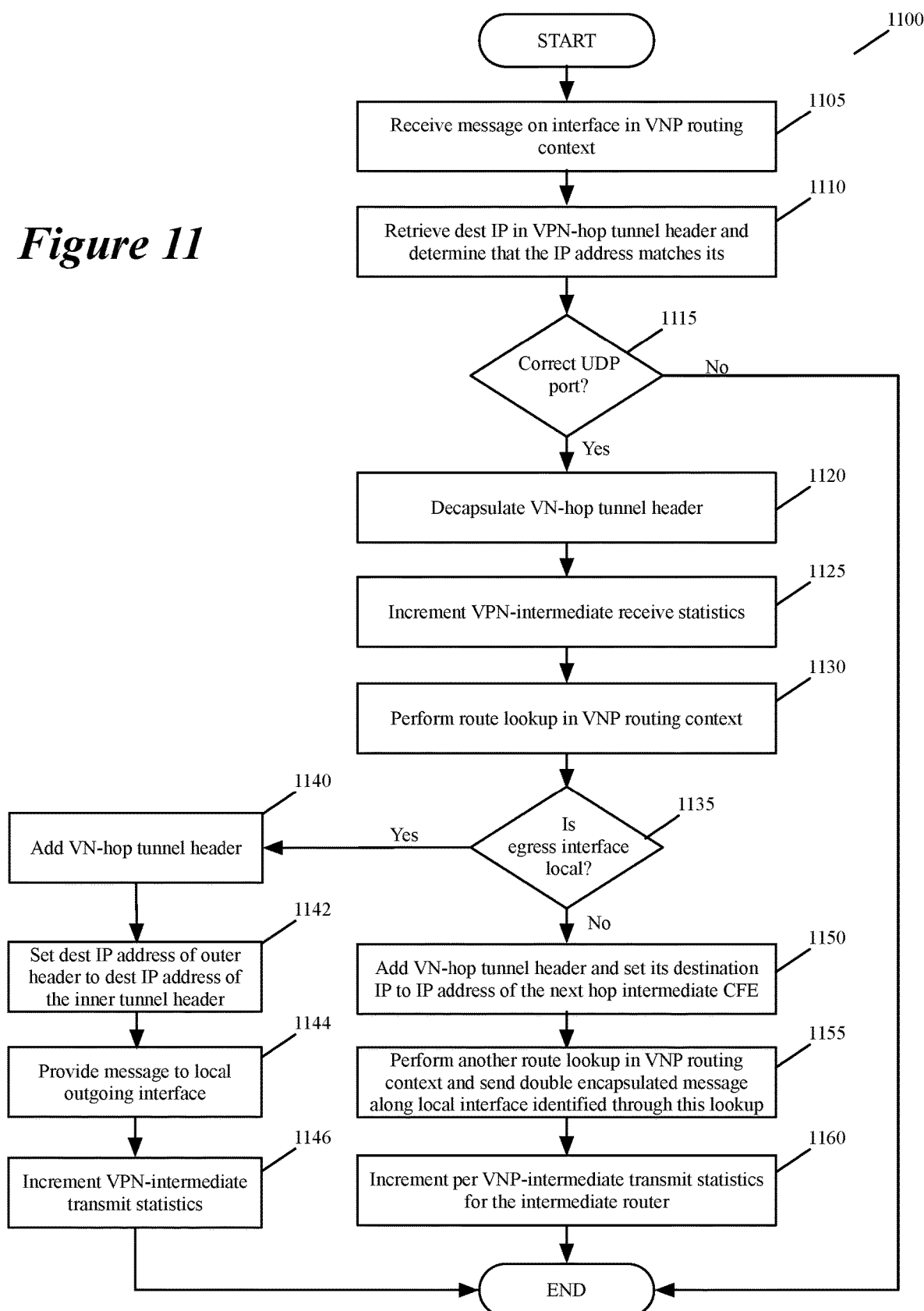

FIGS. 9-11 illustrate message-handling processes 900-1100 that are performed respectively by the ingress, intermediate, and egress MFNs when they receive a message that is sent between two compute devices in two different external machine locations (e.g., branch offices, datacenters, etc.) of a tenant. In some embodiments, the controller cluster 160 configures the CFE of each MFN to operate as an ingress, intermediate, and egress CFE, when each such CFE is a candidate to serve as an ingress, intermediate and egress CFE for different data message flows of a tenant.

Figure 12:
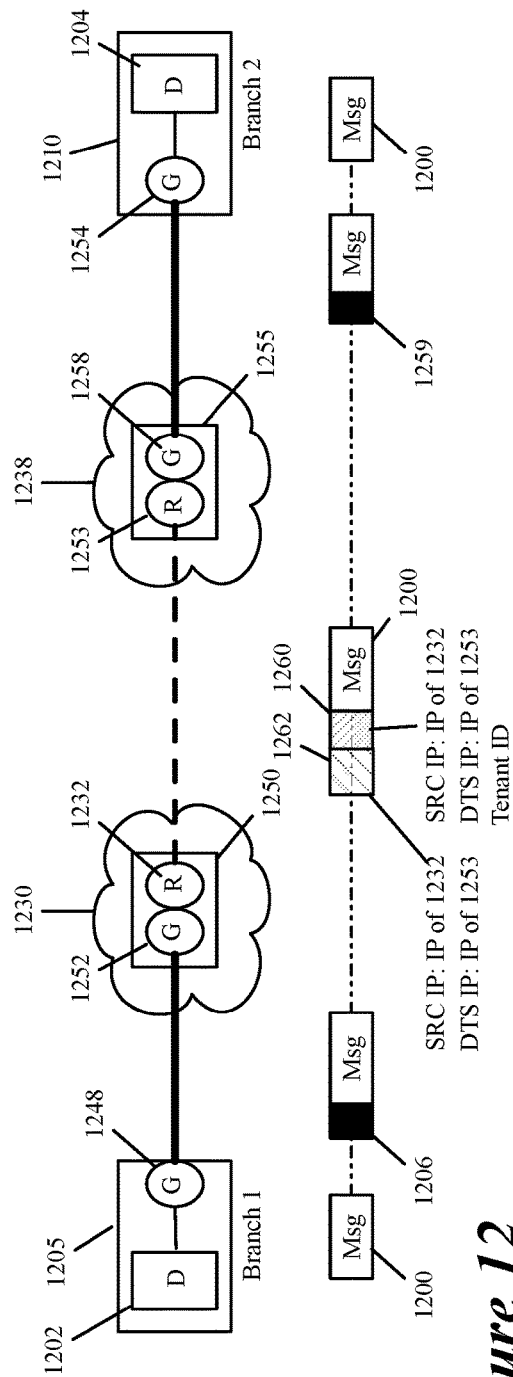
FIG. 12 illustrates an example that does not involve an intermediate MFN between the ingress and egress MFNs.

The processes 900-1100 will be explained below by reference to two examples in FIGS. 8 and 12. As mentioned above, FIG. 8 illustrates an example when the data message goes through an intermediate MFN to get to the egress MFN. FIG. 12 illustrates an example that does not involve an intermediate MFN between the ingress and egress MFNs. Specifically, it illustrates a data message 1200 being sent from a first device 1202 in a first branch office 1205 to a second device 1210 in a second branch office 1220 when the two branch offices connect to two public cloud datacenters 1230 and 1238 with two MFNs 1250 and 1255 that are directly connected. As shown, the CFEs 1232 and 1253 of the MFNs in these examples perform the routing operations associated with each MFN.

The ingress CFE (e.g., ingress CFE 832 or 1232) of the ingress MFNs 850 and 1250 perform the process 900 in some embodiments. As shown in FIG. 9, the ingress process 900 starts by initially identifying (at 905) the tenant routing context based on the identifier of the IPsec tunnel (e.g., 806 or 1206) in the received data message. In some embodiments, the IPsec gateways or other MFN modules store the tenant IDs for the IPsec tunnel IDs in mapping tables. Whenever a data message is received along a particular IPsec tunnel, the IPsec gateway extracts the IPsec tunnel ID, which this gateway or another MFN module then uses to identify the associated tenant ID by reference to its mapping table. By identifying the tenant ID, the process identifies the tenant routing table or the tenant portion of the VRF namespace to use.

At 910, the process increments the identified IPsec tunnel's RX (receive) counter to account for receiving this data message. Next, at 915, the process performs a route lookup (e.g., a longest prefix match, LPM, lookup) in the identified tenant routing context (e.g., in the tenant's portion of the VRF namespace) to identify the IP address of the egress interface for exiting the tenant's virtual network that is built over the public cloud datacenters. For the branch-to-branch examples, the egress interface is the IP address of an egress CFE (e.g., CFE 853 or 1253) of an MFN connected to the destination branch.

At 920, the process adds a tenant tunnel header (e.g., header 860 or 1260) to the received data message, and embeds the source IP address of the ingress CFE (e.g., ingress CFE 832 or 1252) and the destination IP address of the egress CFE (e.g., egress CFE 853 or 1253) as the source and destination IP addresses in this tunnel header. In the tenant header, the process also stores the tenant ID (identified at 905) in the tenant header. At 920, the process adds a VN-hop tunnel header (e.g., header 862 or 1262) outside of the tenant header, and stores its IP address as the source IP address in this header. The process also specifies (at 920) the UDP parameters (e.g., UDP port) of the VNP tunnel header.

Next, at 925, the process increments the VN-transmit counter for the tenant to account for this data message's transmission. At 930, the process performs a route lookup (e.g., an LPM lookup) in the identified VNP routing context (e.g., in the VNP's portion of the VRF namespace) to identify the next hop interface for this data message. In some embodiments, this route lookup is an LPM lookup (e.g., in the VNP's portion of the VRF namespace) that is at least partially based on the egress CFE's destination IP.

At 935, the process determines whether the next hop egress interface is a local interface (e.g., a physical or virtual port) of the ingress CFE. If so, the process defines (at 937) the destination IP address in the VN-hop outer tunnel header as the egress interface IP address identified at 915. Next, at 940, the process provides the double encapsulated data message to its local interface so that it can be forwarded to the destination egress CFE. After 940, the process 900 ends.

FIG. 12 illustrates an example of the operation 905-940 for the data message 1200 that the ingress CFE 1232 receives from the device 1202 of the first branch office 1205. As shown, this CFE's MFN 1250 receives this data message as an IPsec encapsulated message at its IPsec gateway 1252 from the IPsec gateway 1248 of the first branch office 1205. The ingress CFE 1232 encapsulates the received message 1200 (after its IPsec header has been removed by an IPsec gateway 1252) with a VN-hop tunnel header 1262 and a tenant tunnel header 1260, and forwards this double encapsulated message to the egress CFE 1253 of MFN 1255 of public cloud 1238. As shown, the source and destination IP addresses of both tunnel headers 1260 and 1262 are identical in this example. Given that these two sets of IP addresses are identical, some embodiments forego using the outer IP header 1262 when the data message is not routed through any intervening CFE, such as CFE 856.

When the process determines (at 935) that the next hop egress interface is not a local interface of the ingress CFE but rather is the destination IP address of another router, the process embeds (at 945) in the VN-hop tunnel header, the destination IP address of the next hop intermediate CFE (e.g., intermediate CFE 856) as the destination IP address of the VN-hop tunnel header.

Next, at 950, the process performs another route lookup (e.g., an LPM lookup) in the identified VNP routing context (e.g., in the VNP's portion of the VRF namespace). This time, the lookup is based on the IP address of the intermediate CFE that is identified in the VNP tunnel header. As the intermediate CFE (e.g., CFE 856) is a next-hop CFE in the virtual network for the ingress CFE (e.g., CFE 832), the routing table identifies a local interface (e.g., a local port) for data messages sent to the intermediate CFE. Thus, this lookup in the VNP routing context identifies a local interface, to which the ingress CFE provides (at 950) the double-encapsulated message. The process then increments (at 955) the VN-intermediate counter to account for this data message's transmission. After 955, the process ends.

FIG. 10 illustrates a process 1000 that a CFE (e.g., CFE 853 or 1253) of an egress MFN performs in some embodiments when it receives a data message that should be forwarded to a corporate compute node (e.g., a branch office, datacenter, remote user location) connected to the MFN. As shown, the process initially receives (at 1005) the data message on an interface associated with the virtual network. This message is encapsulated with the VN-hop tunnel header (e.g., header 862 or 1262) and tenant tunnel header (e.g., header 860 or 1260).

At 1010, the process determines that the destination IP address in the VN-hop tunnel header is its CFE's destination IP address (e.g., IP address of CFE 853 or 1253). Next, at 1015, the process removed the two tunnel headers. The process then retrieves (at 1020) the tenant ID from the removed tenant tunnel header. To account for the received data message, the CFE then increments (at 1025) the RX (receive) counter that it maintains for the tenant specified by the extracted tenant ID.

Next, at 1030, the process performs a route lookup (e.g., an LPM lookup) in the identified tenant routing context (i.e., in the routing context of the tenant identified by the tenant ID extracted at 1020) to identify the next hop interface for this data message. The process performs this lookup based on the destination IP address in the original header (e.g., header 755) of the received data message in some embodiments. From the record identified through this lookup, the process 1000 identifies the IPsec interface through which the data message has to be sent to its destination. Accordingly, the process 1000 sends the decapsulated, received data message to its MFN's IPsec gateway (e.g., gateway 858 or 1258).

This gateway then encapsulates the data message with an IPsec tunnel header (e.g., tunnel header 859 or 1259) and forwards it to a gateway (e.g., gateway 854 or 1254) in the destination corporate compute node (e.g., destination branch office), where it will be decapsulated and forwarded to its destination. After 1030, the CFE or its MFN increments (at 1035) the counter that it maintains for transmitting messages along the IPsec connection to the destination corporate compute node (e.g., the IPsec connection between gateways 854 and 858, or between gateways 1254 and 1258).

FIG. 11 illustrates a process 1100 that a CFE (e.g., CFE 856) of an intermediate MFN performs in some embodiments when it receives a data message that should be forwarded to another CFE of another MFN. As shown, the process initially receives (at 1105) the data message on an interface associated with the virtual network. In some embodiments, this message is encapsulated with two tunnel headers, a VN-tunnel header (e.g., header 862) and a tenant tunnel header (e.g., header 860).

At 1110, the process terminates the VN-hop tunnel as it determines that the destination IP address in this tunnel header is its CFE's destination IP address (e.g., is the destination IP address of CFE 856). Next, at 1115, the process determines whether the VN-hop tunnel header specifies the correct UDP port. If not, the process ends. Otherwise, at 1120, the process removes the VN-hop tunnel header. To account for the received data message, the CFE then increments (at 1125) the RX (receive) counter that it maintains to quantify the number of messages that it has received as an intermediate hop CFE.

At 1130, the process performs a route lookup (e.g., an LPM lookup) in the identified VNP routing context (e.g., in the VNP's portion of the VRF namespace) to identify the next hop interface for this data message. In some embodiments, this route lookup is an LPM lookup (e.g., in the VNP's portion of the VRF namespace) that is at least partially based on the egress CFE's destination IP that is identified in the inner tenant tunnel header.

The process then determines (at 1135) whether the next hop egress interface is a local interface of the intermediate CFE. If so, the process adds (at 1140) the VN-hop tunnel header to the data message, which is already encapsulated with the tenant tunnel header. The process sets (at 1142) the destination IP address in the VN-hop tunnel header to the egress CFE's destination IP address that is specified in the tenant tunnel header. It also sets (at 1142) the source IP address in the VN-hop tunnel header to the IP address of its CFE. In this tunnel header, the process also sets the UDP attributes (e.g., the UDP port, etc.).

Next, at 1144, the process provides the double encapsulated data message to its local interface (identified at 1130) so that it can be forwarded to the destination egress CFE. One example of this VN-hop tunnel de-capsulation and forwarding was described above by reference to the operations of CFE 856 in FIG. 8. To account for the received data message, the CFE then increments (at 1146) the TX (transmit) counter that it maintains to quantify the number of messages that it has transmitted as an intermediate hop CFE. After 1146, the process 1100 ends.

On the other hand, when the process determines (at 1135) that the next hop egress interface is not a local interface of its CFE but rather is the destination IP address of another router, the process adds (at 1150) a VN-hop tunnel header to the data message from which it previously removed a VN-hop tunnel header. In the new VN-hop tunnel header, the process 1100 embeds (at 1150) the source IP address of its CFE and the destination IP address (identified at 1130) of the next hop intermediate CFE as the source and destination IP addresses of the VN-hop tunnel header. This VNP tunnel header also specifies a UDP layer 4 protocol with a UDP destination port.

Next, at 1155, the process performs another route lookup (e.g., an LPM lookup) in the identified VNP routing context (e.g., in the VNP's portion of the VRF namespace). This time, the lookup is based on the IP address of the next hop intermediate CFE that is identified in the new VN-hop tunnel header. As this intermediate CFE is a next-hop of the current intermediate CFE in the virtual network, the routing table identifies a local interface for data messages sent to the next-hop intermediate CFE. Thus, this lookup in the VNP routing context identifies a local interface, to which the current intermediate CFE provides the double-encapsulated message. The process then increments (at 1160) the VN-intermediate TX (transmit) counter to account for this data message's transmission. After 1160, the process ends.

Figure 13:
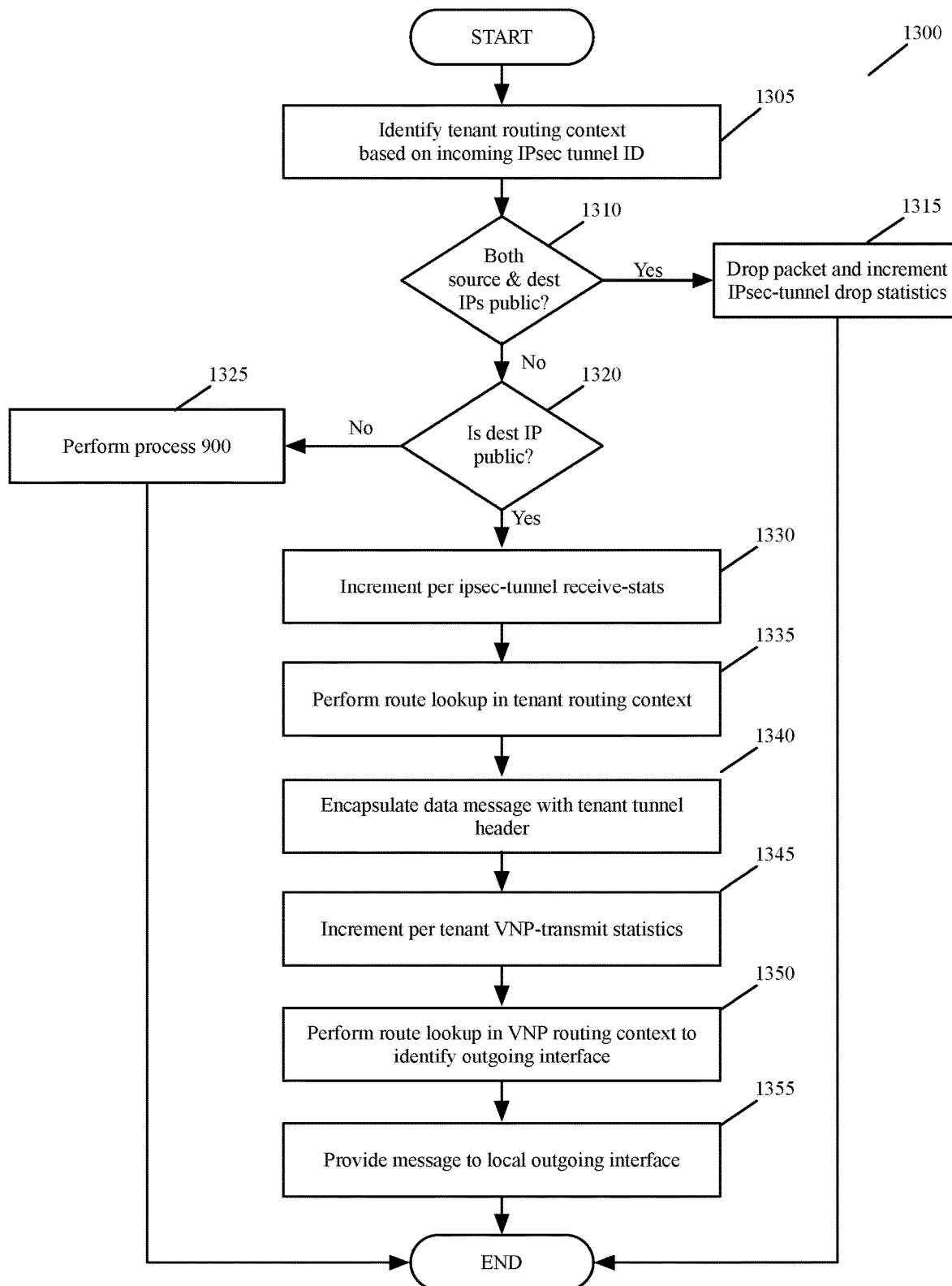
FIG. 13 illustrates a message-handling process that is performed by the CFE of the ingress MFN when it receives a message that is sent from a corporate compute device in a branch office to another device in another branch office or in a SaaS provider datacenter.

FIG. 13 illustrates a message-handling process 1300 that is performed by the CFE of the ingress MFN when it receives a message for a tenant that is sent from a corporate compute device of the tenant (e.g., in a branch office) to another tenant machine (e.g., in another branch office, tenant datacenter or a SaaS provider datacenter). The process 900 of FIG. 9 is a subset of this process 1300 as further described below. As shown in FIG. 13, the process 1300 starts by initially identifying (at 905) the tenant routing context based on the identifier of the incoming IPsec tunnel.

At 1310, the process determines whether both the source and destination IP addresses in the received data message's header are public IP addresses. If so, the process (at 1315) drops the data message and increments the drop counter that it maintains for the received data message's IPsec tunnel. At 1315, the process drops the counter because it should not be receiving messages that are addressed to and from public IP addresses when it receives the messages through the tenant's IPsec tunnel. In some embodiments, the process 1300 also sends back to the source corporate compute machine an ICMP error message.

On the other hand, when the process determines (at 1310) that the data message is not coming from a public IP address and going to another public IP address, the process determines (at 1320) whether the destination IP address in the received data message's header is a public IP address. If so, the process transitions to 1325 to perform process 900 of FIG. 9, with the exception of operation 905, which it has performed at the start of the process 1300. After 1325, the process 1300 ends. On the other hand, when the process 1300 determines (at 1320) that the destination IP address in the received data message's header is not a public IP address, the process increments (at 1330) the identified IPsec tunnel's RX (receive) counter to account for receiving this data message.

The process 1300 then performs (at 1335) a route lookup (e.g., an LPM lookup) in the identified tenant routing context (e.g., in the tenant's portion of the VRF namespace). This lookup identifies the IP address of the egress interface for exiting the tenant's virtual network that is built over the public cloud datacenters. In the example illustrated in FIG. 13, the process 1300 reaches the lookup operation 1335 when the data message is intended for a machine in a SaaS provider datacenter. Hence, this lookup identifies the IP address of the egress router for exiting the tenant's virtual network to reach the SaaS provider machine. In some embodiments, all the SaaS provider routes are installed in one route table or in one portion of the VRF namespace, while in other embodiments the routes for the different SaaS providers are stored in different route tables or different VRF namespace portions.

At 1340, the process adds a tenant tunnel header to the received data message, and embeds the source IP address of the ingress CFE and the destination IP address of the egress router as the source and destination IP addresses in this tunnel header. Next, at 1345, the process increments the VN-transmit counter for the tenant to account for this data message's transmission. At 1350, the process performs a route lookup (e.g., an LPM lookup) in the VNP routing context (e.g., in the VNP's portion of the VRF namespace) to identify one of its local interfaces as the next hop interface for this data message. When the next hop is another CFE (e.g., in other public cloud datacenter), the process in some embodiments further encapsulates the data message with the VN-hop header, and embeds its CFE's IP address and the other CFE's IP address as the source and destination addresses of the VN-hop header. At 1355, the process provides the encapsulated data message to its identified local interface so that the data message can be forwarded to its egress router. After 1355, the process 1300 ends.

In some cases, the ingress MFN can receive a data message for a tenant that its CFE can directly forward to the data message's destination machine without going through another MFN's CFE. In some such cases, the data message does not need to be encapsulated with a tenant header or a VN-hop header when the CFE does not need to relay any tenant specific information to any other subsequent VN processing module or the needed information can be provided to the subsequent VN processing module through other mechanisms.

For instance, to directly forward a tenant's data message to an external SaaS provider datacenter, the ingress MFN's NAT engine 215 would have to perform a NAT operation based on the tenant identifier, as further described below. The ingress CFE or another module in the ingress MFN has to provide the tenant identifier to the ingress MFN's associated NAT engine 215. When the ingress CFE and NAT engines execute on the same computer, some embodiments share this information between these two modules by storing it in a shared memory location. On the other hand, when the CFE and NAT engines do not execute on the same computer, some embodiments use other mechanisms (e.g., an out-of-band communication) to share the tenant ID between the ingress CFE and NAT engines. In such cases, however, other embodiments use an encapsulating header (i.e., use an in-band communication) to store and share the tenant ID between different modules of the ingress MFN.

Figure 14:
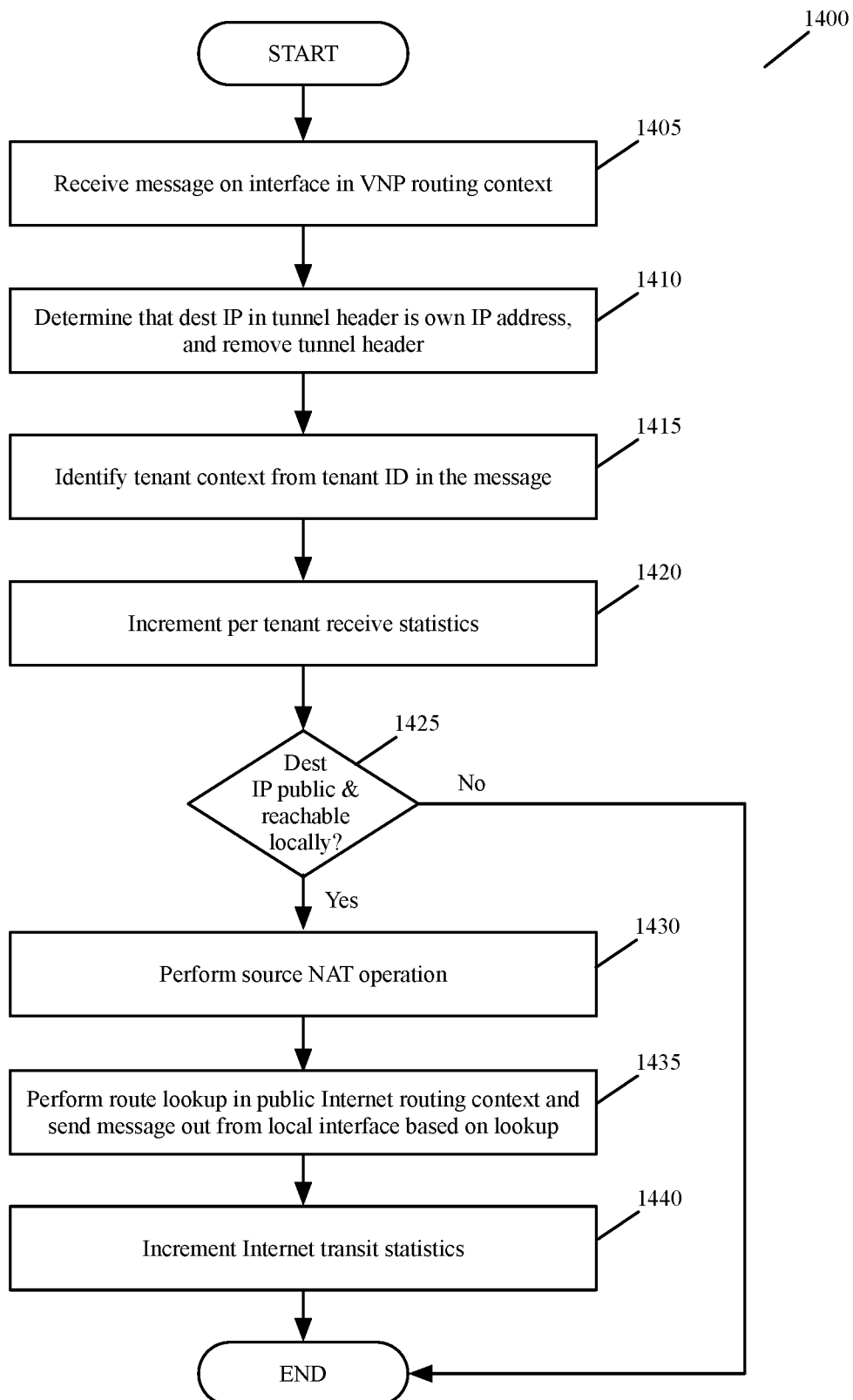
FIG. 14 illustrates the NAT operation being performed at the egress router.

As further described below, some embodiments perform one or two source NAT operations on the source IP/port addresses of a data message before sending the message outside of the virtual network of a tenant. FIG. 14 illustrates the NAT operation being performed at the egress router. However, as further described below, some embodiments also perform another NAT operation on the data message at the ingress router, even though this extra NAT operation was not described above by reference to FIG. 13.

FIG. 14 illustrates a process 1400 that an egress router performs in some embodiments when it receives a data message that should be forwarded to a SaaS provider datacenter through the Internet. As shown, the process initially receives (at 1405) the data message on an interface associated with the virtual network. This message is encapsulated with the tenant tunnel header.

At 1410, the process determines that the destination IP address in this tunnel header is its router's destination IP address, and hence it removes the tenant tunnel header. The process then retrieves (at 1415) the tenant ID from the removed tunnel header. To account for the received data message, the process increments (at 1420) the RX (receive) counter that it maintains for the tenant specified by the extracted tenant ID.

Next, at 1425, the process determines whether the destination IP in the data message's original header is a public one that is reachable through a local interface (e.g., local port) of the egress router. This local interface is an interface that is not associated with a VNP tunnel. If not, the process ends. Otherwise, the process performs (at 1430) a source NAT operation to change the source IP/port addresses of the data message in this message's header. The NAT operation and the reason for performing it will be further described below by reference to FIGS. 16 and 17.

After 1430, the process performs (at 1435) a route lookup (e.g., an LPM lookup) in the Internet routing context (i.e., in the Internet routing portion of the routing data, e.g., Internet VRF namespace of the router) to identify the next hop interface for this data message. The process performs this lookup based on the destination network address (e.g., destination IP address) of the original header of the received data message in some embodiments. From the record identified through this lookup, the process 1400 identifies the local interface through which the data message has to be sent to its destination. Accordingly, at 1435, the process 1400 provides the source network-address translated data message to its identified local interface for forwarding to its destination. After 1435, the process increments (at 1440) the counter that it maintains for transmitting messages to the SaaS provider, and then ends.

Figure 15:
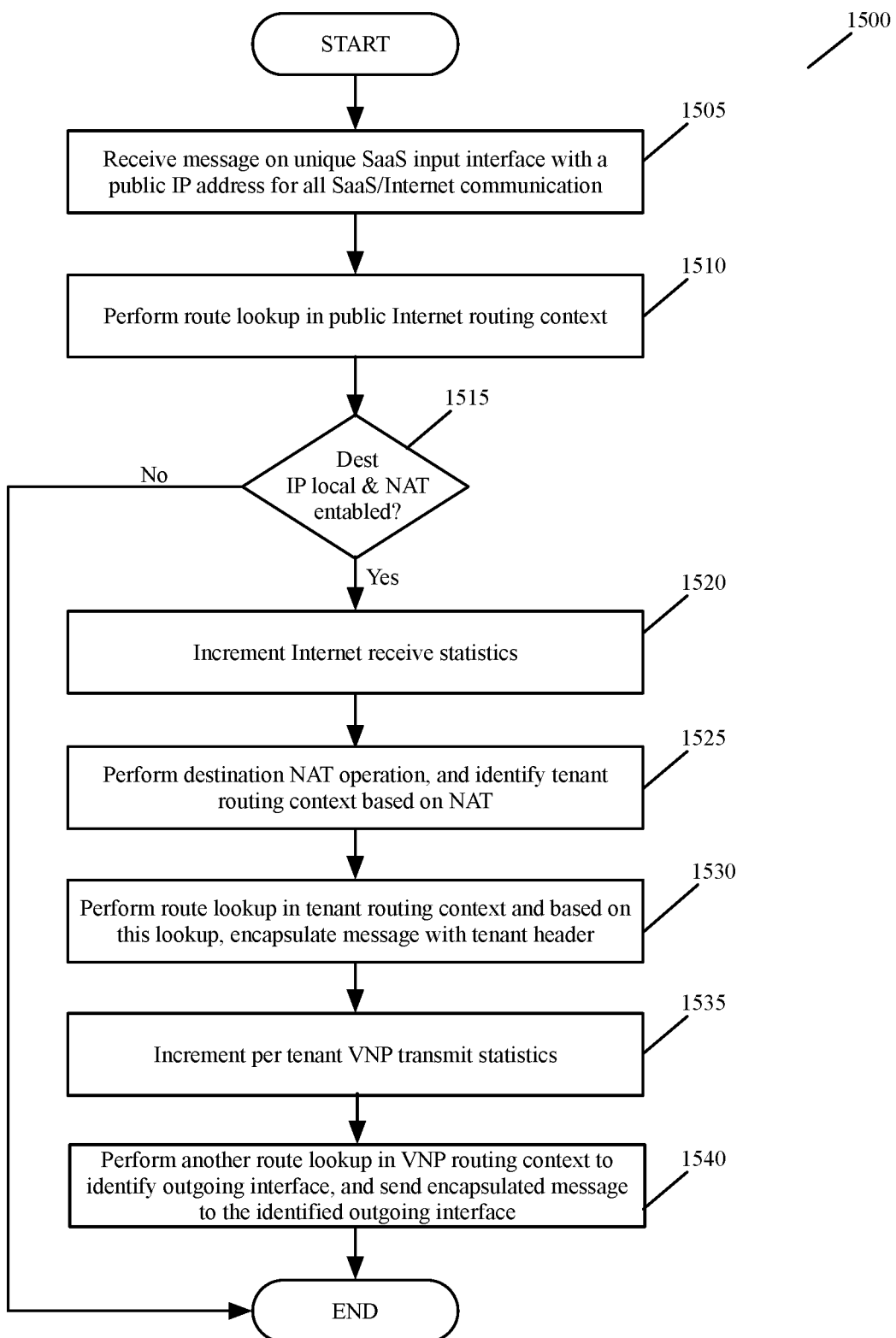
FIG. 15 illustrate a message-handling process that is performed by the ingress router that receives a message that is sent from a SaaS provider machine to a tenant machine.

FIG. 15 illustrate a message-handling process 1500 that is performed by the ingress router that receives a message that is sent from a SaaS provider machine to a tenant machine. As shown, the ingress process 1500 starts by initially receiving (at 1505) a data message on a dedicated input interface with a public IP address that is used for several or all SaaS provider communications. In some embodiments, this input interface is a different interface with a different IP address than the one used for communicating with the virtual network.

After receiving the message, the process performs (at 1510) a route lookup in a public Internet routing context by using the destination IP address contained in the received data message's header. Based on this lookup, the process determines (at 1515) whether the destination IP address is local and associated with an enabled NAT operation. If not, the process ends. Otherwise, the process increments (at 1520) the Internet RX (receive) counter to account for receiving the data message.

Next, at 1525, the process performs a reverse NAT operation that translates the destination IP/port addresses of the data message to new destination IP/port addresses that the virtual network associates with a particular tenant. This NAT operation also produces the tenant ID (e.g., retrieves the tenant ID from a mapping table that associates tenant IDs with translated destination IPs, or retrieves the tenant ID from the same mapping table that is used to obtain the new destination IP/port addresses). In some embodiments, the process 1500 uses a connection record that the process 1400 created when it performed (at 1430) its SNAT operation to perform (at 1525) its reverse NAT operation. This connection record contains the mapping between the internal and external IP/port addresses that are used by the SNAT and DNAT operations.

Based on the translated destination network address, the process then performs (at 1530) a route lookup (e.g., an LPM lookup) in the identified tenant routing context (i.e., the routing context specified by the tenant ID) to identify the IP address of the egress interface for exiting the tenant's virtual network and reaching the tenant's machine in a corporate compute node (e.g., in a branch office). This egress interface is the IP address of an egress CFE of an egress MFN in some embodiments. At 1530, the process adds a tenant tunnel header to the received data message, and embeds the IP address of the ingress router and the IP address of the egress CFE as the source and destination IP addresses in this tunnel header. Next, at 1535, the process increments the VN-transmit counter for the tenant to account for this data message's transmission.

At 1540, the process performs a route lookup (e.g., an LPM lookup) in the identified VNP routing context (e.g., in the VNP's portion of the routing data, such as in the VRF namespace of the router) to identify its local interface (e.g., its physical or virtual port), to which the ingress router provides the encapsulated message. The process then adds (at 1540) a VN-hop header to the received data message, and embeds the IP address of the ingress router and the IP address of the next hop CFE as the source and destination IP addresses of this VN-hop header. After 1555, the process ends.

As mentioned above, the MFNs in some embodiments include NAT engines 215 that perform NAT operations on the ingress and/or egress paths of data messages into and out of the virtual network. NAT operations are commonly performed today in many contexts and by many devices (e.g., routers, firewalls, etc.). For instance, a NAT operation is typically performed when traffic exits a private network to isolate the internal IP address space from the regulated, public IP address space used in the Internet. A NAT operation typically maps one IP address to another IP address.

With the proliferation of computers connected to the Internet, the challenge is that the number of computers would exceed the available number of IP Addresses. Unfortunately, even though there are 4,294,967,296 possible unique addresses, it is already not practical to assign a unique public IP address for each computer. One way to get around is to assign public IP addresses only to the routers at the edge point of private networks, while other devices inside the networks get addresses that are only unique in their internal private networks. When a device wants to communicate with a device outside of its internal private network, its traffic typically passes through an Internet gateway that performs a NAT operation to replace the source IP of this traffic with the public source IP address of the Internet gateway.

While a private network's Internet gateway gets a registered public address on the Internet, each device inside of a private network that connects to this gateway receives an unregistered private address. The private addresses of the internal private networks can be in any range of IP addresses. However, the Internet Engineering Task Force (IETF) has suggested several ranges of private addresses for private networks to use. These ranges are generally not available on the public Internet so that routers can easily distinguish between private and public addresses. These ranges of private addresses are known as RFC 1918, and are: (1) Class A 10.0.0.0-10.255.255.255, (2) Class B 172.16.0.0-172.31.255.255, and (3) Class C 192.168.0.0-192.168.255.255.

It is important to perform source IP translation on data message flows exiting private networks, so that external devices can differentiate different devices within different private networks that use the same internal IP addresses. When an external device has to send a reply message to the device inside of a private network, the external device has to send its reply to a unique and routable public address on the Internet. It cannot use the internal device's original IP address that might be used by numerous devices in numerous private networks. The external device sends its reply to the public IP address with which the original NAT operation replaced the private source IP address of the internal device. After receiving this reply message, the private network (e.g., the network's gateway) performs another NAT operation to replace the public destination IP address in the reply with the IP address of the internal device.

Many devices inside of a private network and many applications executing on these devices have to share one or a finite number of public IP address that are associated with the private network. Accordingly, NAT operations typically also translate the layer 4 port addresses (e.g. UDP addresses, TCP addresses, RTP addresses, etc.) to be able to uniquely associate external message flows to internal message flows that start or terminate on different internal machines and/or different applications on these machines. NAT operations are also often stateful operations as in many contexts these operations need to track connections, and dynamically handle tables, message reassembly, timeouts, forced termination of expired tracked connections, etc.

As mentioned above, the virtual network provider of some embodiments provides a virtual network as a service to different tenants over multiple public clouds. These tenants might use common IP addresses in their private networks and they share a common set of network resources (e.g., public IP addresses) of the virtual network provider. In some embodiments, the data traffic of the different tenants is carried between the overlay network's CFEs through tunnels and the tunnel marks each message with a unique tenant ID. These tenant identifiers allow the messages to be sent back to the source devices even when the private tenant IP spaces overlap. For instance, the tenant identifiers allow a message that is sent from a branch office of tenant 17 with source address 10.5.12.1 to Amazon.com to be distinguished from a message sent to Amazon.com from a branch office of tenant 235 with the same source address (and even with the same source port number, 55331).

Standard NATs implemented according to RFC 1631 do not support the notion of tenancy and consequently have no way to distinguish between two messages with the same private IP addresses. However, in many virtual network deployments of some embodiments, it is beneficial to use standard NAT engines as many mature open-source, high-performance implementations exist today. In fact, many Linux kernels today have functioning NAT engines as standard features.

Figure 16:
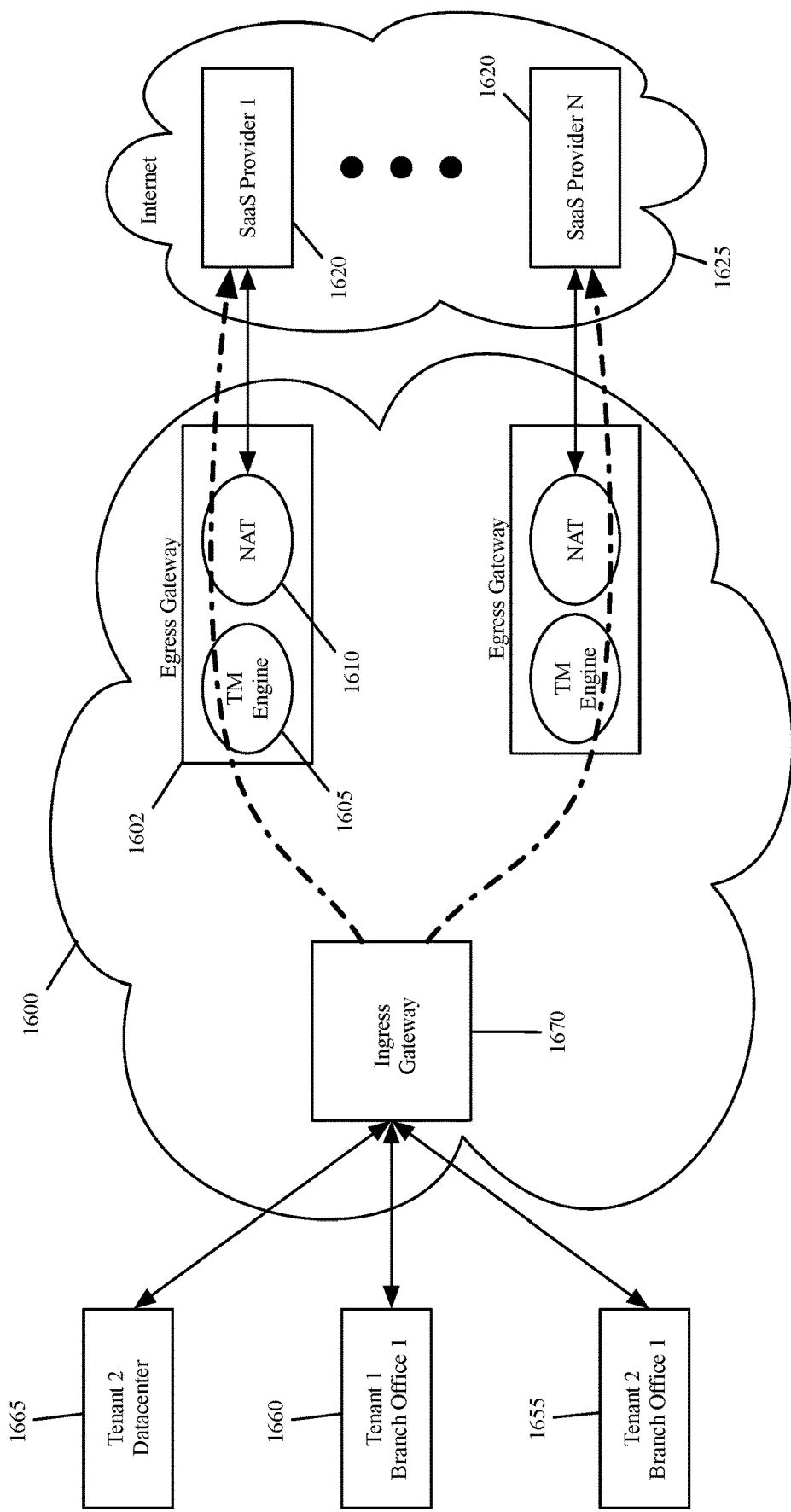
FIG. 16 illustrates such TM engines that are placed in each virtual-network gateway that is on the virtual network's egress path to the Internet.

In order to use standard NAT engines for different tenants of tenant virtual networks, the virtual network provider of some embodiments uses tenancy-mapping (TM) engines before using standard NAT engines. FIG. 16 illustrates such TM engines 1605 that are placed in each virtual-network gateway 1602 that is on the virtual network's egress path to the Internet. As shown, each TM engine 1605 is placed before a NAT engine 1610 on the message egress paths to SaaS provider datacenters 1620 through the Internet 1625.

In some embodiments, each NAT engine 215 of an MFN includes a TM engine (like the TM engine 1605) and a standard NAT engine (like NAT engine 1610).

In the example illustrated in FIG. 16, the message flows come from two branch offices 1655 and 1660 and a datacenter 1665 of two virtual-network tenants, and enter the virtual network 1600 through the same ingress gateway 1670, although this does not necessarily have to be the case. The virtual network 1600 in some embodiments is defined over multiple public cloud datacenters of multiple public cloud vendors. In some embodiments, the virtual-network gateways are part of the managed forwarding nodes, and the TM engines are placed before the NAT engines 1610 in egress MFNs.

When a data message reaches an egress gateway 1602 to exit the virtual network on its way to a SaaS provider datacenter 1620, each TM engine 1605 maps the source network address (e.g., source IP and/or port addresses) of these data message to new source network address (e.g., source IP and/or port addresses), and the NAT engine 1610 maps the new source network address to yet another source network address (e.g., another source IP and/or port addresses). In some embodiments, the TM engine is a stateless element and performs the mapping for each message through a static table without looking at any dynamic data structure. As a stateless element, the TM engine does not create a connection record when it processes a first data message of a data message flow in order to use this connection record in performing its address mapping for processing subsequent messages of the data message flow.

On the other hand, the NAT engine 1605 in some embodiments is a stateful element that performs its mapping by reference to a connection storage that stores connection records that reflect its prior SNAT mappings. When the NAT engine receives a data message, this engine in some embodiments first checks it connection storage to determine whether it previously created a connection record for the received message's flow. If so, the NAT engine uses the mapping contained in this record to perform its SNAT operation. Otherwise, it performs the SNAT operation based on a set of criteria that it uses to derive a new address mapping for the new data message flow. To do this, the NAT engine in some embodiments uses common network address translation techniques.

In some embodiments, the NAT engine can also use the connection storage in some embodiments when it receives a reply data message from the SaaS provider machine, in order to perform a DNAT operation to forward the reply data message to the tenant machine that sent the original message. In some embodiments, the connection record for each processed data message flow has a record identifier that includes the flow's identifier (e.g., five tuple identifier with the translated source network address).

In doing its mapping, the TM engines ensure that data message flows from different tenants that use the same source IP and port addresses are mapped to unique non-overlapping address spaces. For each message, the TM engine identifies the tenant ID and performs its address mapping based on this identifier. In some embodiments, the TM engine maps the source IP addresses of different tenants into different IP ranges such that any two messages from different tenants will not be mapped to the same IP address.

Consequently, each network type with a different tenant ID will map into a unique address within the full $2^{32}$ region of IP address (0.0.0.0-255.255.255.255). Classes A and B networks have 256 and 16 times more possible IP addresses than a class C network. Taking the size proportion of class A, B and C networks, 256 class A network could be allocated as the following: (1) 240 to map 240 tenants with class A network, (2) 15 to map 240 tenants with class B networks, and (3) a single class A network to map 240 tenants with class C networks. More specifically, in some embodiments, the lowest range class A networks (starting with 0.x.x.x/24, 1.x.x.x/24 . . . up to 239.x.x.x/24) will be used to map addresses coming from the 10.x class A network to 240 different target class A networks. The next 15 class A networks 240.x.x.x/24 to 254.x.x.x/24, each will be used to include each 16 class B networks (e.g., for a total of 240 networks (15\*16)). The last class A network 255.x.x.x/24 will be used to include up to 256 private class C networks. Even though 256 tenants can be fitted, only 240 are used and 16 class C networks are not used. To summarize, some embodiments use the following mapping:

10.x.x.x/24 networks→1.x.x.x/24-239.x.x.x/24, resulting in 240 different mapping for each tenant;

172.16-31.x.x/12 networks→240.x.x.x/24-254.x.x.x/24, resulting in 240 different mapping for each tenant;

192.168.x.x/16→255.x.x.x/24 networks, resulting in 240 out of 256 possible mapping for each tenant.

The above-described schemes can support up to 240 tenants assuming that it is not known ahead of time what type of network class the tenants will use. In some embodiments, the public cloud network uses a private IP address. In such a case, it is desirable not to map into the private address space again. As some embodiments remove a class A network and a class B network, there are only 239 different tenants that can be supported in these embodiments. To achieve a unique mapping, some embodiments number all tenants ID from 1 to 239, and then add to the least significant 8 bits of the unmasked part of the private domain to the tenant ID (expressed in 8 bits) modulo 240. In this case, for class A addresses, the first tenant (number 1) will be mapped to 11.xx.xx.xx/24 and the last one (239) to 9.xx.xx.xx/24.

In the implementation illustrated in FIG. 16, some embodiments provide to each TM engine 1605 any potential tenant ID subnets and a way to route messages back to any specific IP address in each such subnet. This information can dynamically change when tenants, branches, and mobile devices are added or removed. Hence, this information has to be dynamically distributed to the TM engines in the Internet egress gateways of the virtual network. The amount of information distributed and regularly updated can be large as the egress Internet gateways of the virtual network provider might be used by a large number of tenants. Also, the restriction of 240 (or 239) of tenant's ID is a global one and can be solved only by adding multiple IPs addresses to the egress points.

Figure 17:
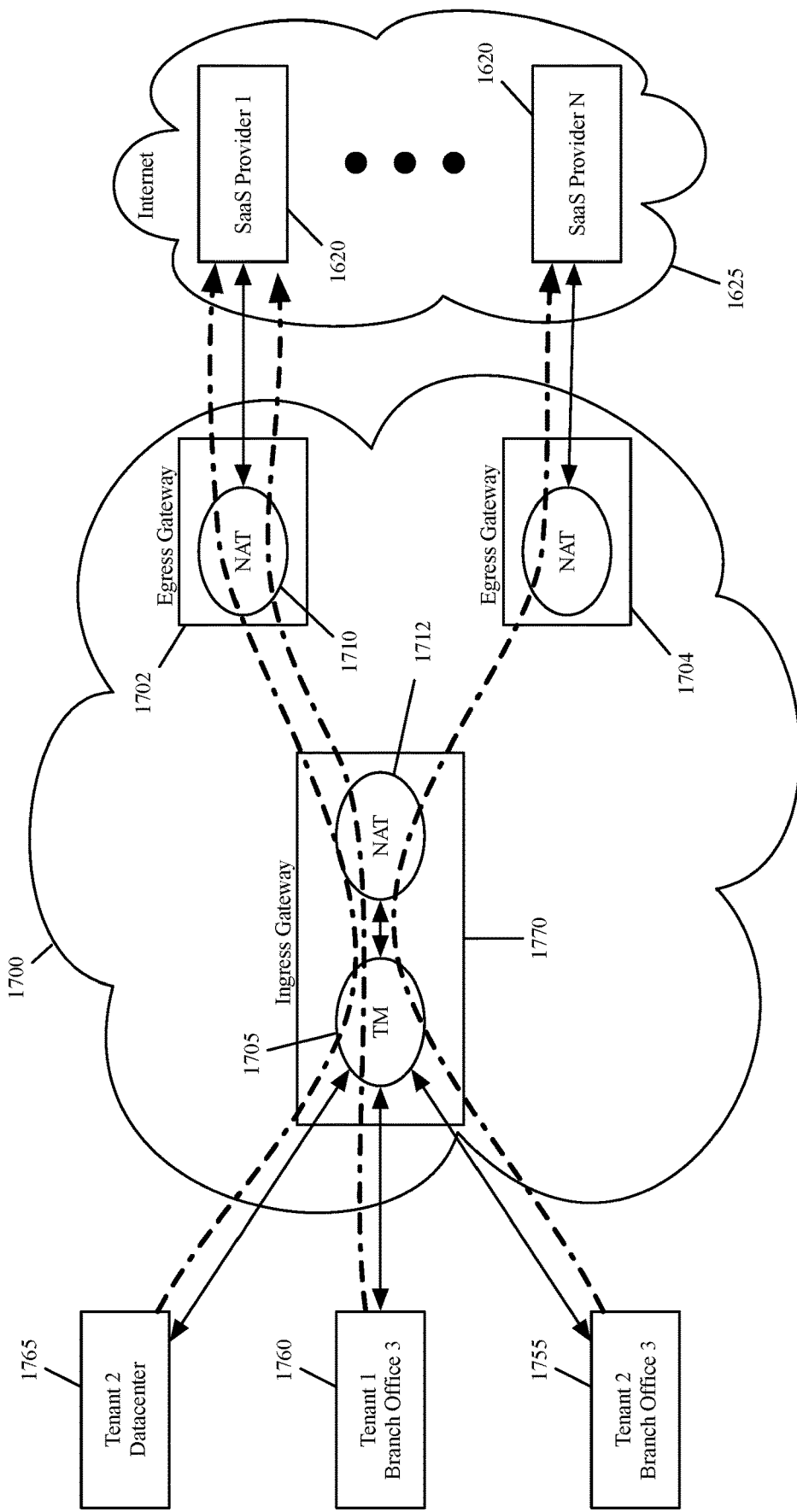
FIG. 17 illustrates a double-NAT approach that is used in some embodiments instead of the single NAT approach illustrated in FIG. 16.

FIG. 17 illustrates a double-NAT approach that is used in some embodiments instead of the single NAT approach illustrated in FIG. 16. The approach illustrated in FIG. 17 requires less tenant data to be distributed to most, if not all, TM engines and allows more private tenant networks to be mapped to the internal network of the virtual network provider. For a data message flow that traverses from a tenant machine through the virtual network 1700 and then the Internet 1625 to another machine (e.g., to a machine in a SaaS provider datacenter 1620), the approach illustrated in FIG. 17 places a NAT engine at the data message flow's ingress gateway 1770 into the virtual network and at this flow's egress gateway 1702 or 1704 out of the virtual network and into the Internet 1625. This approach also places the TM engines 1705 before the NAT engines 1712 of the ingress gateways 1770.

In the example illustrated in FIG. 17, the message flows come from two branch offices 1755 and 1760 and a datacenter 1765 of two virtual-network tenants, and enter the virtual network 1700 through the same ingress gateway 1770, although this does not necessarily have to be the case. Like the virtual network 1600, the virtual network 1700 in some embodiments is defined over multiple public cloud datacenters of multiple public cloud vendors. Also, in some embodiments, the virtual-network gateways 1702, 1704, and 1770 are part of the managed forwarding nodes, and the TM engines are placed in these embodiments before the NAT engines 215 in these MFNs.

The TM engines 1605 and 1705 operate similarly in FIGS. 16 and 17. Like TM engines 1605, the TM engine 1705 maps the source IP and port addresses of data messages entering the virtual network to new source IP and port addresses, when these data messages are destined to (i.e., have destination IP addresses for) SaaS provider datacenters 1620. For each such data message, the TM engine 1705 identifies the tenant ID and performs its address mapping based on this identifier.

Like the TM engines 1605, the TM engine 1705 in some embodiments is a stateless element and performs the mapping for each message through a static table without looking at any dynamic data structure. As a stateless element, the TM engine does not create a connection record when it processes a first data message of a data message flow in order to use this connection record in performing its address mapping for processing subsequent messages of the data message flow.

In doing its mapping, the TM engines 1705 in the ingress gateways 1770 ensure that data message flows from different tenants that use the same source IP and port addresses are mapped to unique non-overlapping address spaces. In some embodiments, the TM engine maps the source IP addresses of different tenants into different IP ranges such that any two messages from different tenants will not be mapped to the same IP address. In other embodiments, the TM engine 1705 might map the source IP addresses of two different tenants to the same source IP range, but different source port ranges. In still other embodiments, the TM engine maps two tenants to different source IP ranges, while mapping two other tenants to the same source IP range but different source port ranges.

Unlike the TM engines 1605, the TM engines 1705 at the virtual-network ingress gateways only need to identify tenants for branch offices, corporate datacenters, and corporate compute nodes that are connected to the ingress gateways. This significantly reduces the tenant data that needs to be initially supplied to, and periodically updated for, each TM engine. Also, as before, each TM engine can map only 239/240 tenants to unique address spaces. However, since the TM engines are placed at the ingress gateways of virtual network provider, the TM engines can each uniquely map 239/240 tenants.

The NAT engine 1712 of the ingress gateway 1770 in some embodiments can use either external public IP addresses or internal IP addresses that are specific to the public cloud (e.g. AWS, GCP or Azure) in which the ingress gateway 1770 resides. In either case, the NAT engine 1712 maps the source network address of an incoming message (i.e., a message entering the virtual network 1700) to an IP address that is unique within its ingress gateway's private cloud network. In some embodiments, the NAT engine 1712 translates the source IP address of each tenant's data message flows to a different unique IP address. In other embodiments, however, the NAT engine 1712 translates the source IP addresses of different tenants' data message flows to the same IP address, but uses the source port addresses to differentiate the data message flows of the different tenants. In still other embodiments, the NAT engine maps the source IP addresses of two tenants to different source IP ranges, while mapping the source IP addresses of two other tenants to the same source IP range but different source port ranges.

In some embodiments, the NAT engine 1712 is a stateful element that performs its mapping by reference to a connection storage that stores connection records that reflect its prior SNAT mappings. In some embodiments, the NAT engine can also use the connection storage in some embodiments when it receives a reply data message from the SaaS provider machine, in order to perform a DNAT operation to forward the reply data message to the tenant machine that sent the original message. The TM and NAT engines 1705, 1710 and 1712 are configured in some embodiments by the controller cluster 160 (e.g., are provided with tables for describing the mapping to use for different tenants and different ranges of network address space).

FIG. 18 presents an example that illustrates the source port translation of the ingress NAT engine 1712. Specifically, it shows the source address mapping that the tenancy mapping engine 1705 and the ingress NAT engine 1712 perform on a data message 1800 as it enters the virtual network 1700 through an ingress gateway 1770 and as it exits the virtual network at an egress gateway 1702. As shown, a tenant gateway 1810 sends the data message 1800, which arrives at the IPsec gateway 1805 with a source IP address of 10.1.1.13 and source port address of 4432. In some embodiments, these source addresses are addresses used by a tenant machine (not shown), while in other embodiments, one or both of these source addresses are source addresses that are produced by a source NAT operation performed by the tenant gateway or another network element in the tenant datacenter.

After this message has been processed by the IPsec gateway 1805, this gateway or another module of the ingress MFN associates this message with the tenant ID of 15, which identifies the virtual-network tenant to which the message 1800 belongs. Based on this tenant ID, the tenant mapping engine 1705 then maps the source IP and port addresses to source IP and port address pair of 15.1.1.13 and 253, as shown. This source IP and port addresses uniquely identify the message flow of the data message 1800. In some embodiments, the TM engine 1705 performs this mapping in a stateless manner (i.e., without reference to connection tracking records). In other embodiments, the TM engine performs this mapping in a stateful manner.

The ingress NAT engine 1712 next translates (1) the source IP address of the data message 1800 to a unique private or public (internal or external) IP address of 198.15.4.33, and (2) the source port address of this message to port address 714. In some embodiments, the virtual network uses this IP address for other data message flows of the same or different tenants. Hence, in these embodiments, the source network address translation (SNAT) operation of the NAT engine 1712 uses the source port addresses to differentiate different message flows of different tenants that use the same IP address within the virtual network.

In some embodiments, the source port address assigned by the ingress NAT engine's SNAT operation is also the source port address that is used to differentiate different message flows outside of the virtual network 1700. This is the case in the example illustrated in FIG. 18. As shown, the egress NAT engine 1710 in this example does not change the source port address of the data message when it performs its SNAT operation. Instead, it just changes the source IP address to an external IP address 198.15.7.125, which in some embodiments is the public IP address of the egress gateway(s) of the virtual network. This public IP address in some embodiments is also an IP address of the public cloud datacenter in which the ingress and egress gateways 1770 and 1702 operate.

With the source IP and port addresses 198.15.7.125 and 714, the data message is routed through the Internet to reach a gateway 1815 of a SaaS provider's datacenter. In this datacenter, a SaaS provider machine performs an operation based on this message and sends back a reply message 1900, the processing of which will be described below by reference to FIG. 19. In some embodiments, the SaaS provider machine performs one or more service operation (e.g., a middlebox service operation, such as firewall operation, IDS operation, IPS operation, etc.) on the data message, based on one or more service rules that are defined by reference to the source IP and port addresses 198.15.7.125 and 714. In some of these embodiments, different service rules for different tenants can specify the same source IP address (e.g., 198.15.7.125) in the rule identifiers while specifying different source port addresses in these rule identifiers. A rule identifier specifies a set of attributes for comparing to the data message flow attributes while performing a lookup operation that identifies a rule that matches a data message.

FIG. 19 illustrates the processing of a reply message 1900 that a SaaS machine (not shown) sends in response to its processing of the data message 1800. In some embodiments, the reply message 1900 can be identical to the original data message 1800, it can be a modified version of the original data message 1800, or it can be a completely new data message. As shown, the SaaS gateway 1815 sends the message 1900 based on the destination IP and port addresses 198.15.7.125 and 714, which are the source IP and port addresses of the data message 1800 when this message arrives at the SaaS gateway 1815.

The message 1900 is received at a gateway (not shown) of the virtual network, and this gateway provides the data message to the NAT engine 1710 that performed the last SNAT operation on the message 1800 before this message was sent to the SaaS provider. Although in the example illustrated in FIG. 19, the data message 1900 is received at the same NAT engine 1710 that performed the last SNAT operation, this does not have to be the case in each deployment.

The NAT engine 1710 (now acting as an ingress NAT engine) performs a DNAT (destination NAT) operation on the data message 1900. This operation changes the external destination IP address 198.15.7.125 to a destination IP address 198.15.4.33 that is used by the virtual network to forward the data message 1900 through the public cloud routing fabric and between the virtual network components. Again, the IP address 198.15.4.33 can be a public or private IP address in some embodiments.

As shown, the NAT engine 1712 (now acting as an egress NAT engine) receives the message 1900 after the NAT engine 1710 has translated its destination IP address. The NAT engine 1712 then performs a second DNAT operation on this message 1900, which replaces its destination IP and port addresses to 15.1.1.13 and 253. These addresses are the addresses recognized by the TM engine 1705. The TM engine 1705 replaces these addresses to the destination IP and port addresses of 10.1.1.13 and 4432, associates the data message 1900 with the tenant ID 15, and provides the message 1900 with this tenant ID to the IPsec gateway 1805 for forwarding to the tenant gateway 1810.

Figure 20:
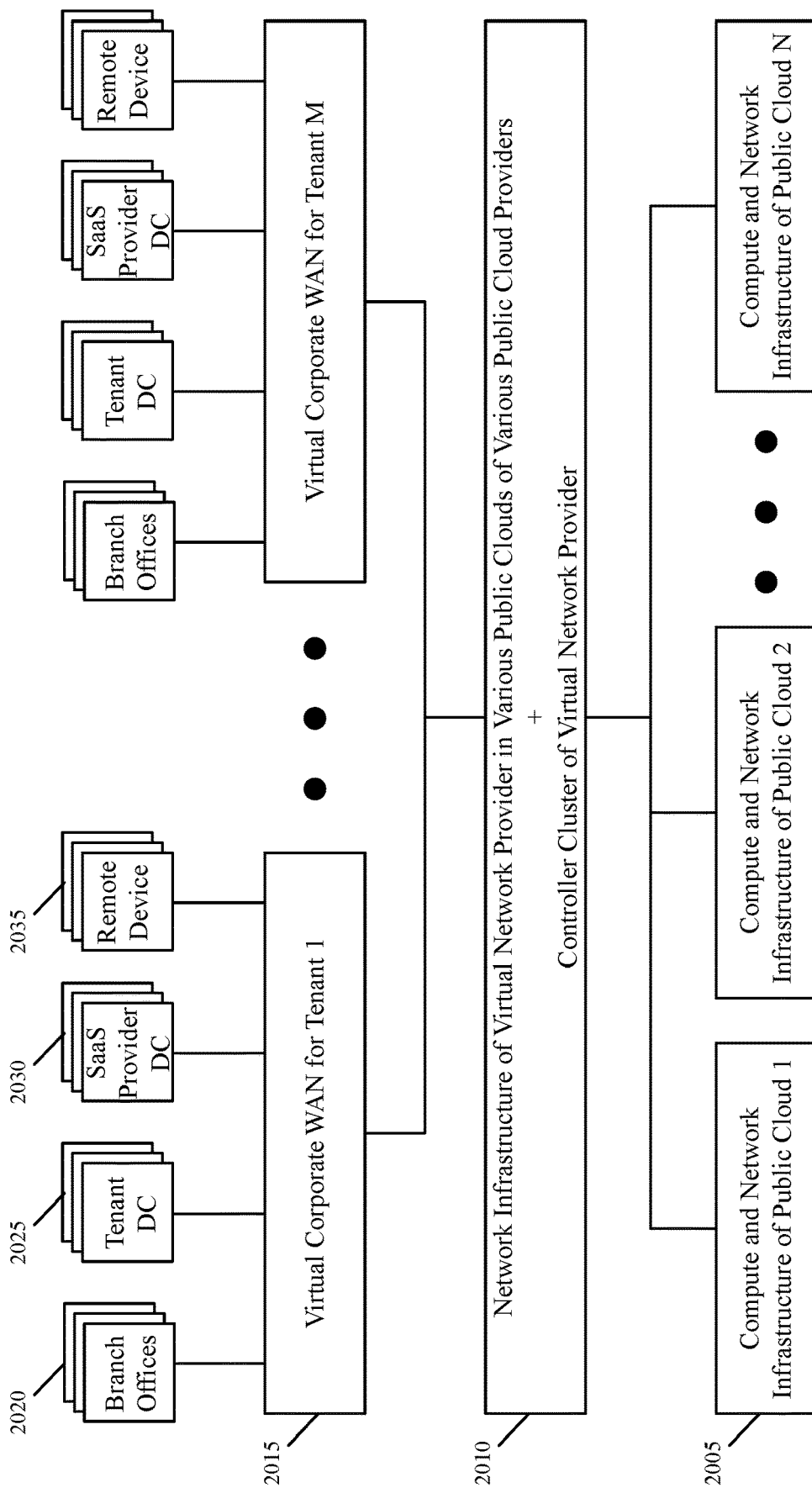
FIG. 20 presents an example that shows M virtual corporate WANs for M tenants of a virtual network provider that has network infrastructure and controller cluster(s) in N public clouds of one or more public cloud providers.

In some embodiments, a virtual network provider uses the above-described processes, systems, and components to provide multiple virtual WANs for multiple different tenants (e.g., multiple different corporate WANs for multiple corporations) over multiple public clouds of the same or different public cloud providers. FIG. 20 presents an example that shows M virtual corporate WANs 2015 for M tenants of a virtual network provider that has network infrastructure and controller cluster(s) 2010 in N public clouds 2005 of one or more public cloud providers.

Each tenant's virtual WAN 2015 can span all of the N public clouds 2005, or a subset of these public clouds. Each tenant's virtual WAN 2015 connects one or more branch offices 2020, datacenters 2025, SaaS provider datacenters 2030, and remote devices of the tenant. In some embodiments, each tenant's virtual WAN spans any public cloud 2005 that the VNP's controller cluster deems necessary for efficiently forwarding data messages between the different compute nodes 2020-2035 of the tenant. In selecting the public clouds, the controller cluster in some embodiments also accounts for public clouds that the tenant selects and/or the public clouds in which the tenant, or at least one SaaS provider of the tenant, has one or more machines.

The virtual WAN 2015 of each tenant allows the remote devices 2035 (e.g., mobile devices or remote computers) of the tenant to avoid interacting with the tenant's WAN gateway at any branch office or tenant datacenter, in order to access a SaaS provider service (i.e., to access a SaaS provider machine or machine cluster). The tenant's virtual WAN in some embodiments allows the remote devices to avoid the WAN gateways at the branch offices and tenant datacenters, by moving the functionalities of these WAN gateways (e.g., the WAN security gateways) to one or more machines in the public clouds spanned by the virtual WAN.

For example, to allow a remote device to access the compute resources of the tenant or its SaaS provider services, a WAN gateway in some embodiments has to enforce firewall rules that control how the remote device can access the tenant's computer resources or its SaaS provider services. To avoid branch or datacenter WAN gateways of the tenant, the tenant's firewall engines 210 are placed in the virtual network MFNs in one or more public clouds spanned by the tenant's virtual WAN.

The firewall engines 210 in these MFNs perform the firewall service operations on the data message flows from and to the remote devices. By performing these operations in the virtual network deployed over one or more public clouds, the data message traffic associated with the tenant's remote devices do not need to be unnecessarily routed through the tenant's datacenter(s) or branch offices in order to receive firewall rule processing. This alleviates traffic congestion in the tenant datacenters and branch offices, and avoids consuming expensive ingress/egress network bandwidth at these locations for processing traffic that is not destined to compute resources at these locations. It also helps speed up the forwarding of the data message traffic from and to the remote devices as this approach allows the intervening firewall rule processing to occur within the virtual network as the data message flows traverse to their destinations (e.g., at their ingress MFNs, egress MFNs or intermediate-hop MFNs).

In some embodiments, the firewall enforcing engine 210 (e.g., firewall service VM) of an MFN receives firewall rules form the VNP central controllers 160. A firewall rule in some embodiments includes a rule identifier and an action. The rule identifier in some embodiments includes one or more match values that are to be compared to data message attributes, such as layer 2 attributes (e.g., MAC addresses), layer 3 attributes (e.g., five tuple identifiers, etc.), tenant ID, location ID (e.g., office location ID, datacenter ID, remote user ID, etc.), in order to determine whether the firewall rule matches a data message.

The firewall rule's action in some embodiments specifies the action (e.g., allow, drop, re-direct, etc.) that the firewall enforcing engine 210 has to take on a data message when the firewall rule matches the data message's attributes. To address the possibility that multiple firewall rules match a data message, the firewall enforcing engine 210 stores the firewall rules (that it receives from the controller cluster 160) in a firewall rule data storage in a hierarchical manner so that one firewall rule can have higher priority than another firewall rule. When a data message matches two firewall rules, the firewall enforcing engine applies the rule with the higher priority in some embodiments. In other embodiments, the firewall enforcing engine examines the firewall rules according to their hierarchy (i.e., examines higher priority rules before lower priority rules) in order to ensure that it first matches the higher priority rule in case another lower priority rule might also be a match for the data message.

Some embodiments allow the controller cluster to configure the MFN components to have the firewall service engines examine a data message at an ingress node (e.g., node 850) as it enters a virtual network, at an intermediate node (e.g., node 857) on the virtual network or at an egress node (e.g., node 855) as it exits the virtual network. At each of these nodes, the CFE (e.g., 832, 856, or 858) in some embodiments calls its associated firewall service engine 210 to perform the firewall service operation on the data message that the CFE receives. In some embodiments, the firewall service engine returns its decision to the module that called it (e.g., to the CFE) so that this module can perform the firewall action on the data message, while in other embodiments, the firewall service engine performs its firewall action on the data message.

In some embodiments, other MFN components direct the firewall service engine to perform its operation. For instance, at an ingress node, the VPN gateway (e.g., 225 or 230) in some embodiments directs its associated firewall service engine to perform its operation, in order to determine whether the data message should be passed to the ingress node's CFE. Also, at the egress node, the CFE in some embodiments passes the data message to its associated firewall service engine, which if it decides to allow the data message through, then passes the data message through an external network (e.g., the Internet) to its destination, or passes the data message to its associated NAT engine 215 to perform its NAT operation before passing the data message to its destination through an external network.

The virtual network providers of some embodiments allow the tenant's WAN security gateway that is defined in the public clouds to implement other security services in addition to, or instead of, firewall services. For instance, a tenant's distributed WAN security gateway (which in some embodiments is distributed over each public cloud datacenter that is spanned by the tenant's virtual network) not only includes firewall service engines, but also includes intrusion detection engines and intrusion prevention engines. In some embodiments, the intrusion detection engines and intrusion prevention engines are incorporated architecturally in the MFN 150 to occupy similar position to the firewall service engine 210.

Each of these engines in some embodiments includes one or more storages that store intrusion detection/prevention policies distributed by the central controller cluster 160. In some embodiments, these policies configure the engines to detect/prevent unauthorized intrusions into the tenant's virtual network (that is deployed over several public cloud datacenters), and to take actions in response to detected intrusion events (e.g., generating logs, sending out notifications, shutting down services or machines, etc.). Like firewall rules, the intrusion detection/prevention policies can be enforced at various different managed forwarding nodes (e.g., ingress MFNs, intermediate MFNs, and/or egress MFNs of the data message flows) over which the virtual network is defined.

As mentioned above, the virtual network provider deploys each tenant's virtual WAN by deploying at least one MFN in each public cloud spanned by the virtual WAN, and configuring the deployed MFNs to define routes between the MFNs that allow the tenant's message flows to enter and exit the virtual WAN. Also, as mentioned above, each MFN can be shared by different tenants in some embodiments, while in other embodiments each MFN is deployed for just one particular tenant.

In some embodiments, each tenant's virtual WAN is a secure virtual WAN that is established by connecting the MFNs used by that WAN through overlay tunnels. This overlay tunnel approach in some embodiments encapsulates each tenant's data message flows with a tunnel header that is unique to each tenant, e.g., contains a tenant identifier that uniquely identifies the tenant. For a tenant, the virtual network provider's CFEs in some embodiments use one tunnel header to identify ingress/egress forwarding elements for entering/exiting the tenant's virtual WAN, and another tunnel header to traverse intervening forwarding elements of the virtual network. The virtual WAN's CFEs use different overlay encapsulation mechanisms in other embodiments.

To deploy a virtual WAN for a tenant over one or more public clouds, the VNP's controller cluster (1) identifies possible edge MFNs (that can serve as ingress or egress MFNs for different data message flows) for the tenant based on locations of the tenant's corporate compute nodes (e.g., branch offices, datacenters, mobile users, and SaaS providers), and (2) identifies routes between all possible edge MFNs. Once these routes are identified they are propagated to the forwarding tables of the CFEs (e.g., propagated using OpenFlow to different OVS-based virtual network routers). Specifically, to identify optimal routes through a tenant's virtual WAN, the MFNs associated with this WAN generate measurement values that quantify the quality of the network connection between them and their neighboring MFNs, and regularly provide their measurements to the VNP's controller cluster.

As mentioned above, the controller cluster then aggregates the measurements from the different MFNs, generates routing graphs based on these measurements, defines routes through a tenant's virtual WAN, and then distributes these routes to the forwarding elements of the CFEs of the MFNs. To dynamically update the defined routes for a tenant's virtual WAN, the MFNs associated with this WAN periodically generate their measurements and provide these measurements to the controller cluster, which then periodically repeats its measurement aggregation, route-graph generation, route identification, and route distribution based on the updated measurements that it receives.

In defining the routes through a tenant's virtual WAN, the VNP's controller cluster optimizes the routes for the desired end-to-end performance, reliability and security, while trying to minimize the routing of tenant's message flows through the Internet. The controller cluster also configures the MFN components to optimize the layer 4 processing of the data message flows passing through the network (e.g., to optimize the end-to-end rate of TCP connections by splitting the rate control mechanisms across the connection path).

With the proliferation of public clouds, it is often very easy to find a major public cloud datacenter close to each branch office of a corporation. Similarly, SaaS vendors are increasingly hosting their applications within public clouds, or are similarly located at the vicinity of some public cloud datacenter. Consequently, the virtual corporate WANs 2015 securely use the public clouds 2005 as corporate network infrastructure that have presence in the vicinity of the corporate compute nodes (e.g., branch offices, datacenters, remote devices, and SaaS providers).

Corporate WANs require bandwidth guarantees in order to provide business critical application at an acceptable performance at all times. Such applications maybe interactive data applications, e.g. ERP, financial or procurement, deadline-oriented application (e.g., industrial or IoT control), real time application (e.g., VoIP or video conferencing). Consequently, traditional WAN infrastructure (e.g., Frame Relay or MPLS) provides such guarantees.

A main obstacle in providing bandwidth guarantee in a multi-tenant network is the need to reserve bandwidth over one or more path for a certain customer. In some embodiments, the VNP offers QoS services and provides an Ingress Committed Rate (ICR) guarantee and an Egress Committed Rate (ECR) guarantee. ICR refers to the traffic rate coming into the virtual network, while ECR refers to the traffic rate exiting the virtual network to the tenant site.

As long as traffic does not exceed ICR and ECR limits, the virtual network in some embodiments provides bandwidth and delay guarantees. For example, as long as HTTP ingress or egress traffic do not exceed 1 Mbps, the bandwidth and low delay are guaranteed. This is the point-to-cloud model because, for QoS purposes, the VNP need not keep track of traffic destinations, as long as its destinations are within the ICR/ECR bounds. This model is sometimes called the hose model.

For the more stringent applications, where a customer desires a point-to-point guarantee, a virtual data pipe needs to be constructed to deliver the highly critical traffic. For example, an enterprise may want two hub sites or datacenters connected with high service level agreement guarantees. To that end, VNP routing automatically chooses a routing path that satisfies the bandwidth constraint for each customer. This is referred to as the point-to-point model or the pipe model.

The main advantage of VNP in providing guaranteed bandwidth to end users is the ability to adjust the VNP infrastructure according to the changing bandwidth demands. Most public clouds provide minimum bandwidth guarantees between each two instances located at different regions of the same cloud. If the current network does not have enough unused capacity to provide the guaranteed bandwidth for a new request, the VNP adds new resources to its facilities. For example, the VNP can add new CFEs in high-demand regions.

One challenge is to optimize the performance and the cost of this new dimension in planning routes and scaling up and down the infrastructure. To facilitate the algorithms and bandwidth accounting, some embodiments assume that end-to-end bandwidth reservations are not split. In other ways, if a certain bandwidth (e.g., 10 Mbps) is reserved between branch A and branch B of a certain tenant, the bandwidth is allocated over a single path that starts from an ingress CFE to which branch A connects, and then traverses a set of zero or more intermediate CFEs to reach the egress CFE that is connected to branch B. Some embodiments also assume that the bandwidth guaranteed path only traverse a single public cloud.

In order to account for the various bandwidth reservation that intersect over the network topology, the VNP in some embodiments defines the routing over a reserved bandwidth path statically, so that data message flows always traverse through the same routes that were reserved for the bandwidth requirements. In some embodiments, each route is identified with a single tag that each CFE traversed by the route matches to a single outgoing interface associated with this route. Specifically, each CFE matches a single outgoing interface to each data message that has this tag in its header and arrives from a specific incoming interface.

In some embodiments, the controller cluster maintains a network graph that is formed by several interconnected nodes. Each node n in the graph has the allocated total guaranteed bandwidth (TBWn) associated with this node and the amount of bandwidth already reserved (allocated to a certain reserved path) by this node ($RBW_n$). In addition, for each node, the graph includes the cost in cents per gigabyte ($C_{ij}$) and the delay in milliseconds ($D_{ij}$) associated with sending traffic between this node and all other nodes in the graph. The weight associated with sending traffic between node i and node j is $W_{ij}=a*C_{ij}+Di_j$, where a is a system parameter that is typically between 1 and 10.

When a request for a bandwidth reservation of value BW between branches A and B is accepted, the controller cluster first maps the request to specific ingress and egress routers n and m, which are bound to branches A and B respectively. The controller cluster then executes a routing process that conducts two lowest-cost (e.g., shortest path) computations between n and m. The first is a lowest-cost (e.g., shortest path) route between n and m irrespective of the available bandwidth along the computed route. The total weight of this route is computed as $W_1$.

The second lowest-cost (e.g., shortest path) computation initially modifies the graph by eliminating all nodes i where $BW>TBW_i-RBW_i$. The modified graph is termed the trimmed graph. The controller cluster then performs a second lowest-cost (e.g., shortest path) route computation over the trimmed graph. If the weight of the second route is no more than K percent (K is typically 10%-30%) higher than the first route, the second route is selected as the preferred path. On the other hand, when this requirement is not met, the controller cluster will add to the first path the node i with the smallest value of $TBW_i-RBW_i$, and then repeats the two lowest-cost (e.g., shortest path) computations. The controller cluster will continue adding more routers until the condition is met. At that point, the reserved bandwidth BW is added to all $RBW_i$ where i is a router on the selected route.

For the special case of a request for additional bandwidth for a route that already has reserved bandwidth, the controller cluster will first delete the current bandwidth reservation between nodes A and B and will calculate the path for the total bandwidth request between these nodes. To do this, the information held for each node in some embodiments also includes the bandwidth reserved for each tag, or each source and destination branches, and not only the overall bandwidth reserved. After bandwidth reservations are added to the network, some embodiments do not revisit the routes so long as there are no major changes in measured network delays or costs through the virtual network. However, when the measurements and/or costs change, these embodiments repeat the bandwidth reservation and route computation processes.

Figure 21:
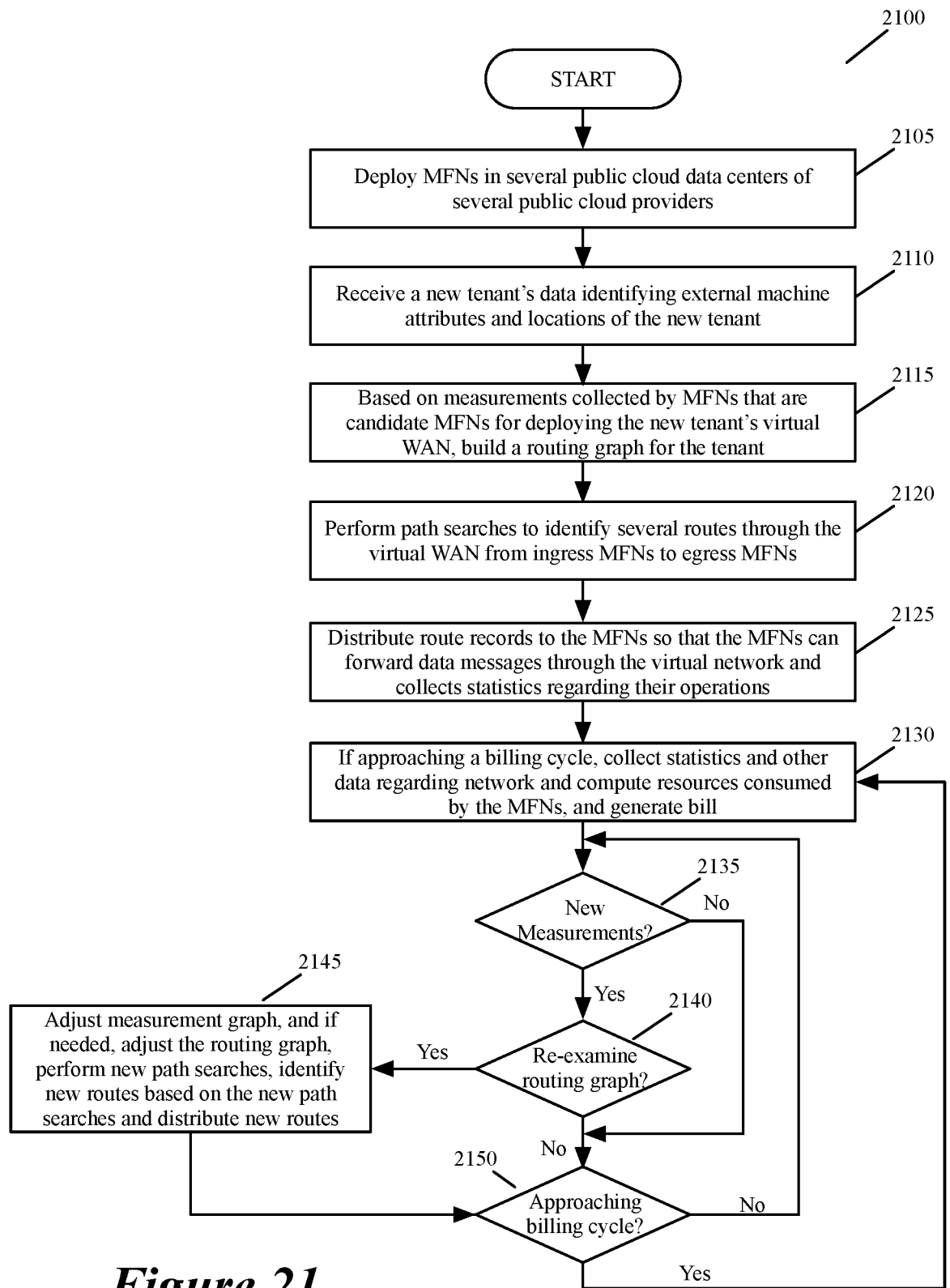
FIG. 21 conceptually illustrates a process performed by the controller cluster of the virtual network provider to deploy and manage a virtual WAN for a particular tenant.

FIG. 21 conceptually illustrates a process 2100 performed by the controller cluster 160 of the virtual network provider to deploy and manage a virtual WAN for a particular tenant. In some embodiments, the process 2100 is performed by several different controller programs executing on the controller cluster 160. The operations of this process do not necessarily have to follow the sequence illustrated in FIG. 21, as these operations can be performed by the different programs in parallel or in a different sequence. Accordingly, these operations are illustrated in this figure only to describe one exemplary sequence of operations performed by the controller cluster.

As shown, the controller cluster initially deploys (at 2105) several MFNs in several public cloud datacenters of several different public cloud providers (e.g., Amazon AWS, Google GCP, etc.). The controller cluster in some embodiments configures (at 2105) these deployed MFNs for one or more other tenants that are different than the particular tenant for which the process 2100 is illustrated.

At 2110, the controller cluster receives from the particular tenant data about external machine attributes and locations of the particular tenant. In some embodiments, this data includes the private subnets used by the particular tenant as well as identifiers for one or more tenant offices and datacenters at which the particular tenant has external machines. In some embodiments, the controller cluster can receive the tenant data through APIs or through a user interface that the controller cluster provides.

Next, at 2115, the controller cluster generates a routing graph for the particular tenant from the measurements collected by the measurement agents 205 of the MFNs 150 that are candidate MFNs to use for establishing the virtual network for the particular tenant. As mentioned above, the routing graph has nodes that represent the MFNs, and links between the nodes that represent the network connections between the MFNs. The links have associated weights, which are cost values that quantify the quality and/or cost of using the network connections represented by the links. As mentioned above, the controller cluster first generates a measurement graph from the collected measurements, and then generates the routing graph by removing links from the measurement graph that are not optimal (e.g., that have large delays or drop rates).

After constructing the routing graph, the controller cluster performs (at 2120) path searches to identify possible routes between different pairs of candidate ingress and egress nodes (i.e., MFNs) that the tenant's external machines can use to send data messages into the virtual network (deployed by the MFNs) and to receive data messages from the virtual network. In some embodiments, the controller cluster uses known path search algorithms to identify different paths between each candidate ingress/egress pair of nodes. Each path for such a pair uses one or more links that when concatenated traverse from the ingress node to the egress node through zero or more intermediate nodes.

In some embodiments, the cost between any two MFNs comprises a weighted sum of estimated latency and financial costs for a connection link between the two MFNs. The latency and financial costs include in some embodiments one or more of the following: (1) link delay measurements, (2) estimated message processing latency, (3) cloud charges for outgoing traffic from a particular datacenter either to another datacenter of the same public cloud provider, or to exit the public cloud (PC) provider's cloud (e.g., to another public cloud datacenter of another public cloud provider or to the Internet), and (4) estimated message processing costs associated with the MFNs executing on host computers in the public clouds.

Some embodiments assess a penalty for connection links between two MFNs that traverse through the public Internet, in order to minimize such traversal whenever possible. Some embodiments also incentivize the use of private network connections between two datacenters (e.g., by reducing the connection link cost) in order to bias the route generation towards using such connections. Using the computed costs of these pair-wise links, the controller cluster can compute the cost of each routing path that uses one or more of these pair-wise links by aggregating the costs of the individual pair-wise links that are used by the routing path.

The controller cluster then selects (at 2120) one or up to N identified paths (where N is an integer larger than 1) based on the computed costs (e.g., the lowest aggregate cost) of the identified candidate paths between each candidate ingress/egress pair of nodes. In some embodiments, the computed costs for each path are based on the weight cost of each link used by the path (e.g., is a sum of each link's associated weight value), as mentioned above. The controller cluster can select more than one path between a pair of ingress/egress nodes when more than one route is needed between two MFNs to allow the ingress MFN or an intermediate MFN to perform a multi-path operation.

After selecting (at 2120) one or N paths for each candidate pair of ingress/egress nodes, the controller cluster defines one or N routes based on the selected paths, and then generates route tables or route table portions for the MFNs that implement the particular tenant's virtual network. The generated route records identify edge MFNs to reach different subnets of the particular tenant, and identify next hop MFNs for traversing routes from ingress MFNs to egress MFNs.

At 2125, the controller cluster distributes route records to the MFNs in order to configure the forwarding elements 235 of these MFNs to implement the virtual network for the particular tenant. In some embodiments, the controller cluster communicates with the forwarding elements to pass the route records by using communication protocols that are presently used in a software defined multi-tenant datacenter to configure software routers executing on host computers to implement a logical network that spans the host computers.

Once the MFNs have been configured and the virtual network is operational for the particular tenant, the edge MFNs receive data messages from tenant's external machines (i.e., machines outside of the virtual network) and forward these data messages to edge MFNs in the virtual network, which in turn forward the data messages to other external machines of the tenant. While performing such forwarding operations, the ingress, intermediate and egress MFNs collect statistics regarding their forwarding operations. Also, in some embodiments, one or more modules on each MFN in some embodiments collect other statistics regarding network or compute consumption in the public cloud datacenters. In some embodiments, the public cloud providers collect such consumption data and pass the collected data to the virtual network provider.

When approaching a billing cycle, the controller cluster collects (e.g., at 2130) statistics collected by the MFNs, and/or the network/compute consumption data collected by the MFNs or provided by the public cloud providers. Based on the collected statistics, and/or provided the network/compute consumption data, the controller cluster generates (at 2130) billing reports and sends the billing reports to the particular tenant.

As mentioned above, the amount billed in the billing report accounts for statistics and network/consumption data that the controller cluster receives (e.g., at 2130). Also, in some embodiments, the bill accounts for the cost that the virtual network provider incurred to operate the MFNs (that implement the virtual network for the particular tenant) plus a rate of return (e.g., a 10% increase). This billing scheme is convenient for the particular tenant because the particular tenant does not have to deal with bills from multiple different public cloud providers over which the tenant's virtual network is deployed. The VNP's incurred cost in some embodiments includes the cost charged to the VNP by the public cloud providers. At 2130, the controller cluster also charges a credit card or electronically withdraws funds from a bank account for the charges reflected in the billing report.

At 2135, the controller cluster determines whether it has received new measurements from the measurement agents 205. If not, the process transitions to 2145, which will be described below. On the other hand, when the controller cluster determines that it has received new measurements from the measurement agents, it determines (at 2140) whether it needs to re-examine its routing graph for the particular tenant based on the new measurements. Absent an MFN failure, the controller cluster in some embodiments at most updates its routing graph for each tenant once during a particular time period (e.g., once every 24 hours or every week) based on received, updated measurements.

When the controller cluster determines (at 2140) that it needs to re-examine the routing graph based on new measurements that it has received, the process generates (at 2145) a new measurement graph based on the newly received measurements. In some embodiments, the controller cluster uses a weighted sum to blend each new measurement with the prior measurements in order to ensure that the measurement values associated with the links of the measurement graph do not fluctuate dramatically each time a new measurement set is received.

At 2145, the controller cluster also determines whether it needs to adjust the routing graph based on the adjusted measurement graph (e.g., whether it needs to adjust weight values for the routing-graph links, or add or remove links in the routing graph because of adjusted measurement values associated with the links). If so, the controller cluster (at 2145) adjusts the routing graph, performs path search operations (such as operations 2120) to identify routes between ingress/egress node pairs, generates route records based on the identified routes, and distributes route records to the MFNs. From 2145, the process transitions to 2150.

The process also transitions to 2150 when the controller cluster determines (at 2140) that it does not need to re-examine the routing graph. At 2150, the controller cluster determines whether it has to collect statistics regarding data messages processed and network/compute resources consumed. If not, the process returns to 2145; otherwise, the process returns to 2135 to determine whether it has received new measurements from the MFN measurement agents. In some embodiments, the controller cluster repeatedly performs the operations of the process 2100 until the particular tenant no longer needs a virtual network that is deployed across the public cloud datacenters.

In some embodiments, the controller cluster not only deploys virtual networks for tenants in the public cloud datacenters, but also assists the tenants in deploying and configuring compute node machines and service machines in the public cloud datacenters. The deployed service machines can be machines separate from the service machines of the MFNs. In some embodiments, the controller cluster billing report to the particular tenant also accounts for compute resources consumed by the deployed compute and service machines. Again, having one bill from one virtual network provider for network and compute resources consumed in multiple public cloud datacenters of multiple public cloud providers is more preferable for the tenant than receiving multiple bills from multiple public cloud providers.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
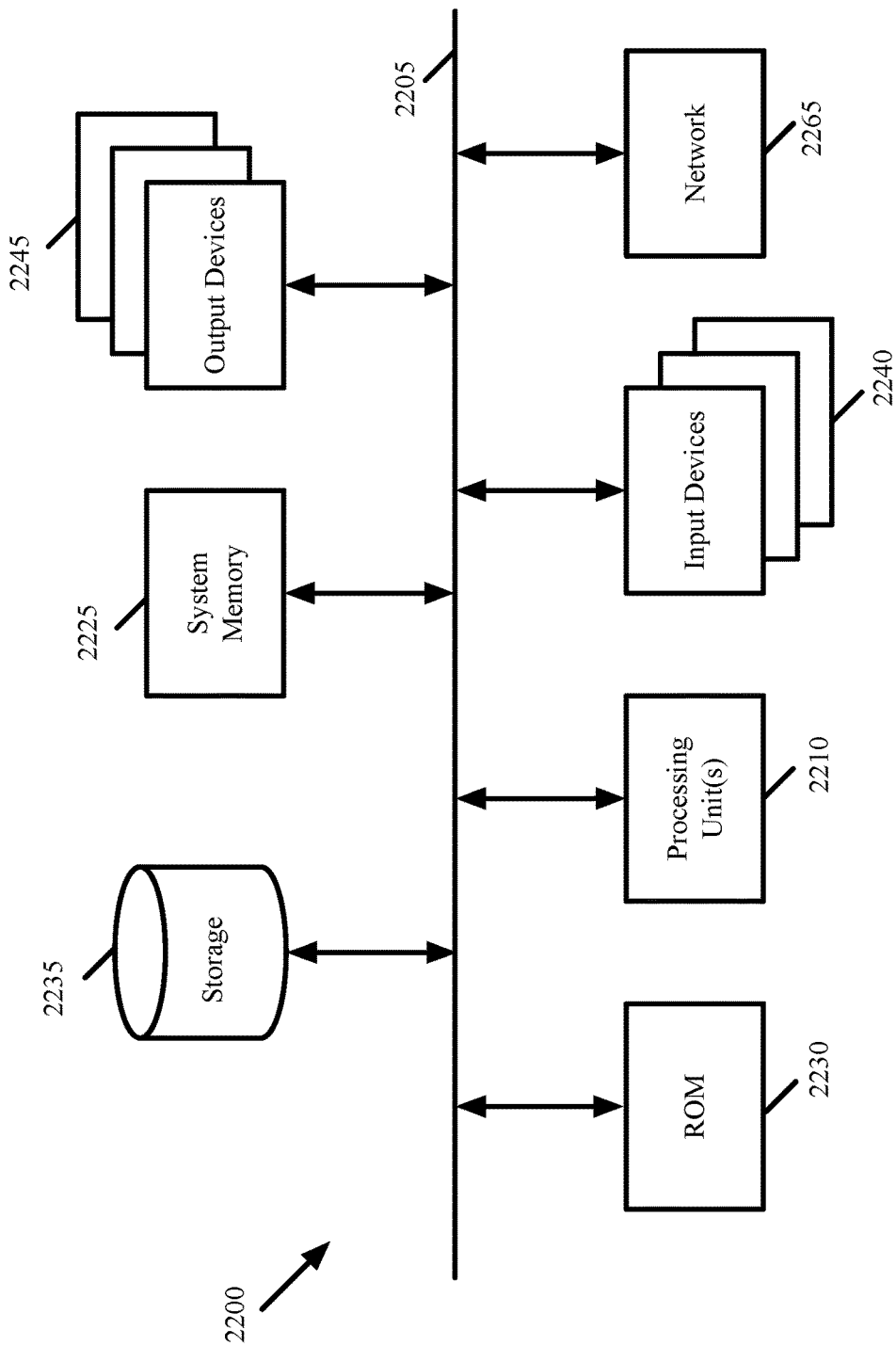
FIG. 22 conceptually illustrates a computer system with which some embodiments of the invention are implemented.

FIG. 22 conceptually illustrates a computer system 2200 with which some embodiments of the invention are implemented. The computer system 2200 can be used to implement any of the above-described hosts, controllers, and managers. As such, it can be used to execute any of the above described processes. This computer system includes various types of non-transitory machine readable media and interfaces for various other types of machine readable media. Computer system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the computer system 2200. For instance, the bus 2205 communicatively connects the processing unit(s) 2210 with the read-only memory 2230, the system memory 2225, and the permanent storage device 2235.

From these various memory units, the processing unit(s) 2210 retrieve instructions to execute and data to process in order to execute the processes of the invention. The processing unit(s) may be a single processor or a multi-core processor in different embodiments. The read-only-memory (ROM) 2230 stores static data and instructions that are needed by the processing unit(s) 2210 and other modules of the computer system. The permanent storage device 2235, on the other hand, is a read-and-write memory device. This device is a non-volatile memory unit that stores instructions and data even when the computer system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, etc.) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieve instructions to execute and data to process in order to execute the processes of some embodiments.

The bus 2205 also connects to the input and output devices 2240 and 2245. The input devices enable the user to communicate information and select commands to the computer system. The input devices 2240 include alphanumeric keyboards and pointing devices (also called "cursor control devices"). The output devices 2245 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples computer system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of computer system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described examples illustrate virtual corporate WANs of corporate tenants of a virtual network provider. One of ordinary skill will realize that in some embodiments, the virtual network provider deploys virtual networks over several public cloud datacenters of one or more public cloud providers for non-corporate tenants (e.g., for schools, colleges, universities, non-profit entities, etc.). These virtual networks are virtual WANs that connect multiple compute endpoints (e.g., offices, datacenters, computers and devices of remote users, etc.) of the non-corporate entities.

Several embodiments described above include various pieces of data in the overlay encapsulation headers. One of ordinary skill will realize that other embodiments might not use the encapsulation headers to relay all of this data. For instance, instead of including the tenant identifier in the overlay encapsulation header, other embodiments derive the tenant identifier from the addresses of the CFEs that forward the data messages, e.g., in some embodiments in which different tenants have their own MFNs deployed in the public clouds, the tenant identity is associated with the MFN's that process the tenant messages.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims

We claim:

1. For a multi-tenant virtual network system, a method of processing a data message that is associated with a virtual network that is defined for a particular tenant over a plurality of public cloud datacenters, the method comprising:

establishing, for the particular tenant, the virtual network that spans the plurality of public cloud datacenters to connect machines of the particular tenant that reside outside of the plurality of public cloud datacenters;

determining that the data message is associated with an external service machine outside of the virtual network and the plurality of public cloud datacenters;

based on a tenant identifier (TID) for the particular tenant in the virtual network system, performing, at a first public cloud datacenter that serves as an ingress node for the data message to the virtual network, a first source network address translation (SNAT) operation to modify a first source network address of the data message to a modified second source network address;

performing, at a second public cloud datacenter that serves as an egress node for the data message from the virtual network, a second SNAT operation to modify the modified second source network address of the data message to a modified third source network address; and forwarding the data message, with the third modified source network address, to the external service machine through an external network that is outside of the public cloud datacenters.

2. The method of claim 1 further comprising performing the first and second SNAT operations for data messages of different tenants, wherein
the first SNAT operation for the data messages of each tenant is based on the TID that the virtual network system associates with each tenant, and
the first SNAT operation maps the data messages of different tenants to different source network address spaces to ensure that even when a common network address space is used by two tenants, the modified second source network addresses of the different tenants do not overlap.

3. The method of claim 1, wherein the first SNAT operation is performed in a stateless manner that does not create a record for a flow of the data message to use to process subsequent data messages that are part of the data message's flow, while the second SNAT operation is performed in a stateful manner that creates a record for the data message to use the record to process subsequent data messages that are part of the data message's flow as the data message.

4. The method of claim 1 further comprising:
at a first router in the second public cloud datacenter that is used to define the virtual network along with at least one other router in at least the first public cloud datacenter, receiving the data message with an encapsulated tunnel header from the other router; and
extracting the TID from the tunnel header.

5. The method of claim 4, wherein the first router is an egress gateway for the data message to leave the virtual network that is defined over the plurality of public cloud datacenters.

6. The method of claim 4, wherein determining that the data message is associated with an external service machine comprises:
extracting a destination network address from an original header of the data message that is encapsulated by the tunnel header; and
using the extracted destination network address to determine that the data message's destination address is associated with an interface connected to a machine outside of the public cloud datacenters.

7. The method of claim 6, wherein
the external network is the Internet, and
using the extracted destination network address comprises performing a lookup operation in the public Internet context based on the extracted destination network address.

8. The method of claim 1, wherein the first, second and third network addresses each comprises a layer 3 network address.

9. The method of claim 1, wherein
the first, second and third network addresses each comprises a layer 3 network address and a layer 4 network address, and
at least one of the first and second SNAT operations modifies both the layers 3 and 4 network addresses.

10. The method of claim 1, wherein
the first, second and third network addresses each comprise a layer 3 network address and a layer 4 network address, and
each of the first and second SNAT operations modifies both the layers 3 and 4 network addresses.

11. The method of claim 1, wherein the external service machine is a machine of a SaaS (software as a service) provider, while a source of the data message is one of a machine in an office of the particular tenant, a machine in a private datacenter of the particular tenant, or a remote user machine of the particular tenant.

12. The method of claim 11, wherein the service machine is in a private datacenter of the SaaS provider.

13. The method of claim 1, wherein the modified second source network address is an address in a private network address space of a public cloud datacenter, while the third source network address is a public network address.

14. The method of claim 1 further comprising creating at least one record for the first and second SNAT operations in order to use the record to perform at least one destination network address translation operation for a data message received from the external service machine.

15. The method of claim 1, wherein the public cloud datacenters are multi-tenant public cloud datacenters.

* * * * *